(12) United States Patent
Zhu et al.

(10) Patent No.: US 11,588,397 B2
(45) Date of Patent: Feb. 21, 2023

(54) THREE-LEVEL POWER CONVERSION SYSTEM AND CONTROL METHOD

(71) Applicant: Huawei Digital Power Technologies Co., Ltd., Shenzhen (CN)

(72) Inventors: Huibin Zhu, Plano, TX (US); Heping Dai, Plano, TX (US); Liming Ye, Plano, TX (US); Yongtao Liang, Shenzhen (CN); Weiping Liu, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 89 days.

(21) Appl. No.: 16/899,361

(22) Filed: Jun. 11, 2020

(65) Prior Publication Data
US 2020/0412238 A1 Dec. 31, 2020

Related U.S. Application Data

(63) Continuation of application No. PCT/US2019/039898, filed on Jun. 28, 2019.

(51) Int. Cl.
*H02M 1/42* (2007.01)
*H02M 7/217* (2006.01)
(Continued)

(52) U.S. Cl.
CPC ....... *H02M 1/4216* (2013.01); *H02M 1/4233* (2013.01); *H02M 3/01* (2021.05);
(Continued)

(58) Field of Classification Search
CPC .. H02M 1/4216; H02M 1/4233; H02M 7/217; H02M 1/0058; H02M 1/083;
(Continued)

(56) References Cited

U.S. PATENT DOCUMENTS 4,719,550 A 1/1988 Powell et al.
5,633,577 A 5/1997 Matsumae et al.
(Continued)

FOREIGN PATENT DOCUMENTS

CN 204481711 * 7/2015
CN 106936184 A 7/2017
(Continued)

OTHER PUBLICATIONS

Bor-Ren Lin et al. "Implementation of a three-level rectifier for power factor correction." IEEE Transactions on Power Electronics 15.5 (2000): pp. 891-900) (Year: 2000).*
(Continued)

*Primary Examiner* — Toan T Vu
(74) *Attorney, Agent, or Firm* — Slater Matsil, LLP

(57) ABSTRACT

A power conversion system includes a first power conversion port including a three-level power factor correction device and a primary power conversion circuit, a second power conversion port including a three-level rectifier and a third power conversion port including a rectifier, the first power conversion port, the second power conversion port and the third power conversion port magnetically coupled to each other through a transformer.

16 Claims, 34 Drawing Sheets

(51) Int. Cl.
*H02M 3/00* (2006.01)
*H02M 3/335* (2006.01)
*H02M 1/08* (2006.01)
*H02M 1/00* (2006.01)

(52) U.S. Cl.
CPC ....... *H02M 3/33571* (2021.05); *H02M 7/217* (2013.01); *H02M 1/0058* (2021.05); *H02M 1/083* (2013.01)

(58) Field of Classification Search
CPC .......... H02M 7/4807; H02M 3/33561; H02M 3/33569; H02M 7/487; H02M 3/33576; H02M 1/008; H02M 1/007; Y02B 70/10
See application file for complete search history.

(56) References Cited

U.S. PATENT DOCUMENTS

| | | | |
|---|---|---|---|
| 7,764,527 | B2 | 7/2010 | Takayanagi |
| 7,796,410 | B2 | 9/2010 | Takayanagi et al. |
| 7,800,922 | B2 | 9/2010 | Takayanagi et al. |
| 8,030,882 | B2 | 10/2011 | Ito et al. |
| 8,692,512 | B2 | 4/2014 | Tanikawa et al. |
| 9,509,211 | B2 | 11/2016 | Shoyama et al. |
| 9,998,056 | B2 | 6/2018 | Nozawa |
| 2005/0237771 | A1* | 10/2005 | Franck ................... H05B 41/28 363/84 |
| 2007/0216373 | A1* | 9/2007 | Smedley ............... H02M 7/219 323/223 |
| 2008/0055947 | A1* | 3/2008 | Wen ..................... H02M 5/458 363/65 |
| 2010/0253295 | A1* | 10/2010 | Tan ...................... H02M 1/4216 323/205 |
| 2014/0103860 | A1* | 4/2014 | Kominami ........ H02M 3/33584 320/103 |
| 2016/0016479 | A1* | 1/2016 | Khaligh .................. H01F 38/08 363/17 |
| 2017/0063251 | A1* | 3/2017 | Ye ...................... H02M 3/33576 |
| 2021/0135583 | A1* | 5/2021 | Ohashi .............. H02M 3/33584 |
| 2021/0155100 | A1* | 5/2021 | Khaligh ................ H02M 7/797 |

FOREIGN PATENT DOCUMENTS

| | | |
|---|---|---|
| CN | 107623365 A | 1/2018 |
| CN | 107968586 A | 4/2018 |
| EP | 3211779 A1 | 8/2017 |

OTHER PUBLICATIONS

Jih-Sheng Lai et al.,"Multilevel Intelligent Universal Transformer for Medium Voltage Applications" Conference Record of the 2005 IEEE Industry Applications Conference, Fortieth IAS Annual Meeting, Oct. 2-6, 2005, pp. 1893-1899.

Bor-Ren Lin et al.,"High-Power Factor Rectifier Based on Neutral Point Clamped Scheme" Proceedings of IEEE Region 10 International Conference on Electrical and Electronic Technology, TENCON 2001, Aug. 19, 2001, pp. 556-560.

Levy F. Costa et al.,"A Family of Series-Resonant DC-DC Converter with Fault-Tolerance Capability" 2017 IEEE Applied Power Electronics Conference and Exposition (APEC), Mar. 26, 2017, pp. 3378-3384.

\* cited by examiner

THREE-LEVEL POWER CONVERSION SYSTEM AND CONTROL METHOD

PRIORITY CLAIM

This application is a continuation of International Application No. PCT/US2019/039898, entitled, "Three-level Power Conversion System and Control Method" and filed on Jun. 28, 2019, which is hereby incorporated by reference in its entirety.

TECHNICAL FIELD

The present disclosure relates to a three-level power conversion system, and, in particular embodiments, to a three-level power conversion system connected between an alternating current (AC) power source and a direct current (DC) load.

BACKGROUND

The power electronics industry has experienced rapid growth due to continuous improvements in the exponential development of new technologies. As the power electronics technologies further advance, on-board battery chargers have become a key element for some new energy applications. One of the most important new energy applications is electric vehicles (EV). Different EVs are equipped with different capacity and voltage batteries. The EVs need suitable chargers for charging a variety of batteries.

An on-board battery charger comprises electrical circuits for converting AC power into DC power. The on-board battery charger may include an AC/DC stage and a DC/DC stage. The inputs of the AC/DC stage are connected to the AC utility line. The AC/DC stage is employed to convert the AC input voltage from the AC utility line to a suitable DC bus voltage. The AC/DC stage may comprise a variety of electromagnetic interference (EMI) filters, a bridge rectifier formed by four diodes and a power factor correction circuit.

The EMI filter is employed to reduce high frequency noise that may cause interference with other devices of the on-board battery charger. As a result of employing the EMI filters, the on-board battery charger may meet various EMI regulations. The bridge rectifier converts an AC voltage into a full-wave rectified DC voltage. Such a full-wave rectified DC voltage provides a DC input voltage for the power factor correction circuit. The power factor correction circuit may be implemented a suitable power converter such as a boost converter. By employing an appropriate control circuit, the boost converter is capable of shaping the input line current to be sinusoidal and in phase with the sinusoidal input voltage of the AC input source. As a result, the power factor of the AC/DC stage may be close to unity as required by a variety of international standards The DC/DC stage is connected between the outputs of the AC/DC stage and a plurality of batteries. The DC/DC stage may comprise an isolated DC/DC power converter having one primary winding, a secondary winding and a secondary rectifier for converting the DC bus voltage into a DC voltage for charging the EV battery.

SUMMARY

These and other problems are generally solved or circumvented, and technical advantages are generally achieved, by preferred embodiments of the present disclosure which provide a three-level power conversion system and method for power transferring between an AC power source and two DC loads.

In accordance with an embodiment, a power conversion system comprises a first power conversion port including a three-level power factor correction device and a primary power conversion circuit, a second power conversion port including a three-level rectifier, and a third power conversion port including a rectifier, the first power conversion port, the second power conversion port and the third power conversion port magnetically coupled to each other through a transformer.

The three-level power factor correction device is a three-level neutral point clamped (NPC) power factor correction converter. The primary power conversion circuit includes a primary switching network of a three-level inductor-inductor-capacitor (LLC) converter and a resonant tank.

The three-level power factor correction device include input ports connected to a single-phase AC power source, a first output port connected to a first voltage bus, a second output port connected to a second voltage bus, and a third output port connected to a third voltage bus. An output voltage of the three-level rectifier is regulated through adjusting a voltage across the first voltage bus and the second voltage bus.

The power conversion system further comprises a first diode, a second diode connected in series with the first diode between the first voltage bus and the second voltage bus, a first capacitor, and a second capacitor connected in series with the first capacitor between the first voltage bus and the second voltage bus, and a relay connected between a common node of the first diode and the second diode, and a common node of the first capacitor and the second capacitor. The relay is configured to transition between a closed state and an open stage. The first diode, the second diode, the first capacitor, and the second capacitor form a voltage doubler when the relay is in the closed state.

The three-level power factor correction device includes a first three-level power factor correction circuit having an input connected to a first phase of a three-phase AC power source, a second three-level power factor correction circuit having an input connected to a second phase of the three-phase AC power source, and a third three-level power factor correction circuit having an input connected to a third phase of the three-phase AC power source.

The primary power conversion circuit includes a first primary switch, a second primary switch, a third primary switch and a fourth primary switch connected in series between the first voltage bus and the second voltage bus, and the resonant tank connected between a common node of the first primary switch and the second primary switch, and a first terminal of a primary winding of the transformer, and a second terminal of the primary winding of the transformer being connected to a common node of the third primary switch and the fourth primary switch.

In accordance with another embodiment, a method comprises transferring energy from an AC power source to a first DC load through a three-level power factor correction device, a primary three-level power conversion circuit and a first secondary power conversion circuit that is magnetically coupled to the primary three-level power conversion circuit through a transformer, and transferring energy from the AC power source to a second DC load through the three-level power factor correction device, the primary three-level power conversion circuit and a second secondary power conversion circuit that is magnetically coupled to the primary three-level power conversion circuit through the transformer.

The method further comprises regulating a voltage across the first DC load through adjusting an output voltage of the three-level power factor correction device. The method further comprises configuring the three-level power factor correction device to generate a first voltage bus, a second voltage bus and a third voltage bus, wherein a first diode, a second diode connected in series with the first diode between the first voltage bus and the second voltage bus, a first capacitor and a second capacitor connected in series with the first capacitor between the first voltage bus and the second voltage bus, and a relay connected between a common node of the first diode and the second diode, and a common node of the first capacitor and the second capacitor. The method further comprises configuring the first diode, the second diode, the first capacitor and the second capacitor and the relay as a voltage doubler through changing the relay from an open state to a closed state.

The method further comprises configuring the second secondary power conversion circuit to operate as a linear regulator when an input voltage of the second secondary power conversion circuit is over a predetermined voltage threshold. The method further comprises configuring the first DC load as a power source to provide power for at least one of the second DC load and an AC load connected to terminals of the AC power source. The method further comprises configuring the second secondary power conversion circuit to operate in a boost converter mode by shorting a secondary side winding of the transformer through turning on two lower switches of the second secondary power conversion circuit.

In accordance with yet another embodiment, a power conversion system comprises a three-port power conversion subsystem having a first port connected to an AC power source, a second port connected to a first DC load and a third port connected to a second DC load, and a first two-port power conversion subsystem having a first port connected to the AC power source and a second port connected to the first DC load, the second port of the first two-port power conversion subsystem being a first unidirectional power port.

The first port of the three-port power conversion subsystem includes a first three-level power factor correction device and a first primary power conversion circuit connected in cascade between the AC power source and a first winding of a first transformer. The second port of the three-port power conversion subsystem includes a three-level rectifier connected between a second winding of the first transformer and the first DC load. The third port of the three-port power conversion subsystem includes a first diode rectifier between a third winding of the first transformer and the second DC load.

The first port of the first two-port power conversion subsystem includes a second three-level power factor correction device and a second primary power conversion circuit connected in cascade between the AC power source and a first winding of a second transformer. The second port of the first two-port power conversion subsystem includes a second diode rectifier connected between a second winding of the second transformer and the first DC load.

The power conversion system further comprises a second two-port power conversion subsystem having a first port connected to the AC power source and a second port connected to the first DC load, the second port of the second two-port power conversion subsystem being a second unidirectional power port.

An advantage of an embodiment of the present disclosure is achieving a three-level power conversion system between an AC power source and DC loads such as a main EV battery and an auxiliary EV battery.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a three-level power conversion system for charging a batter of an electric vehicle. The present disclosure may also be applied, however, to a variety of power conversion systems. Hereinafter, various embodiments will be explained in detail with reference to the accompanying drawings.

Figure 1:
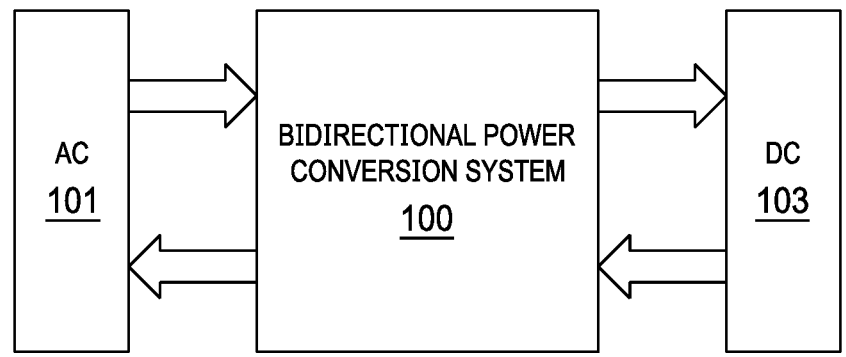
FIG. 1 illustrates a bidirectional power conversion system in accordance with various embodiments of the present disclosure.

FIG. 1 illustrates a bidirectional power conversion system in accordance with various embodiments of the present disclosure. The bidirectional power conversion system 100 is connected between an AC element 101 and a DC element 103. Depending on different applications and design needs, the AC element 101 can be implemented as either an AC power source or an AC load. Likewise, the DC element 103 can be implemented as either a DC load or a DC power source.

In some embodiments, when the bidirectional power conversion system 100 is configured to convert AC power into DC power, the AC element 101 is implemented as a single-phase AC power source or a three-phase AC power source from a utility grid. The DC element 103 may be a semiconductor chip, a battery, a downstream power converter and the like. In some embodiments, the DC element 103 may be a battery pack of an electric vehicle. The bidirectional power conversion system 100 shown in FIG. 1 may function as an electric vehicle charging converter.

In alternative embodiments, when the bidirectional power conversion system 100 is configured to convert DC power into AC power, the DC element 103 is implemented as a DC power source such as a rechargeable battery. The AC element 101 is implemented as an AC load.

Figure 2:
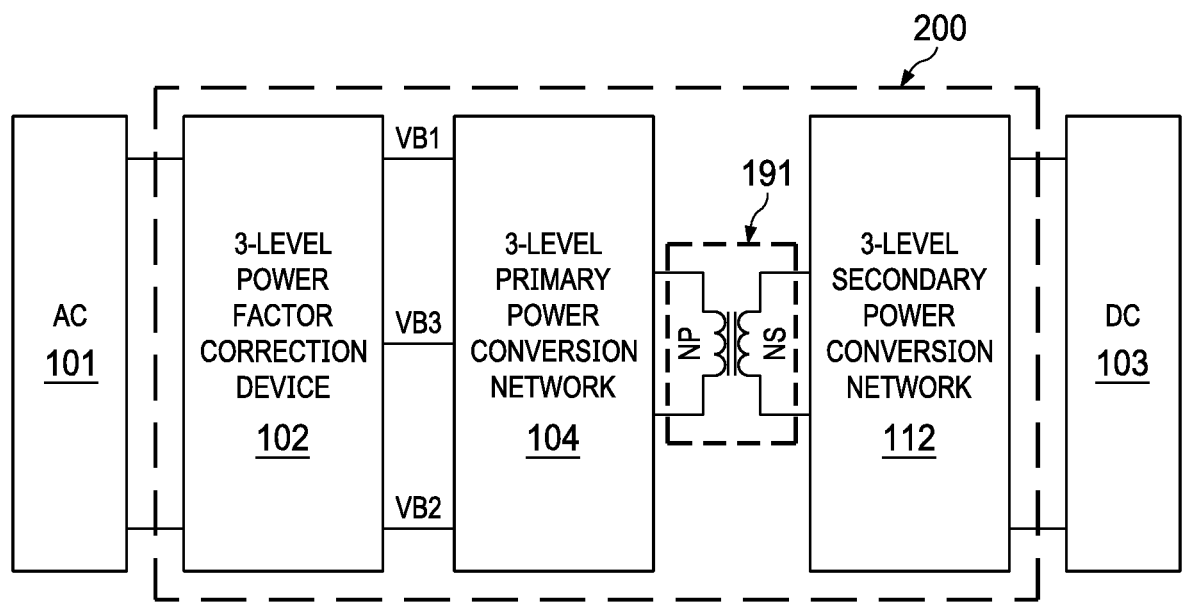
FIG. 2 illustrates a block diagram of a first implementation of the bidirectional power conversion system shown in FIG. 1 in accordance with various embodiments of the present disclosure.

FIG. 2 illustrates a block diagram of a first implementation of the bidirectional power conversion system shown in FIG. 1 in accordance with various embodiments of the present disclosure. The bidirectional power conversion system 200 comprises a three-level power factor correction device 102 and a three-level primary power conversion network 104 connected in cascade between the AC element 101 and a primary winding NP of a transformer 191. The three-level power factor correction device 102 converts an AC voltage into DC voltages, namely a first voltage bus VB1, a second voltage bus VB2 and a third voltage bus VB3. In some embodiments, the voltage on the first voltage bus VB1 is greater than the voltage on the third voltage bus VB3. The voltage on third voltage bus VB3 is greater than the voltage on the second voltage bus VB2.

In some embodiments, the voltage on third voltage bus VB3 is at a voltage at a midpoint of two series-connected capacitors. The voltage buses VB1, VB2 and VB3 may be referred to collectively as a bipolar DC bus. The voltage on this bipolar DC bus can be regulated in a wide range. For example, the voltage on this bipolar DC bus may vary in a range from about 400 V to about 800 V. Such a wide range voltage variation helps to regulate the output voltage of the bidirectional power conversion system 200.

The bidirectional power conversion system 200 further comprises a three-level secondary power conversion network 112. As shown in FIG. 2, the three-level secondary power conversion network 112 is connected between a secondary windings NS and the DC element 103. Throughout the description, the bidirectional power conversion system 200 may be alternatively referred to as a three-level power conversions system. In addition, throughout the description, the primary power conversion networks may be alternatively referred to as the primary power conversion circuits. The second power conversion networks may be alternatively referred to as the second power conversion circuits.

In some embodiments, the three-level power factor correction device 102 of the three-level power conversions system 200 is configured such that the power factor of the three-level power conversions system 200 is adjusted to a level approximately equal to unity through adjusting the input current flowing into the three-level power factor correction device 102. The three-level power factor correction device 102 may be implemented as any suitable power factor correction converters such as boost power factor correction rectifiers and the like.

Furthermore, the output voltage of the three-level power factor correction device 102 may vary in a wide range. For example, the output voltage of the three-level power factor correction device 102 may vary in a range from about 370 V to about 800 V. Such a wide output voltage range helps to regulate the output voltage of the three-level power conversion system 200. More particularly, the circuit between the three-level power factor correction device 102 and the DC element 103 may be an unregulated power converter or a power converter having a narrow voltage variation range. The regulation of the output voltage of the three-level power conversion system 200 is achieved through or mainly through adjusting the output voltage of the three-level power factor correction device 102. The detailed schematic diagram of the three-level power factor correction device 102 will be described below with respect to FIG. 3.

In some embodiments, the three-level primary power conversion network 104 comprises the primary side circuit of a three-level inductor-inductor-capacitor (LLC) resonant converter. More particularly, the three-level primary power conversion network 104 comprises the primary side switching network of the three-level LLC resonant converter and a resonant tank. In some embodiments, the three-level LLC resonant converter is configured as an unregulated power converter. The switching frequency of the plurality of switches of the three-level primary power conversion network 104 is equal to the resonant frequency of the resonant tank. Alternatively, depending on design needs and different applications, the switching frequency of the plurality of switches of the three-level LLC resonant converter may vary in a narrow range (e.g., +/−5% of the resonant frequency of the resonant tank) to help the three-level power conversion system 200 regulate the output voltage. The detailed schematic diagram of the three-level primary power conversion network 104 will be described below with respect to FIG. 3.

The transformer 191 provides electrical isolation between the primary side (side having 102 and 104) and the secondary side (side having 112) of the three-level power conversion system 200. In accordance with an embodiment, the transformer 191 may be formed of a primary transformer winding (e.g., winding NP) and a secondary transformer winding (e.g., winding NS) as shown in FIG. 2. It should be noted that the transformer illustrated herein and throughout the description are merely examples, which should not unduly limit the scope of the claims. One of ordinary skill in the art would recognize many variations, alternatives, and modifications. For example, the transformer 191 may further comprise a variety of bias windings and gate drive auxiliary windings.

The three-level secondary power conversion network 112 converts an alternating polarity waveform received from the secondary winding NS of the transformer 191 to a single polarity waveform. The detailed operation and structure of the three-level secondary power conversion network 112 will be discussed below with respect to FIG. 3.

It should be noted that three-level LLC resonant converter is merely an example, which should not unduly limit the scope of the claims. One of ordinary skill in the art would recognize many variations, alternatives, and modifications. The three-level primary power conversion network 104 can be implemented as any suitable isolated converters such as flyback converters, forward converters, push-pull converters, half-bridge converters, full-bridge converters, any combinations thereof and the like.

In some embodiments, the three-level power conversion system 200 is a bidirectional power conversion system. In operation, when the three-level power conversions system 200 is configured to convert AC power into DC power, the three-level primary power conversion network 104, the transformer 191 and the three-level power conversion network are configured as an isolated DC/DC converter for converting the output voltage of the three-level power factor correction device 102 into a suitable DC voltage applied to the DC element 103. On the other hand, when the three-level power conversion system 200 is configured to convert DC power into AC power, the DC element 103 functions as a DC power source, and an AC load is connected to the input terminals of the three-level power factor correction device 102. The three-level secondary power conversion network 112 is configured as an inverter converting the DC voltage from the DC element 103 into an alternating polarity waveform, which is magnetically coupled to the three-level primary power conversion network 104 through the transformer 191. The three-level primary power conversion network 104 functions as a rectifier converting the alternating polarity waveform into a single polarity waveform. The three-level power factor correction device 102 is configured as an inverter, through which the single polarity waveform at the bipolar DC voltage bus (VB1-VB3) is converted into an AC waveform, which is applied to the AC load 101.

Figure 3:
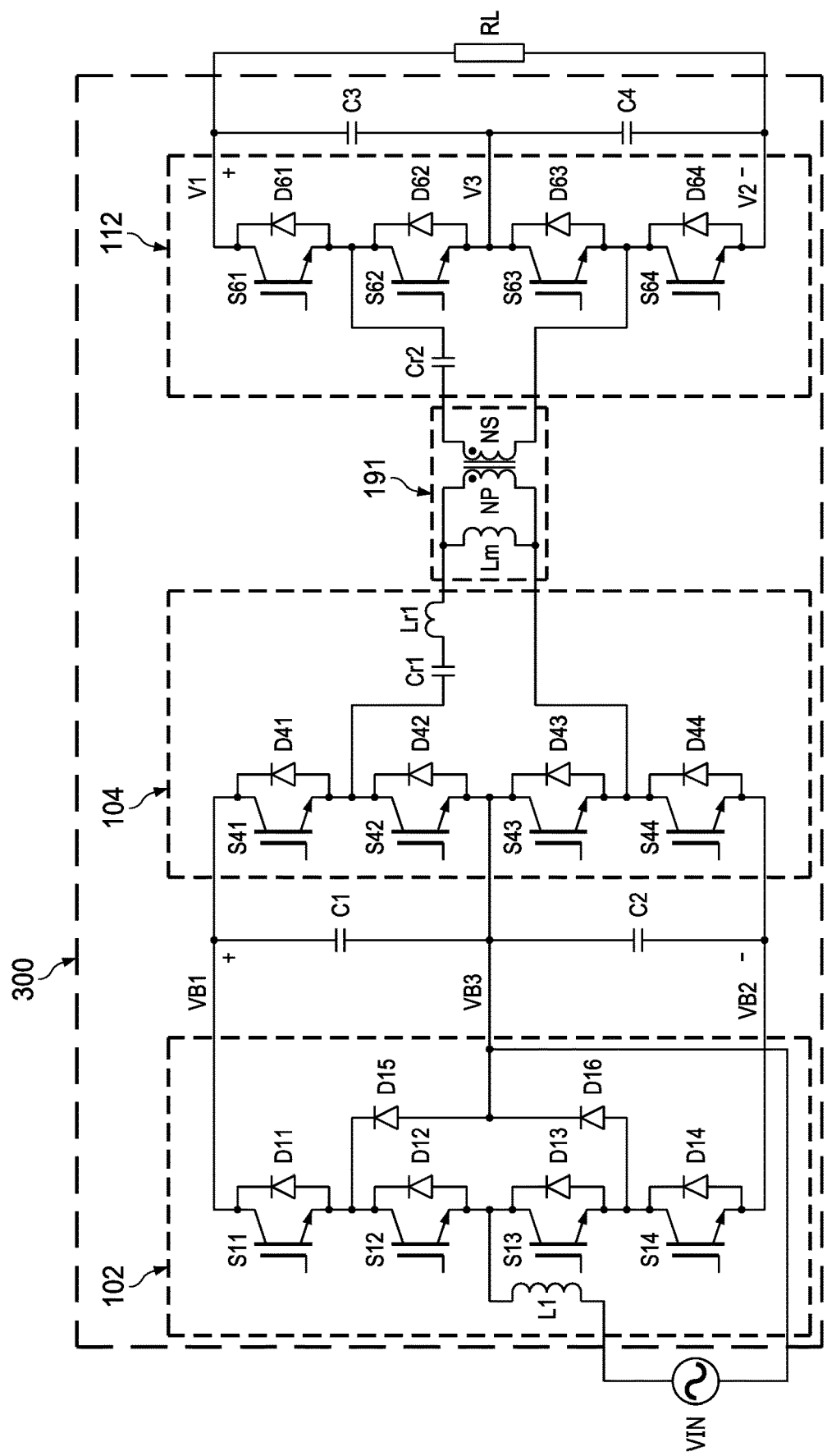
FIG. 3 illustrates a schematic diagram of a first implementation of the three-level power conversion system shown in FIG. 2 in accordance with various embodiments of the present disclosure.

FIG. 3 illustrates a schematic diagram of a first implementation of the three-level power conversion system shown in FIG. 2 in accordance with various embodiments of the present disclosure. The three-level power conversion system 300 comprises the three-level power factor correction device 102, the three-level primary power conversion network 104, the transformer 191 and the three-level secondary power conversion network 112 connected in cascade between an AC power source VIN and a DC load RL. In some embodiments, the AC power source VIN is a single-phase AC power source. The voltage of the AC power source VIN is in a range from about 85 V to about 265 V AC.

The three-level power factor correction device 102 is implemented as a neutral-point clamped (NPC) boost power factor correction converter. The inputs of the three-level power factor correction device 102 are connected to the outputs of the AC power source VIN. A first output of the three-level power factor correction device 102 is the first voltage bus VB1. A second output of the three-level power factor correction device 102 is the second voltage bus VB2. A third output of the three-level power factor correction device 102 is the third voltage bus VB3.

Two output capacitors C1 and C2 are connected in series between the first voltage bus VB1 and the second voltage bus VB2. The common node of the output capacitors C1 and C2 is connected to the third voltage bus VB3. The output capacitors C1 and C2 are employed to reduce the ripple components and provide steady DC voltages for the three-level primary power conversion network 104.

The three-level power factor correction device 102 comprises an inductor L1, four switches S11-S14 and eight diodes D11-D16, and D1-D2. The four switches S11-S14 are connected in series between the first voltage bus VB1 and the second voltage bus VB2. The inductor L1 is connected between a first output terminal of the AC power source VIN and a common node of switches S12 and S13. A second output terminal of the AC power source VIN is connected to the common node of the output capacitors C1 and C2.

The diodes D15 and D16 are connected in series between a common node of switches S11 and S12, and a common node of switches S13 and S14. The Diodes D11-D14 are connected in parallel with their respective switches S11-S14. The common node of diodes D15 and D16 is connected to a common node of output capacitors C1 and C2.

As shown in FIG. 3, the second output terminal of the AC power source VIN is connected to the third voltage bus VB3, which is a mid-point of the bipolar DC bus. In some embodiments, the second output terminal of the AC power source VIN may be a neutral point. By connecting the neutral point to the mid-point of the bipolar DC bus, the three-level power conversion system 300 can save a switching bridge, thereby reducing the cost of the power conversion system.

The three-level primary power conversion network 104, the transformer 191 and the three-level secondary power conversion network 112 form a three-level LLC power converter converting the DC voltages on the voltage buses VB1, VB2 and VB3 into a suitable DC voltage for the DC load RL. The three-level primary power conversion network 104 comprises a switch network and a resonant tank. The switch network comprises switches S41, S42, S43 and S44 connected in series between the first voltage bus VB1 and the second voltage VB2. The common node of switches S42 and S43 is connected to the common node of the capacitors C1 and C2. The common node of switches S41 and S42 is connected to a first terminal of the transformer 191 through the resonant tank. The common node of switches S43 and S44 is connected to a second terminal of the transformer 191 directly.

The resonant tank may be implemented in a variety of ways. For example, the resonant tank comprises a series resonant inductor Lr1, a parallel resonant inductor Lm and a series resonant capacitor Cr1 as shown in FIG. 3.

The series resonant inductor and the parallel resonant inductor may be implemented as external inductors. A person skilled in the art will recognize that there may be many variation, alternatives and modifications. For example, the series resonant inductor may be implemented as a leakage inductance of the transformer 191.

In sum, the resonant tank includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank, the resonant tank helps to achieve zero voltage switching for the primary side switching elements and zero current switching for the secondary side switching elements.

The transformer 191 may be formed of two transformer windings, namely a primary transformer winding NP and a secondary transformer winding NS as shown in FIG. 3. Alternatively, the transformer 191 may have a center tapped secondary so as to have three transformer windings including a primary transformer winding, a first secondary transformer winding and a second secondary transformer winding.

The three-level secondary power conversion network 112 converts an alternating polarity waveform received from the secondary winding NS of the transformer 191 to a single polarity waveform, which is applied to the DC load RL. Two output capacitors C3 and C4 are connected in series between a first secondary voltage bus V1 and a second secondary voltage V2. The common node of the output capacitors C3 and C4 is a third secondary voltage bus V3. The output capacitors C3 and C4 are employed to reduce the ripple components and provide a steady DC voltage for the DC load RL.

The three-level secondary power conversion network 112 comprises a secondary resonant capacitor Cr2, switches S61, S62, S63 and S64, and diodes D61, D62, D63 and D64. As shown in FIG. 3, switches S61, S62, S63 and S64 are connected in series between the first secondary voltage bus V1 and the second secondary voltage V2. The common node of switches S62 and S63 is connected to the common node of the capacitors C3 and C4. The common node of switches S61 and S62 is connected to a first terminal of the secondary winding NS through the secondary resonant capacitor Cr2. The common node of switches S63 and S64 is connected to a second terminal of the secondary winding NS directly.

It should be noted that the schematic diagram of the three-level secondary power conversion network 112 is merely an example, which should not unduly limit the scope of the claims. One of ordinary skill in the art would recognize many variations, alternatives, and modifications. For example, the three-level secondary power conversion network 112 may include a secondary resonant tank (a resonant inductor and a resonant capacitor). In particular, when the three-level power conversion system 300 is configured as a DC/AC power conversion system, the secondary resonant tank is necessary for improving the efficiency of the three-level power conversion system 300.

In accordance with an embodiment, the switches (e.g., switches S11-S14, S41-S44 and S61-S64) may be an insulated gate bipolar transistor (IGBT) device. Alternatively, the switching element shown in FIG. 3 can be any controllable switches such as metal oxide semiconductor field effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and/or the like. Throughout the description, the switch symbols (e.g., the symbol of IGBTs) are merely examples. Depending on different applications and design needs, the switches shown in this disclosure can be any controllable switches.

It should be noted that when switches S11-S14, S41-S44 and S61-S64 are implemented by MOSFET devices, the body diodes of switches S11-S14, S41-S44 and S61-S64 can be used to provide a freewheeling channel. On the other hand, when switches S11-S14, S41-S44 and S61-S64 are implemented by IGBT devices, a separate freewheeling diode is required to be connected in parallel with its corresponding switch.

As shown in FIG. 3, diodes D11-D14, D41-D44 and D61-D64 are required to provide reverse conducting paths. In other words, diodes D11-D14, D41-D44 and D61-D64 are anti-parallel diodes. In some embodiments, diodes D11-D14, D41-D44 and D61-D64 are co-packaged with their respective IGBT devices S11-S14, S41-S44 and S61-S64. In alternative embodiments, didoes D11-D14, D41-D44 and D61-D64 are placed outside their respective IGBT devices S11-S14, S41-S44 and S61-S64.

It should further be noted that while FIG. 3 shows each bidirectional switch is formed by diodes and IGBT devices connected in an anti-parallel arrangement, one of ordinary skill in the art would recognize many variations, alternatives and modifications. For example, the bidirectional switch may be implemented by some new semiconductor switches such as anti-paralleled reverse blocking IGBTs arrangement. The discussion of the IGBT devices herein is applicable to other IGBT devices of this disclosure.

Figure 4:
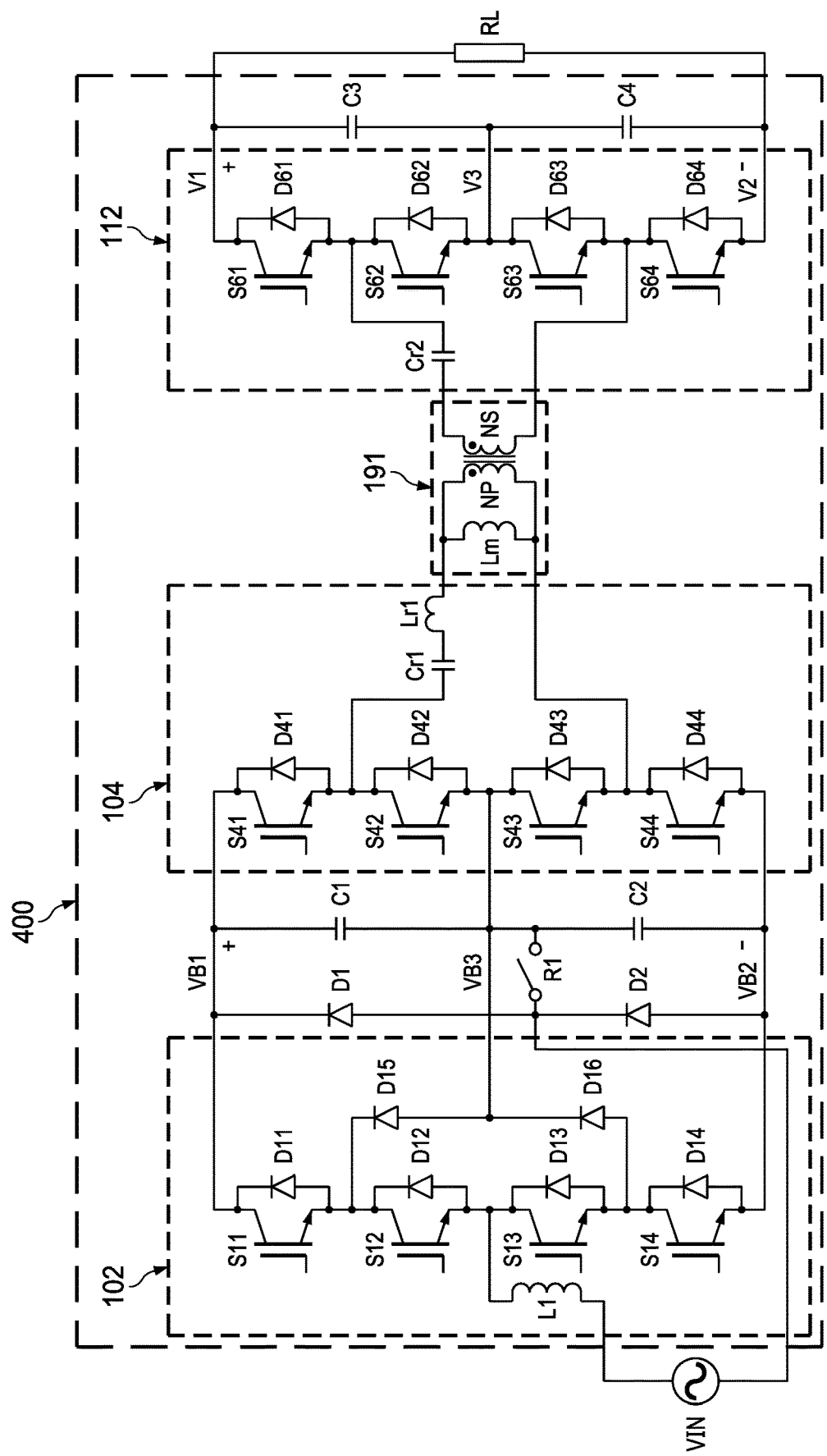
FIG. 4 illustrates a schematic diagram of a second implementation of the three-level power conversion system shown in FIG. 2 in accordance with various embodiments of the present disclosure.

FIG. 4 illustrates a schematic diagram of a second implementation of the three-level power conversion system shown in FIG. 2 in accordance with various embodiments of the present disclosure. The second implementation of the three-level power conversion system shown in FIG. 4 is similar to that shown in FIG. 3 except that a voltage doubler is included in the three-level power conversion system 400.

As shown in FIG. 4, the three-level power conversion system 400 further comprises diodes D1, D2 and a relay R1. The diodes D1 and D2 are connected in series between the first voltage bus VB1 and the second voltage bus VB2. The common node of the diodes D1 and D2 is connected to a second output terminal of the AC power source VIN. The relay R1 is connected between the common node of diodes Dl-D2, and a common node of the capacitors C1-C2.

In operation, when the relay R1 is closed, the three-level power factor correction device 102 forms a voltage doubler. In other words, the voltage on the bipolar DC bus (VB1-VB3) is equal to two times the voltage on the bipolar DC bus when the relay R1 is open. The detailed operating principle of the voltage doubler will be described below with respect to FIG. 5.

Figure 5:
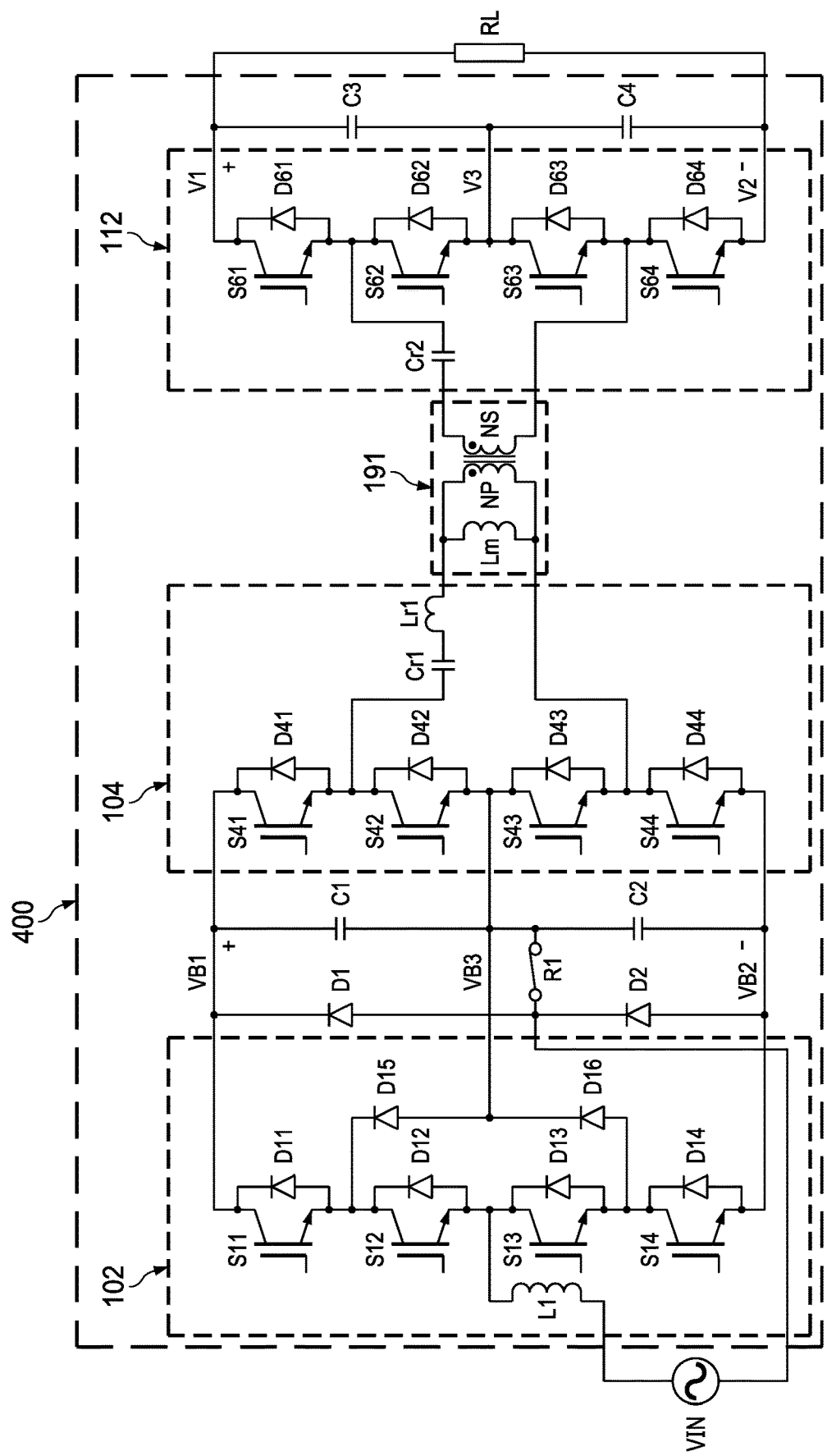
FIG. 5 illustrates a schematic diagram of a third implementation of the three-level power conversion system shown in FIG. 2 in accordance with various embodiments of the present disclosure.

FIG. 5 illustrates a schematic diagram of a third implementation of the three-level power conversion system shown in FIG. 2 in accordance with various embodiments of the present disclosure. The third implementation of the three-level power conversion system shown in FIG. 5 is similar to that shown in FIG. 4 except that the relay R1 is closed in response to a different operating condition.

Before the relay R1 is closed, during a positive half cycle of the AC power source VIN, the output voltage of the three-level power factor correction device 102 is used to charge both the capacitor C1 and the capacitor C2. Likewise, during a negative half cycle of the AC power source VIN, the output voltage of the three-level power factor correction device 102 is used to charge both the capacitor C1 and the capacitor C2.

After the relay R1 is closed, the three-level power factor correction device 102 and capacitors C1, C2 form a voltage doubler. During a positive half cycle of the AC power source VIN, diode D2 is bypassed by the closed relay R1. As a result of bypassing the diode D2, the output voltage of the three-level power factor correction device 102 is used to charge the capacitor C1 only. During a negative half cycle of the AC power source VIN, diode D1 is bypassed by the closed relay R1. As a result of bypassing the diode D1, the output voltage of the three-level power factor correction device 102 is used to charge the capacitor C2 only. As such, after the relay R1 has been closed, the voltage across the voltage buses VB1 and VB2 is doubled in comparison with the voltage across the voltage buses VB1 and VB2 before the relay R1 is closed.

One advantageous feature of having the voltage doubler shown in FIG. 5 is the three-level power conversion system 400 shown in FIGS. 4-5 is suitable for charging a variety of batteries. For example, when the three-level power conversion system 400 is employed to charge a battery having a voltage in a range from about 240 V to about 350 V, the relay R1 is open so as to have a low output voltage across the voltage buses VB1 and VB2. On the other hand, when the three-level power conversion system 400 is employed to charge a battery having a voltage in a range from about 350 V to about 500 V, the relay R1 is closed so as to have a high output voltage across the voltage buses VB1 and VB2.

Figure 6:
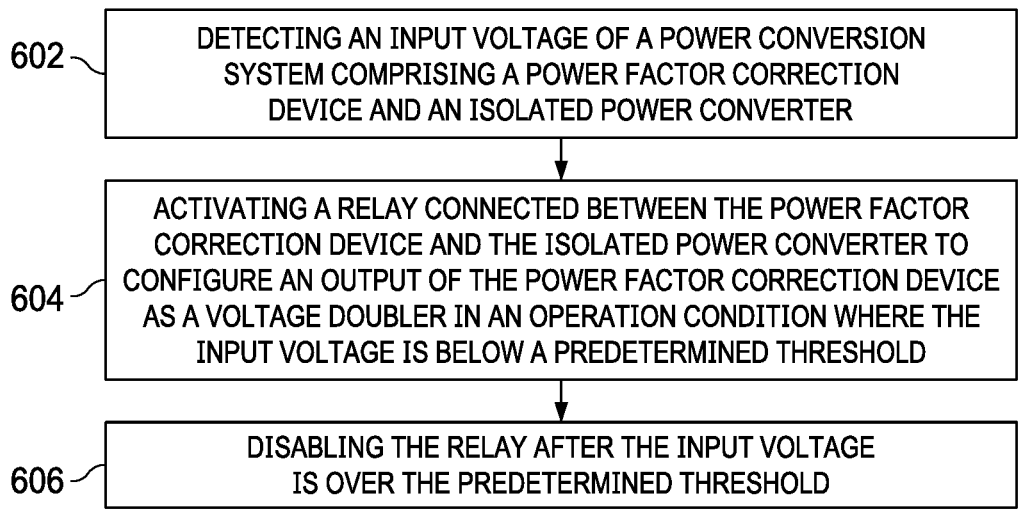
FIG. 6 illustrates a flow chart of a method for controlling the three-level power conversion system shown in FIG. 2 in accordance with various embodiments of the present disclosure.

FIG. 6 illustrates a flow chart of a method for controlling the three-level power conversion system shown in FIG. 2 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

A bidirectional power conversion system comprises a power factor correction device and an isolated power converter. When the bidirectional power conversion system is configured as an AC/DC power conversion system, the power from the AC power source is delivered to the isolated power converter through the power factor correction device and the isolated power converter. The output voltage of the bidirectional power conversion system is regulated through adjusting the output voltage of the power factor correction device. In other words, the output voltage of the power factor correction device can vary in a wide range for regulating the output voltage of the bidirectional power conversion system.

The bidirectional power conversion system further comprises a relay. By controlling the on/off of the relay, the output stage of the power factor correction device may be configured as a voltage doubler.

The bidirectional power conversion system can also be configured as a DC/AC power conversion system. In the DC/AC power conversion system, the isolated power converter and the power factor correction device of the bidirectional power conversion system are configured as a first inverter, a rectifier and a second inverter connected in cascade between a DC power source and an AC load.

At step 602, a suitable voltage sensor detects an input voltage of a bidirectional power conversion system. The bidirectional power conversion system comprises a power factor correction device and an isolated power converter. A relay connected between the power factor correction device and the isolated power converter At step 604, the relay is activated or closed to configure an output of the power factor correction device as a voltage doubler in response to an operating condition where the input voltage is below a predetermined threshold. Alternatively, under a same input voltage, the relay may be activated to form the voltage doubler when a high voltage DC load (e.g., a high voltage battery) is connected to the bidirectional power conversion system.

At step 606, the relay is disabled or open after the input voltage is greater than the predetermined voltage threshold. After the relay is open, the output voltage of the power factor correction device is reduced accordingly.

Figure 7:
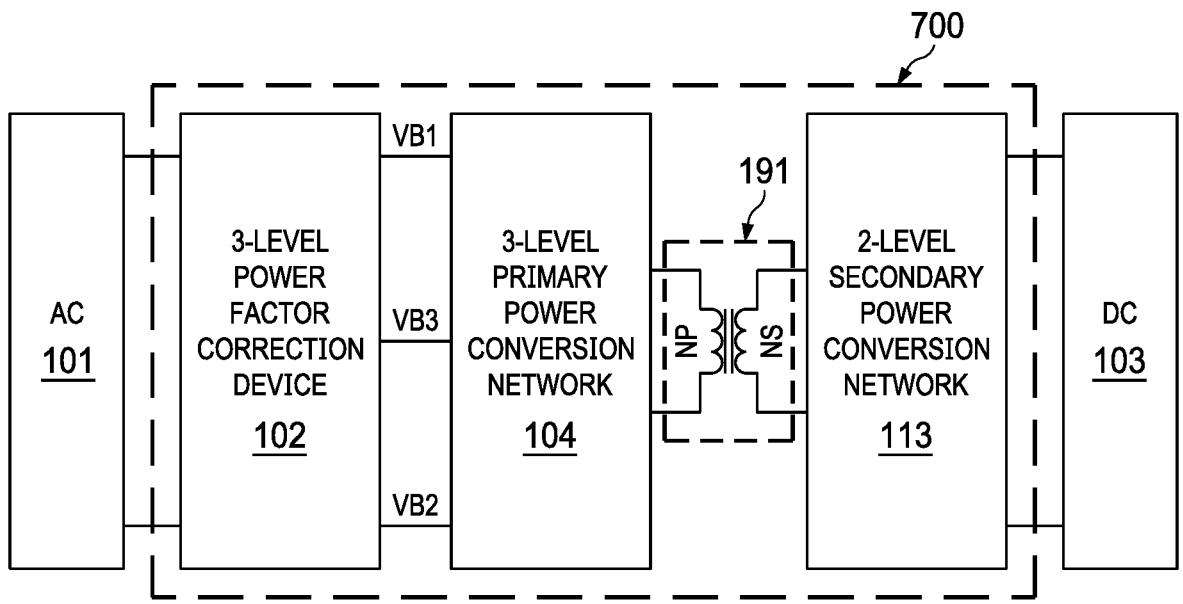
FIG. 7 illustrates a block diagram of a second implementation of the bidirectional power conversion system shown in FIG. 1 in accordance with various embodiments of the present disclosure.

FIG. 7 illustrates a block diagram of a second implementation of the bidirectional power conversion system shown in FIG. 1 in accordance with various embodiments of the present disclosure. The bidirectional power conversion system 700 is similar to the bidirectional power conversion system 200 shown in FIG. 2 except that the secondary power conversion network 113 is implemented as a two-level secondary power conversion network. The detailed structure of the two-level secondary power conversion network 113 will be described below with respect to FIGS. 8-9.

Figure 8:
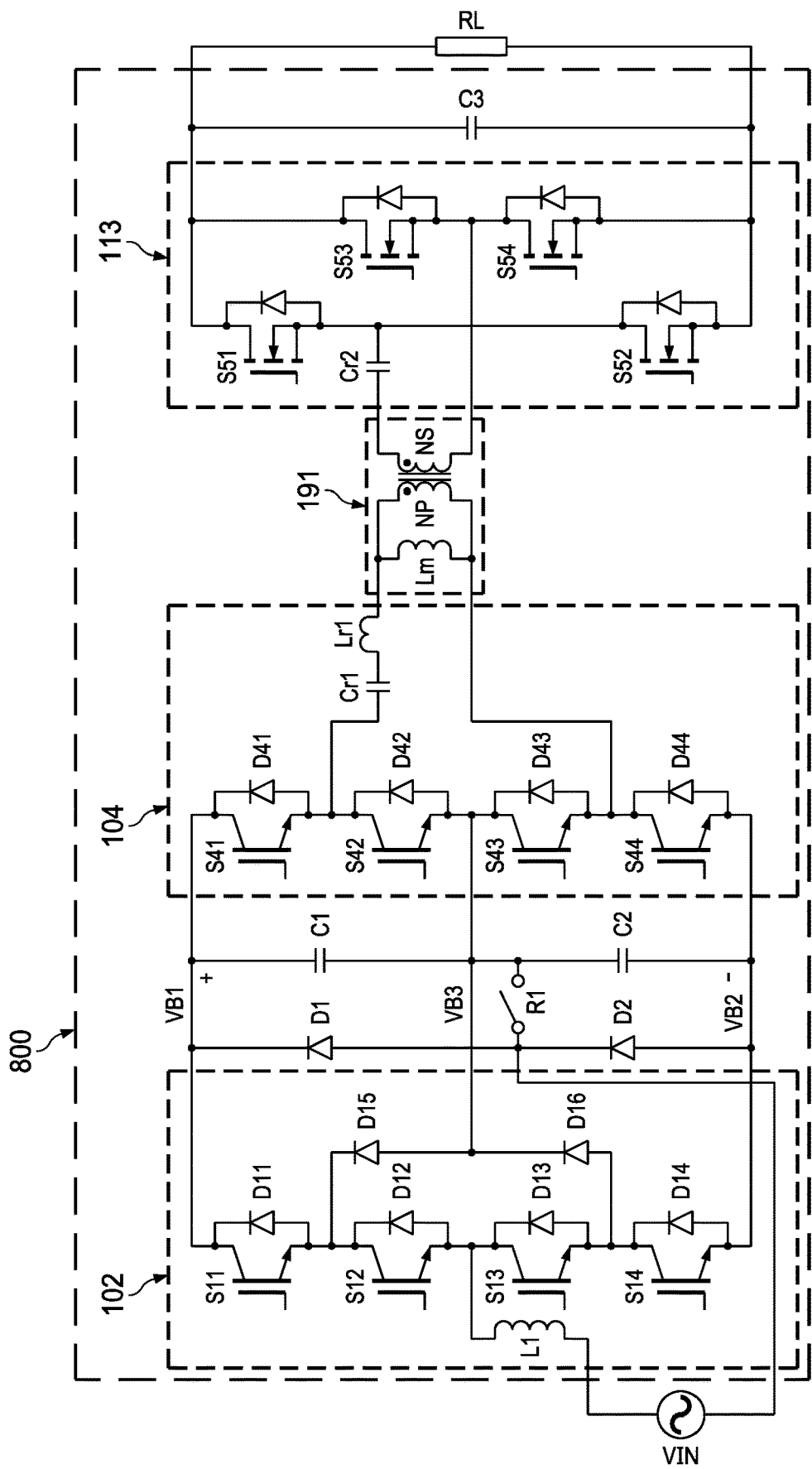
FIG. 8 illustrates a schematic diagram of a first implementation of the bidirectional power conversion system shown in FIG. 7 in accordance with various embodiments of the present disclosure.

FIG. 8 illustrates a schematic diagram of a first implementation of the bidirectional power conversion system shown in FIG. 7 in accordance with various embodiments of the present disclosure. The bidirectional power conversion system 800 comprises the three-level power factor correction device 102, the three-level primary power conversion network 104, the transformer 191 and the two-level secondary power conversion network 113 connected in cascade between the AC power source VIN and the DC load RL. The power conversion system 800 further comprises the relay R1 connected between the three-level power factor correction device 102 and the three-level primary power conversion network 104.

The three-level power factor correction device 102, the three-level primary power conversion network 104, the transformer 191 and the relay R1 have been discussed above with respect to FIGS. 3-5, and hence are not discussed again herein to avoid unnecessary repetition.

The two-level secondary power conversion network 113 comprises switches S51, S52, S53, S54 and a secondary resonant capacitor Cr2. As shown in FIG. 8, the switches S51 and S52 are connected in series across two terminals of an output capacitor C3. Likewise, the switches S53 and S54 are connected in series across the two terminals of the output capacitor C3. The common node of switches S51 and S52 is connected to a first terminal of the secondary winding NS through the secondary resonant capacitor Cr2. The common node of switches S53 and S54 is connected to a second terminal of the secondary winding NS directly.

The two-level secondary power conversion network 113 is able to convert an alternating polarity waveform received from the secondary winding NS of the transformer 191 to a single polarity waveform. The output capacitor C3 is employed to reduce the ripple components of the waveform generated by the two-level secondary power conversion network 113 and provide a steady DC voltage for the DC load RL.

Figure 9:
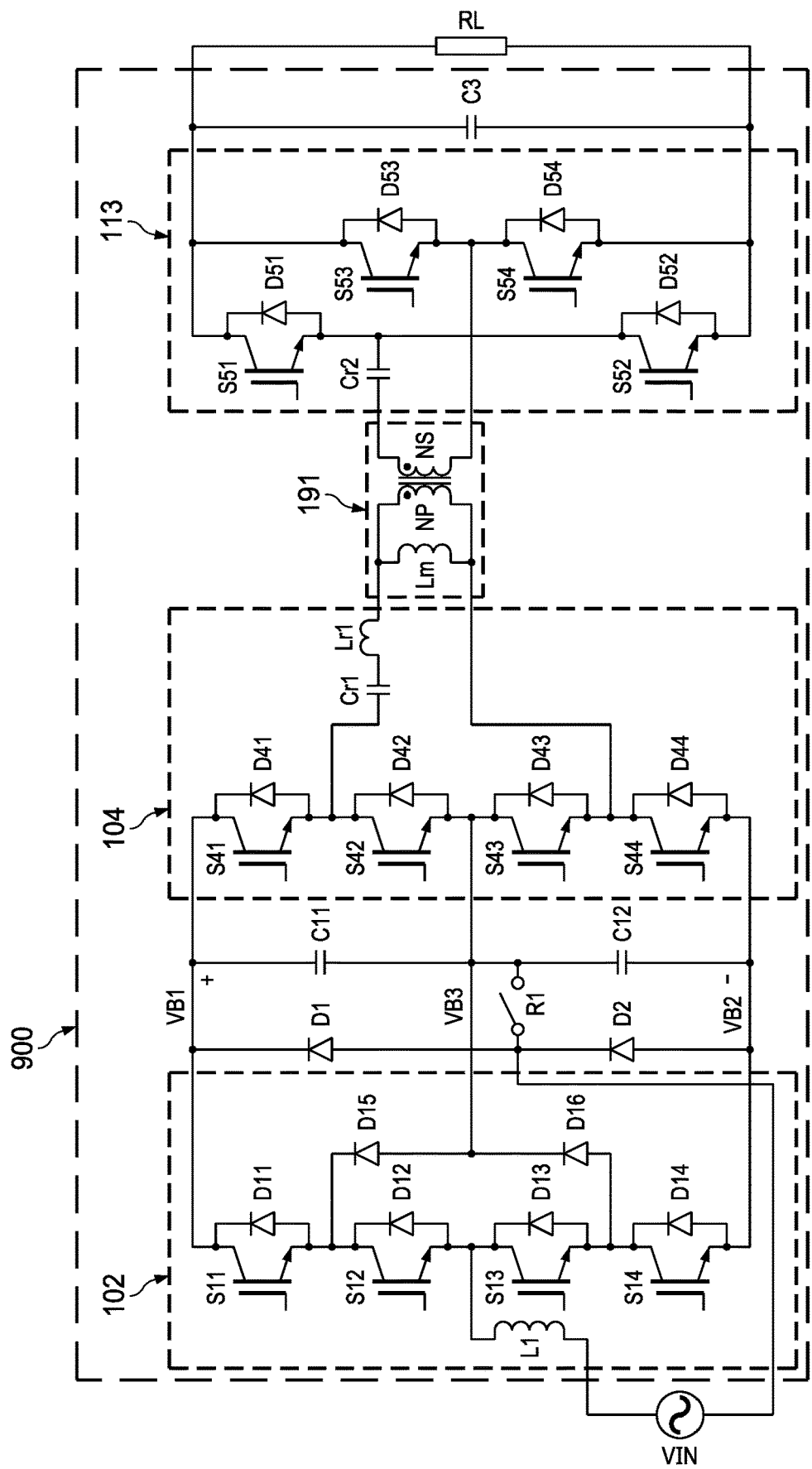
FIG. 9 illustrates a schematic diagram of a second implementation of the bidirectional power conversion system shown in FIG. 7 in accordance with various embodiments of the present disclosure.

FIG. 9 illustrates a schematic diagram of a second implementation of the bidirectional power conversion system shown in FIG. 7 in accordance with various embodiments of the present disclosure. The bidirectional power conversion system 900 is similar to the bidirectional power conversion system 800 shown in FIG. 8 except that the switching elements (switches S51-S54) of the secondary power conversion network 113 are implemented as IGBTs as shown in FIG. 9. Diodes D51-D54 are anti-parallel diodes, which are connected in parallel with their respective IGBT switches.

Figure 10:
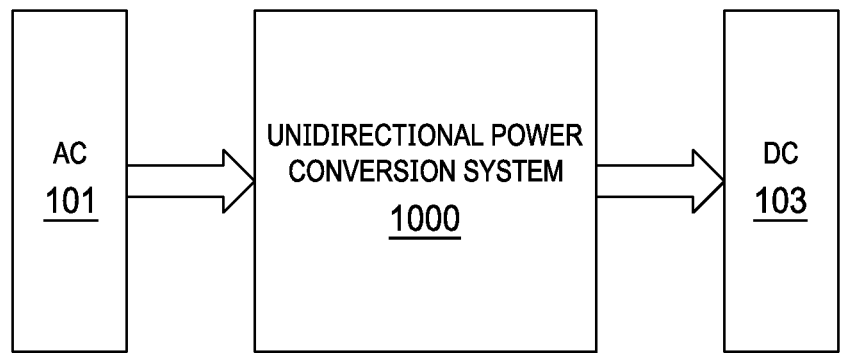
FIG. 10 illustrates a unidirectional power conversion system in accordance with various embodiments of the present disclosure.

FIG. 10 illustrates a unidirectional power conversion system in accordance with various embodiments of the present disclosure. The unidirectional power conversion system 1000 is connected between the AC element 101 and the DC element 103. Since the unidirectional power conversion system 1000 is coupled between the AC element 101 and the DC element 103, the AC element 101 is implemented as an AC power source, and the DC element 103 is implemented as a DC load. The unidirectional power conversion system 1000 only allows the power flowing from the AC power source to the DC load as indicated by the arrows shown in FIG. 10.

Figure 11:
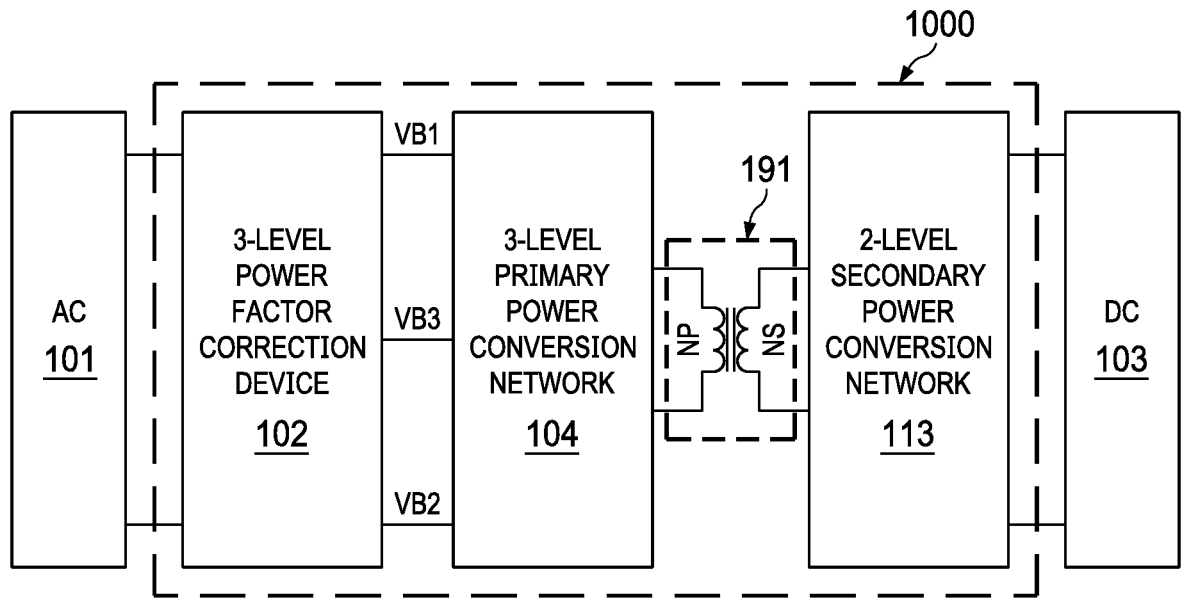
FIG. 11 illustrates a block diagram of the unidirectional power conversion system shown in FIG. 10 in accordance with various embodiments of the present disclosure.

FIG. 11 illustrates a block diagram of the unidirectional power conversion system shown in FIG. 10 in accordance with various embodiments of the present disclosure. The block diagram of the unidirectional power conversion system 1000 is similar to the block diagram of the bidirectional power conversion system 700 shown in FIG. 7 except that the two-level secondary power conversion network 113 is implemented as a diode rectifier. As a result of having a diode rectifier, the current can only flow from the AC element 101 (AC power source) to the DC element 103 (DC load).

Figure 12:
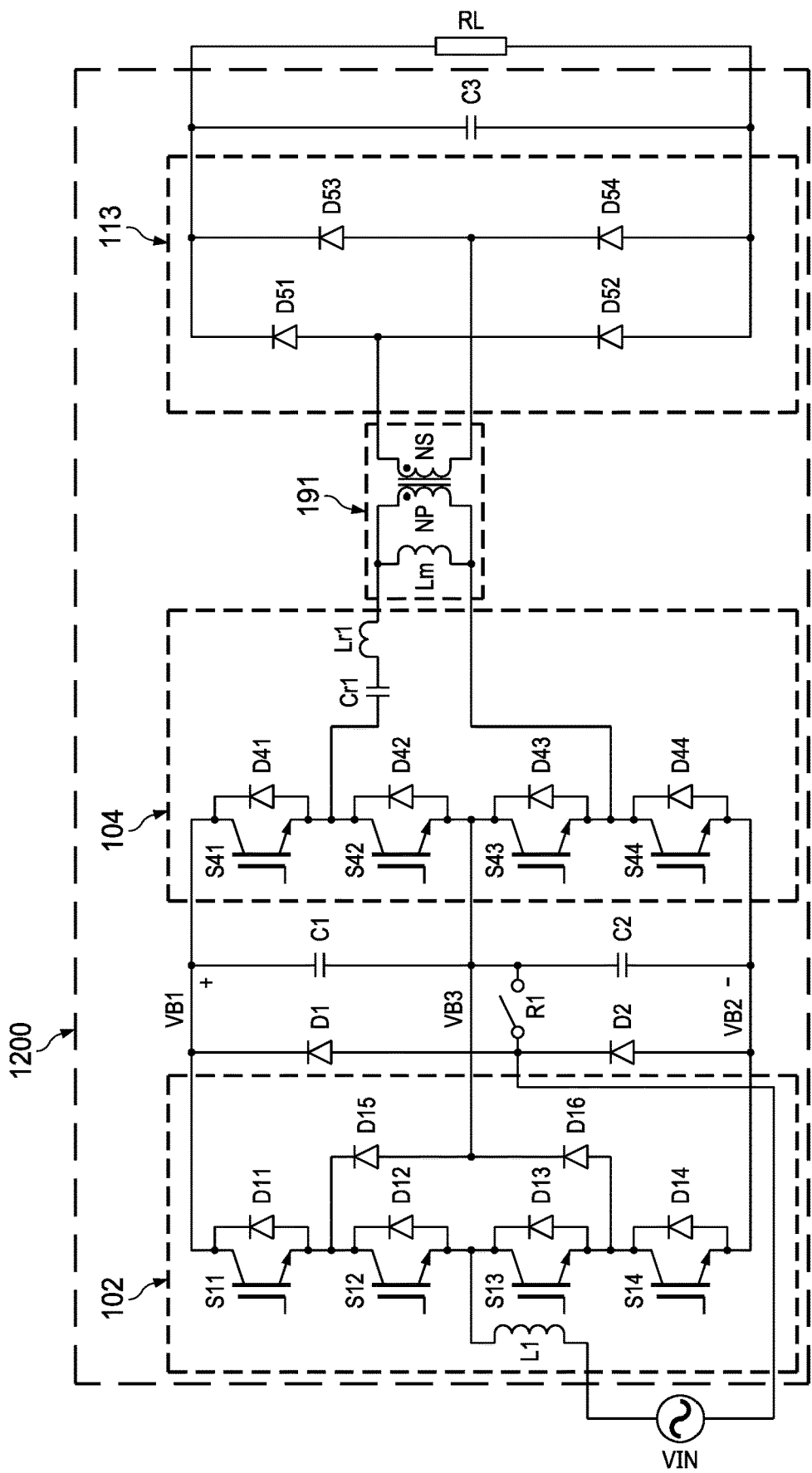
FIG. 12 illustrates a schematic diagram of the unidirectional power conversion system shown in FIG. 11 in accordance with various embodiments of the present disclosure.

FIG. 12 illustrates a schematic diagram of the unidirectional power conversion system shown in FIG. 11 in accordance with various embodiments of the present disclosure. The power conversion system 1200 comprises the three-level power factor correction device 102, the three-level primary power conversion network 104, the transformer 191 and the two-level secondary power conversion network 113 connected in cascade between the AC power source VIN and the DC load RL. The power conversion system 1200 further comprises a relay R1 connected between the three-level power factor correction device 102 and the three-level primary power conversion network 104.

The three-level power factor correction device 102, the three-level primary power conversion network 104, the transformer 191 and the relay R1 have been discussed above with respect to FIGS. 3-5, and hence are not discussed again herein to avoid unnecessary repetition.

The two-level secondary power conversion network 113 comprises diodes D51, D52, D53 and D54. As shown in FIG. 12, the diodes D51 and D52 are connected in series across two terminals of an output capacitor C3. Likewise, the diodes D53 and D54 are connected in series across the two terminals of the output capacitor C3. The common node of diodes D51 and D52 is connected to a first terminal of the secondary winding NS. The common node of diodes D53 and D54 is connected to a second terminal of the secondary winding NS.

The two-level secondary power conversion network 113 is able to convert an alternating polarity waveform received from the secondary winding NS of the transformer 191 to a single polarity waveform. The output capacitor C3 is employed to reduce the ripple components of the single polarity waveform and provide a steady DC voltage for the DC load RL.

Figure 13:
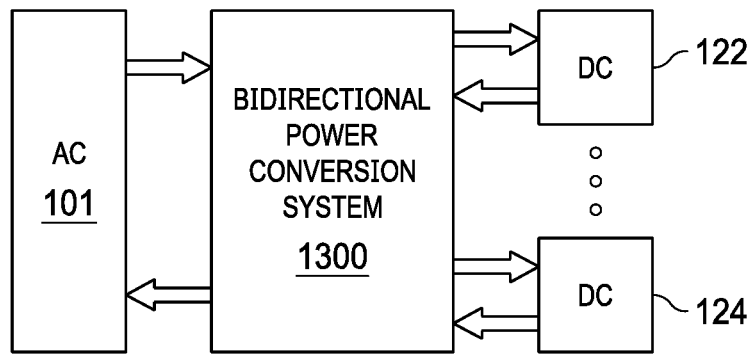
FIG. 13 illustrates a bidirectional multiple-port power conversion system in accordance with various embodiments of the present disclosure.

FIG. 13 illustrates a bidirectional multiple-port power conversion system in accordance with various embodiments of the present disclosure. The bidirectional multiple-port power conversion system 1300 is connected between an AC element 101 and a plurality of DC elements 122 and 124. Depending on different applications and design needs, the AC element 101 can be implemented as either an AC power source or an AC load. Likewise, the plurality of DC elements 122 and 124 can be implemented as either DC loads or DC power sources.

Throughout the description, the AC element 101 may be alternatively referred to as an AC power source 101 or an AC load 101 depending on different system configurations. Likewise, each of the plurality of DC elements 122 and 124 may be alternatively referred to as a DC load or a DC power source depending on different system configurations.

In some embodiments, when the bidirectional multiple-port power conversion system 1300 is configured to convert AC power into DC power, the AC element 101 is implemented as an AC power source from a utility grid. More particularly, the AC element 101 may be implemented as a single-phase AC power source. The plurality of DC elements 122 and 124 may be a plurality of DC loads such as battery packs, downstream power converters and the like. In some embodiments, the DC elements 122 and 124 may be the main battery and the auxiliary battery of an electric vehicle, respectively. The bidirectional multiple-port power conversion system 1300 shown in FIG. 13 may function as an electric vehicle charging converter.

In alternative embodiments, when the bidirectional multiple-port power conversion system 1300 is configured to convert DC power into DC power between different DC loads, one of the plurality of DC elements (e.g., DC element 122) functions as a DC power source, and another DC element (e.g., DC element 124) is configured as a DC load. The DC power source is able to provide power for the DC load through the bidirectional multiple-port power conversion system 1300. It should be noted that the DC power source (e.g., DC element 122) is capable of providing power for a plurality of DC loads (e.g., DC element 124) through the bidirectional multiple-port power conversion system 1300.

Furthermore, when the bidirectional multiple-port power conversion system 1300 is configured to convert DC power into AC power, at least one of the DC elements (e.g., DC element 122) can be implemented as a DC power source. The AC element 101 is implemented as an AC load. One (e.g., DC element 122) or a combination of the plurality of DC elements (e.g., DC elements 122 and 124) may provide power to the AC load 101.

In some embodiments, the bidirectional multiple-port power conversion system 1300 may comprise a transformer having a primary winding and a plurality of secondary windings. The bidirectional multiple-port power conversion system 1300 further comprises a power factor correction device and a primary power conversion network connected in cascade between the AC element 101 and the primary winding of the transformer. A plurality of secondary power conversion networks is connected between the plurality of secondary windings and the DC elements respectively. The detailed structure of the bidirectional multiple-port power conversion system 1300 will be described below with respect to FIG. 14.

In operation, the bidirectional multiple-port power conversion system 1300 may be configured as an AC/DC power conversion system. The AC element 101 is a single phase AC power source. The power factor correction device is configured such that the power factor of the bidirectional multiple-port power conversion system 1300 is adjusted to a level approximately equal to unity through adjusting the input current flowing into the power factor correction device. Furthermore, the power factor correction device is capable of varying its output voltage in a wide range. Such a wide range helps to regulate a main output voltage of the bidirectional multiple-port power conversion system 1300.

The primary power conversion network may be implemented as a three-level LLC resonant converter. In some embodiments, the three-level LLC resonant converter is able to operate at a switching frequency substantially equal to the resonant frequency of the three-level LLC resonant converter. As a result of having a three-level LLC resonant converter operating at a switching frequency substantially equal to the resonant frequency, the bidirectional multiple-port power conversion system 1300 is a high efficiency power conversion system.

The plurality of secondary power conversion networks are implemented as secondary rectifiers, each of which is able to convert an alternating polarity waveform received from a secondary winding of the transformer to a single polarity waveform.

In operation, the bidirectional multiple-port power conversion system 1300 may be configured as a DC/DC power conversion system. The AC element 101 is disconnected from the bidirectional multiple-port power conversion system 1300. One of the DC elements (e.g., DC element 122) is configured as a DC power source. At least one of the other DC elements (e.g., DC element 124) is configured as a DC load. The DC power source 122 is employed to provide power for the DC load 124 through the bidirectional multiple-port power conversion system 1300. In particular, the secondary power conversion network connected to the DC power source 122 is configured as a three-level inverting network or a full-bridge switching network. The secondary power conversion network connected to the DC load 124 is configured as a secondary rectifier. The power is transferred from the DC power source 122 to the DC load 124 through the full-bridge switching network, the transformer and the secondary rectifier.

In operation, the bidirectional multiple-port power conversion system 1300 may be configured as a DC/AC power conversion system. The AC element 101 is implemented as an AC load. At least one of the DC elements (e.g., DC element 122) is configured as a DC power source. The DC power source 122 is employed to provide power for the AC load 101 through the bidirectional multiple-port power conversion system 1300. In particular, the secondary power conversion network connected to the DC power source 122 is configured as three-level inverting network or a full-bridge switching network. The primary power conversion network is configured as a rectifier converting an alternating polarity waveform received from the primary winding of the transformer to a single polarity waveform, and establishing a DC voltage bus. The power factor correction device is configured as an inverter to convert the DC voltage on the DC voltage bus into an AC voltage for the AC load 101.

In operation, the bidirectional multiple-port power conversion system 1300 may be configured as a hybrid power conversion system. The AC element 101 is implemented as an AC load. At least one of the DC elements (e.g., DC element 122) is configured as a DC power source, and at least one of the other DC elements (e.g., DC element 124) is configured as a DC load. The DC power source 122 is employed to provide power for the AC load 101 and the DC load 124 simultaneously through the bidirectional multiple-port power conversion system 1300. In particular, the secondary power conversion network connected to the DC power source 122 is configured as a three-level inverting network or full-bridge switching network. The secondary power conversion network connected to the DC load 124 is configured as a secondary rectifier. The primary power conversion network is configured as a rectifier converting an alternating polarity waveform received from the primary winding of the transformer to a single polarity waveform, and establishing a DC voltage bus. The power factor correction device is configured as an inverter to convert the DC voltage on the DC voltage bus into an AC voltage for the AC load 101.

Figure 14:
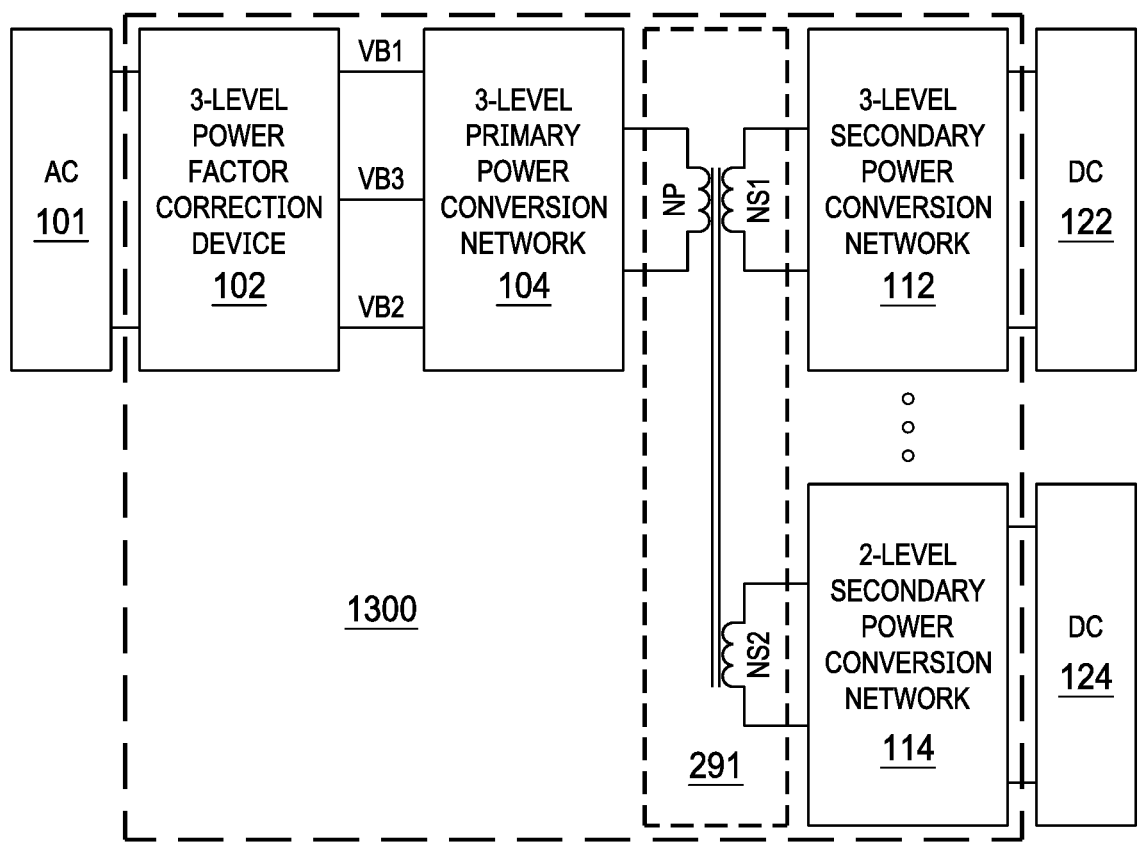
FIG. 14 illustrates a block diagram of the bidirectional multiple-port power conversion system shown in FIG. 13 in accordance with various embodiments of the present disclosure.

FIG. 14 illustrates a block diagram of the bidirectional multiple-port power conversion system shown in FIG. 13 in accordance with various embodiments of the present disclosure. The bidirectional multiple-port power conversion system 1300 comprises a three-level power factor correction device 102 and a three-level primary power conversion network 104 connected in cascade between the AC element 101 and a primary winding NP of a transformer 291. The bidirectional multiple-port power conversion system 1300 further comprises a plurality of secondary power conversion networks 112 and 114. As shown in FIG. 14, the three-level secondary power conversion network 112 is connected between the secondary winding NS1 and the DC element 122. The secondary power conversion network 114 is connected between the secondary winding NS2 and the DC element 124.

It should be recognized that while FIG. 14 illustrates the bidirectional multiple-port power conversion system 1300 with two secondary power conversion networks, the bidirectional multiple-port power conversion system 1300 could accommodate any number of secondary power conversion networks and their respective DC elements.

In some embodiments, the three-level power factor correction device 102 of the bidirectional multiple-port power conversion system 1300 is configured such that the power factor of the bidirectional multiple-port power conversion system 1300 is adjusted to a level approximately equal to unity through adjusting the input current flowing into the three-level power factor correction device 102. The three-level power factor correction device 102 may be implemented as any suitable power factor correction converters such as boost power factor correction rectifiers, Vienna rectifiers and the like. The detailed schematic diagram of the three-level power factor correction device 102 will be described below with respect to FIG. 16.

In some embodiments, the three-level primary power conversion network 104 is implemented as a primary side circuit of a three-level LLC resonant converter. More particularly, the three-level primary power conversion network 104 comprises the primary side switching network of the three-level LLC resonant converter and a resonant tank. In some embodiments, the three-level primary power conversion network 104 is configured as an unregulated power converter. The switching frequency of the plurality of switches of the three-level primary power conversion network 104 is equal to the resonant frequency of the resonant tank. Alternatively, depending on design needs and different applications, the switching frequency of the plurality of switches of the three-level LLC resonant converter may vary in a narrow range to help the bidirectional multiple-port power conversion system 1300 regulate one of the output voltages. The detailed schematic diagram of the three-level primary power conversion network 104 will be described below with respect to FIG. 16.

The transformer 291 provides electrical isolation between the primary side (side having 102 and 104) and the secondary side (side having 112 and 114) of the bidirectional multiple-port power conversion system 1300. In accordance with an embodiment, the transformer 291 may be formed of a primary transformer winding (e.g., winding NP) and a plurality of secondary transformer windings (e.g., windings NS1 and NS2) as shown in FIG. 14. It should be noted that the transformer illustrated herein and throughout the description are merely examples, which should not unduly limit the scope of the claims. One of ordinary skill in the art would recognize many variations, alternatives, and modifications. For example, the transformer 291 may further comprise a variety of bias windings and gate drive auxiliary windings.

The secondary power conversion network (e.g., secondary power conversion networks 112 and 114) converts an alternating polarity waveform received from the secondary winding of the transformer 291 to a single polarity waveform. The secondary power conversion network may be formed of four switching elements connected in series. Alternatively, the secondary power conversion network may be formed of two pairs of switching elements such as n-type metal oxide semiconductor (NMOS) transistors. Alternatively, the secondary power conversion network may be formed of two pairs of diodes. Furthermore, the secondary power conversion network may be formed of a combination of switching elements and diodes. The detailed operation and structure of the secondary power conversion network will be discussed below with respect to FIG. 16.

It should be noted that three-level LLC resonant converter is merely an example, which should not unduly limit the scope of the claims. One of ordinary skill in the art would recognize many variations, alternatives, and modifications. The primary power conversion network 104 can be implemented as any suitable isolated converters such as flyback converters, forward converters, push-pull converters, half-bridge converters, full-bridge converters, any combinations thereof and the like.

Figure 15:
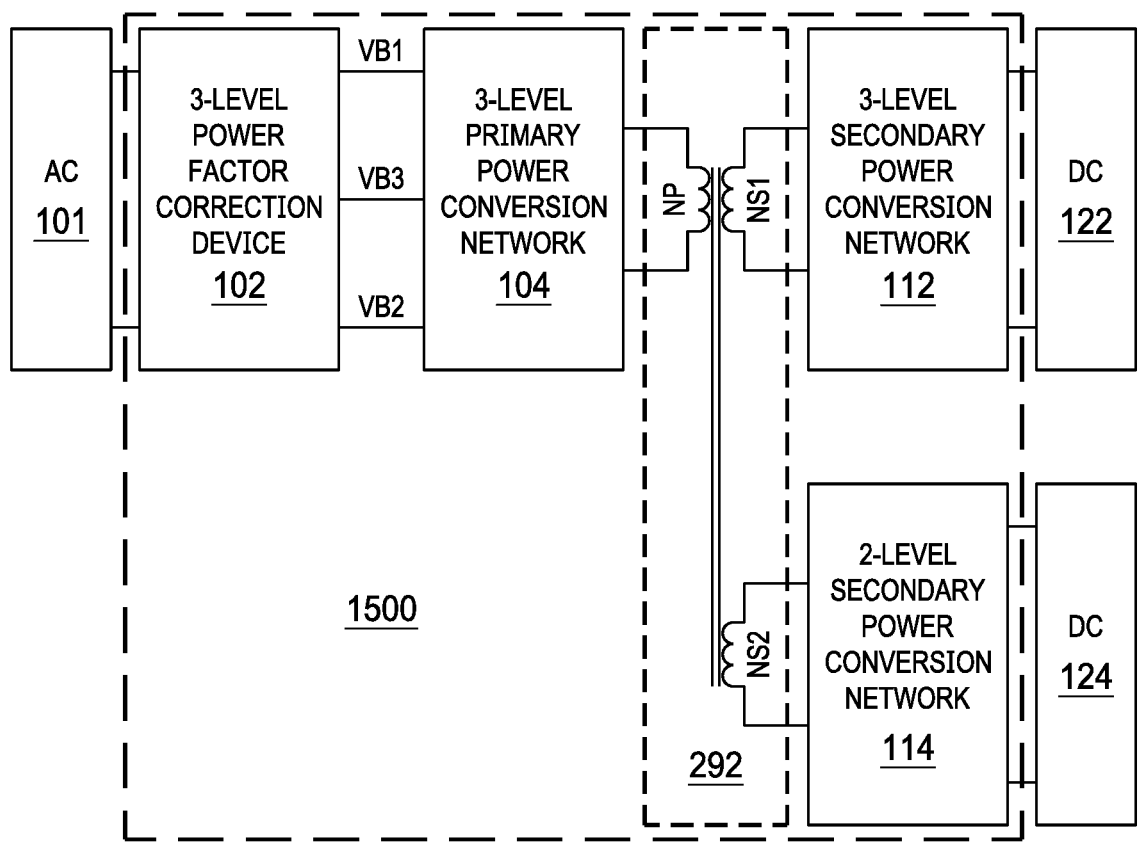
FIG. 15 illustrates a block diagram of a first implementation of a bidirectional three-port power conversion system in accordance with various embodiments of the present disclosure.

FIG. 15 illustrates a block diagram of a first implementation of a bidirectional three-port power conversion system in accordance with various embodiments of the present disclosure. The bidirectional three-port power conversion system 1500 is similar to the bidirectional multiple-port power conversion system 1300 shown in FIG. 14 except that only two secondary power conversion networks are connected to a transformer 292.

As shown in FIG. 15, a first port of the bidirectional three-port power conversion system 1500 comprises the three-level power factor correction device 102 and the three-level primary power conversion network 104 connected in cascade between the AC element 101 and the primary winding NP of the transformer 292. A second port comprises a three-level secondary power conversion network 112 connected between the secondary winding NS1 of the transformer 292 and the DC element 122. A third port comprises a two-level secondary power conversion network 114 connected between the secondary winding NS2 of the transformer 292 and the DC element 124.

In some embodiments, the DC voltage applied to the DC element 122 is regulated through adjusting the voltage on the bipolar DC bus (VB1-VB3). In alternative embodiments, the DC voltage applied to the DC element 122 is regulated mainly through adjusting the voltage on the bipolar DC bus (VB1-VB3) and partially through varying the switching frequency of the three-level primary power conversion network 104 in a narrow range (e.g., +1-5% of the resonant frequency of the resonant tank).

In some embodiments, the DC voltage applied to the DC element 124 is regulated through configuring the two-level secondary power conversion network 114 as a linear regulator or a boost converter. Configuring the two-level secondary power conversion network 114 as a linear regulator or a boost converter will be described below with respect to FIGS. 19-20. In alternative embodiments, the DC voltage applied to the DC element 124 is regulated through adding a power regulator (not shown) between the two-level secondary power conversion network 114 and the DC element 124. The power regulator functions as a post regulator, which is well known in the art, and hence is not discussed.

Figure 16:
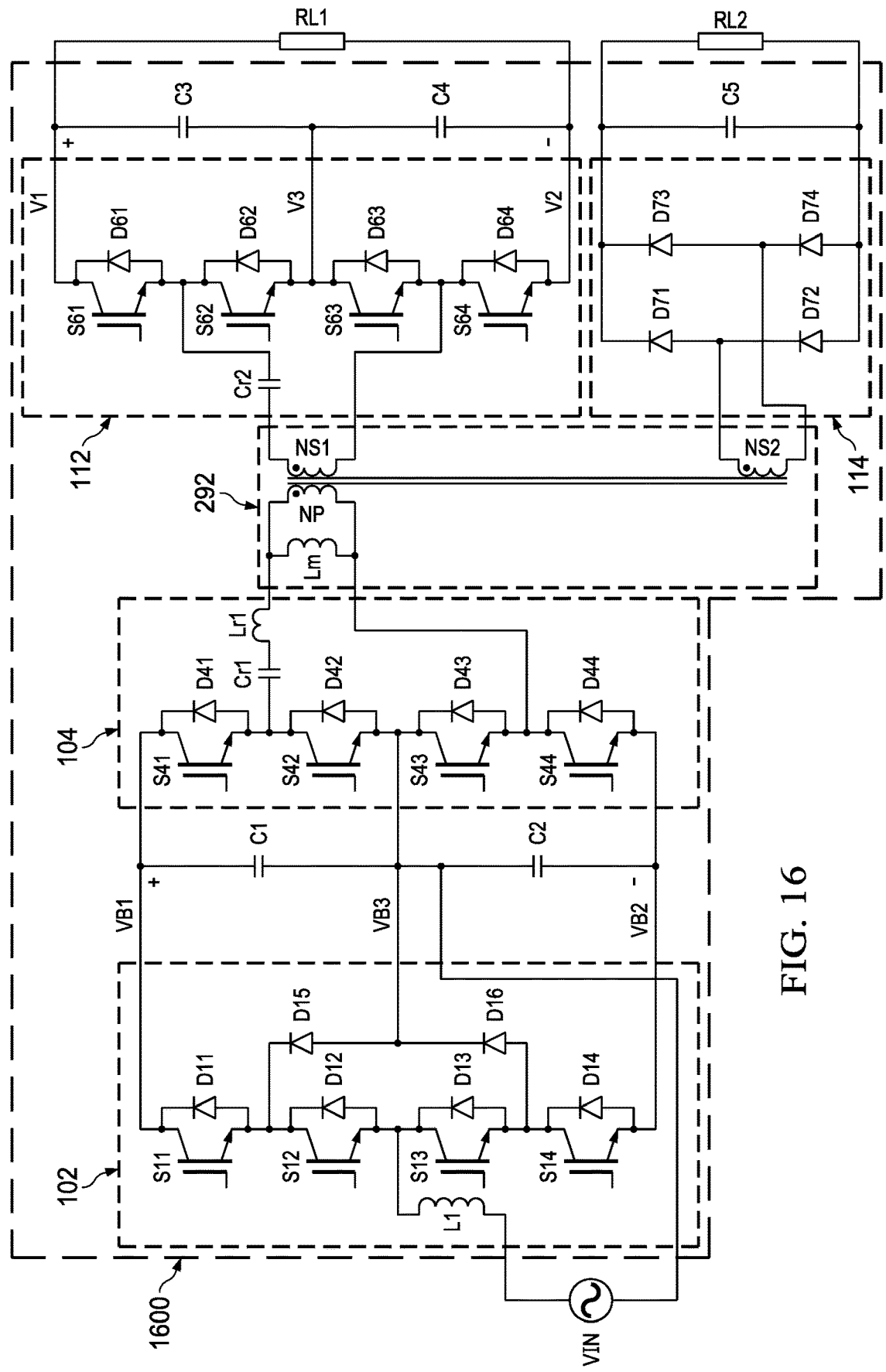
FIG. 16 illustrates a schematic diagram of a first implementation of the bidirectional three-port power conversion system shown in FIG. 15 in accordance with various embodiments of the present disclosure.

FIG. 16 illustrates a schematic diagram of a first implementation of the bidirectional three-port power conversion system shown in FIG. 15 in accordance with various embodiments of the present disclosure. The bidirectional three-port power conversion system 1600 comprises the three-level power factor correction device 102, the three-level primary power conversion network 104, the transformer 292, the three-level secondary power conversion network 112 and the two-level secondary power conversion network 114. The three-level power factor correction device 102 is implemented as an NPC boost power factor correction converter. The three-level primary power conversion network 104 comprises a primary side network of a three-level LLC resonant converter.

The detailed structures and operating principles of the three-level power factor correction device 102, the three-level primary power conversion network 104, the transformer 292 and the three-level secondary power conversion network 112 have been described above, and hence are not discussed herein. The two-level secondary power conversion network 114 is a diode rectifier comprising diodes D71-D74. An output capacitor C5 is employed to reduce the ripple components of the voltage applied to the second load RL2. The diode rectifier is well known in the art, and hence is not discussed herein.

In some embodiments, the first load RL1 is a main battery of an electric vehicle. The main battery may be a lithium-ion polymer battery. The rated voltage of the main battery is a range from about 240 V to about 500 V. The power of the main battery is in a range from about 6 KW to about 20 KW. In some embodiments, the second load RL2 is an auxiliary battery of an electric vehicle. The auxiliary battery may be a lithium-ion polymer battery. The rated voltage of the auxiliary battery is in a range from about 9 V to about 16 V.

Figure 17:
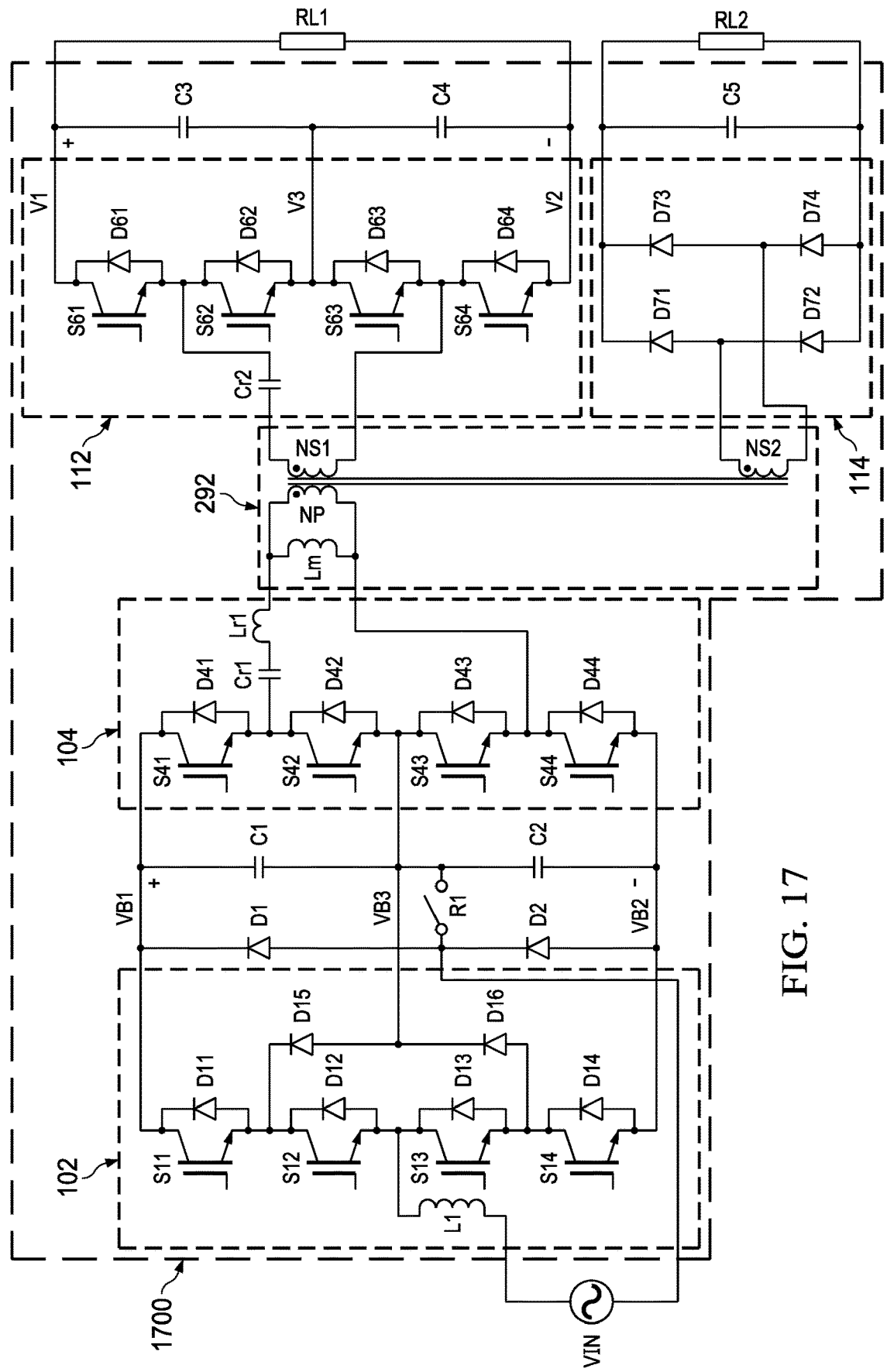
FIG. 17 illustrates a schematic diagram of a second implementation of the bidirectional three-port power conversion system shown in FIG. 15 in accordance with various embodiments of the present disclosure.

FIG. 17 illustrates a schematic diagram of a second implementation of the bidirectional three-port power conversion system shown in FIG. 15 in accordance with various embodiments of the present disclosure. The bidirectional three-port power conversion system 1700 shown in FIG. 17 is similar to that shown in FIG. 16 except that a voltage doubler circuit is included in the bidirectional three-port power conversion system 1700. As described above with respect to FIG. 5, the relay R1 is employed to form a voltage doubler when necessary.

Figure 18:
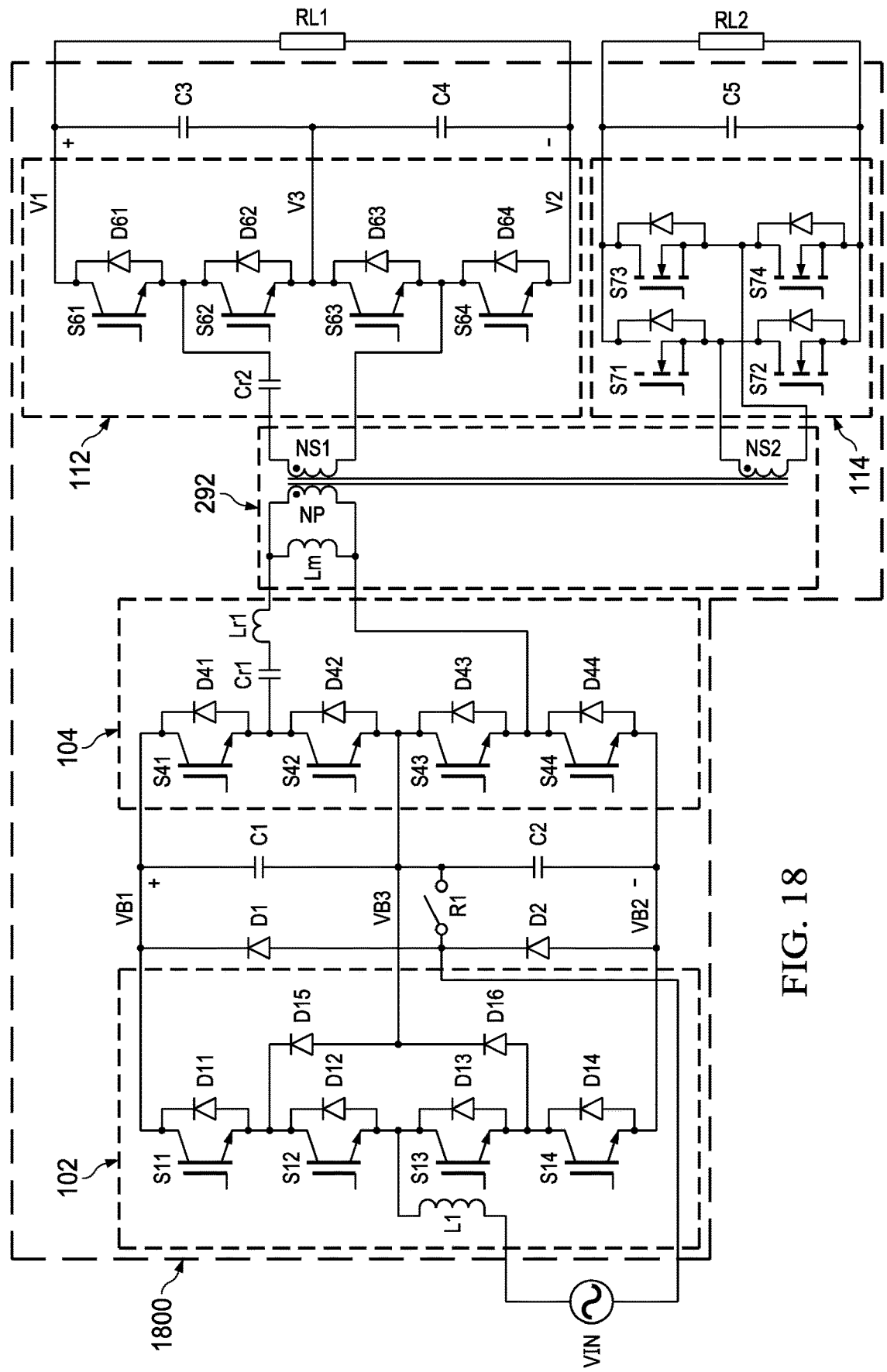
FIG. 18 illustrates a schematic diagram of a third implementation of the bidirectional three-port power conversion system shown in FIG. 15 in accordance with various embodiments of the present disclosure.

FIG. 18 illustrates a schematic diagram of a third implementation of the bidirectional three-port power conversion system shown in FIG. 15 in accordance with various embodiments of the present disclosure. The bidirectional three-port power conversion system 1800 shown in FIG. 18 is similar to that shown in FIG. 17 except that the diodes of the two-level secondary power conversion network 114 have been replaced by respective switches S71-S74. In operation, the gates of the switches S71-S74 are controlled so that the switches S71-S74 emulate the operation of the respective diodes shown in FIG. 17. One advantageous feature of having the two-level secondary power conversion network 114 shown in FIG. 18 is that the switches S71-S74 can help to save the conduction losses caused by the forward voltage drop of the diodes D71-D74, thereby improving the efficiency of the bidirectional three-port power conversion system 1800.

Figure 19:
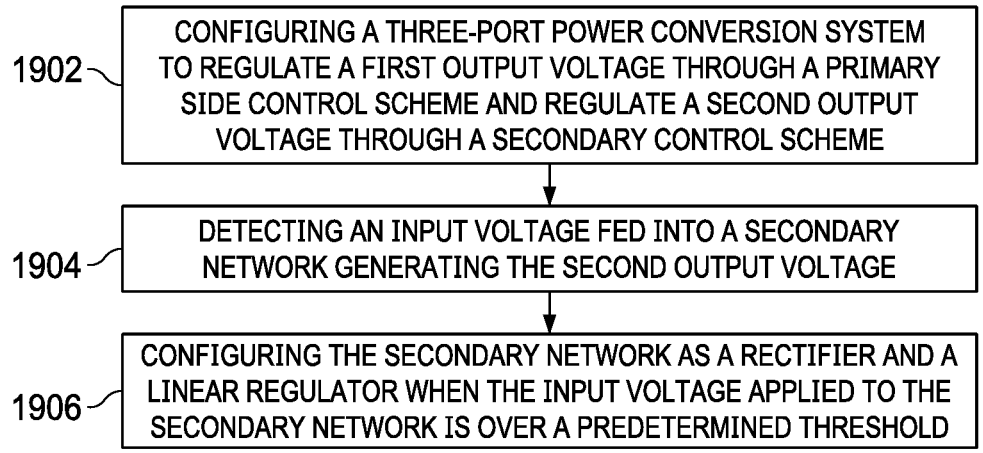
FIG. 19 illustrates a flow chart of a method for controlling the bidirectional three-port power conversion system shown in FIG. 18 in accordance with various embodiments of the present disclosure.

FIG. 19 illustrates a flow chart of a method for controlling the bidirectional three-port power conversion system shown in FIG. 18 in accordance with various embodiments of the present disclosure. This flowchart shown in FIG. 19 is merely an example, which should not unduly limit the scope of the claims. One of ordinary skill in the art would recognize many variations, alternatives, and modifications. For example, various steps illustrated in FIG. 19 may be added, removed, replaced, rearranged and repeated.

A bidirectional three-port power conversion system comprises a power factor correction device and an isolated power converter having three ports. A first port is connected to the power factor correction device through a primary power conversion network. The primary power conversion network may be implemented as a three-level LLC power converter. A second port is connected to a first DC load through a first secondary power conversion network. The first secondary power conversion network functions as a rectifier. A third port is connected to a second DC load through a second secondary power conversion network. The second secondary power conversion network is implemented as a rectifier.

In operation, the voltage applied to the first DC load is regulated mainly through adjusting the output voltage of the power factor correction device in a wide range and partially through adjusting the switching frequency of the three-level LLC converter in a narrow range. It should be noted that the regulation of the LLC resonant converter may be achieved through a variety of control methods such as PWM control mechanisms, phase modulation control mechanisms and/or frequency modulation control mechanisms. The control mechanisms of LLC resonant converters above are well known in the art, and hence are not discussed in detail herein to avoid unnecessary repetition.

At step 1902, a three-port power conversion system is employed to convert an AC voltage from a single-phase ac source into a first DC voltage for a first DC load and a second DC voltage for a second DC load. In some embodiments, the first DC load is a main battery of an electric vehicle. The second DC load is an auxiliary battery of the electric vehicle. The primary side of the three-port power conversion system comprises a power factor correction device and an LLC resonant converter. The first DC load is connected to the secondary side of the three-port power conversion system through a first rectifier apparatus. The second DC load is connected to the secondary side of the three-port power conversion system through a second rectifier apparatus. The voltage applied to the first DC load is regulated through a primary side control scheme. For example, the voltage applied to the first DC load is regulated through adjusting the output voltage of the power factor correction device in a wide range. The voltage applied to the second DC load is regulated through a secondary control scheme described below.

At step 1904, a suitable voltage sensor detects an input voltage fed into the second rectifier apparatus. A controller is employed to compare the detected input voltage with a predetermined voltage threshold.

At step 1906, the second rectifier apparatus is configured as both a rectifier and a linear regulator when the input voltage applied to the second rectifier apparatus is over the predetermined voltage threshold. As a linear regulator, the output voltage of the linear regulator is regulated through controlling the voltage drop across the switches of the second rectifier apparatus. One advantageous feature of configuring the second rectifier apparatus as a linear regulator is the second rectifier apparatus is able to generate a noise-free voltage suitable for DC loads sensitive to power supply noise.

Figure 20:
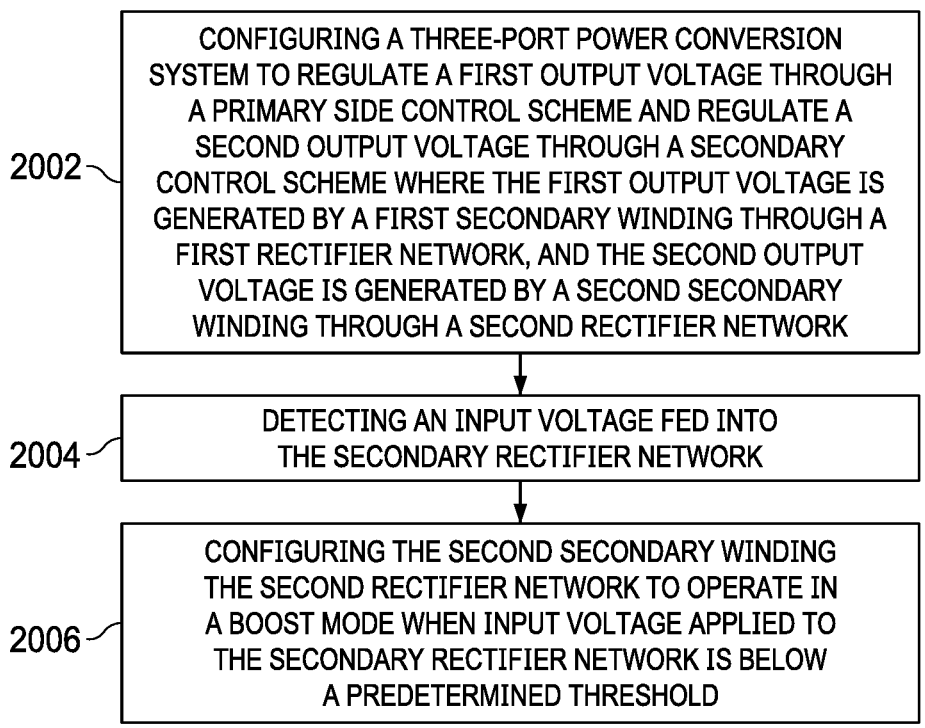
FIG. 20 illustrates a flow chart of yet another method for controlling the bidirectional three-port power conversion system shown in FIG. 18 in accordance with various embodiments of the present disclosure.

FIG. 20 illustrates a flow chart of yet another method for controlling the bidirectional three-port power conversion system shown in FIG. 18 in accordance with various embodiments of the present disclosure. This flowchart shown in FIG. 20 is merely an example, which should not unduly limit the scope of the claims. One of ordinary skill in the art would recognize many variations, alternatives, and modifications. For example, various steps illustrated in FIG. 20 may be added, removed, replaced, rearranged and repeated.

Referring back to FIG. 18, the three-level primary power conversion network 104 and the two-level secondary power conversion network 114 may is configured to operate in a boost converter mode. During the boost converter mode, the regulation of the output voltage of the two-level secondary power conversion network 114 is achieved through forcing the LLC resonant converter to operate in a manner similar to a boost converter. In particular, at the beginning of each switching period, switches S72 and S74 are simultaneously turned on and remain the on-state for a predetermined time period. Throughout the description, the predetermined time period is alternatively referred to as a boost period. During the boost period, switches S71 and S73 are turned off to prevent shoot-through.

During the boost period, the three-level primary power conversion network 104 may operate in three different operating modes. In a first operating mode, during the boost period, switches S41 and S44 are in the on-state. The turned-on switches S41 and S44 lead to a first positive voltage applied to the input terminals of the resonant tank. At the same time, the turned-on switches S72 and S74 may short the secondary side winding of the transformer 292. Since the secondary side voltage of the transformer 292 is approximately equal to zero during the boost period, the reflected voltage at the primary side of the transformer 292 is approximately equal to zero. As a result, the input voltage is directly applied to the resonant tank. In response to such a voltage applied to the resonant tank, the current flowing through the resonant inductor Lr1 ramps up quickly in a manner similar to the current flowing through a boost inductor during the on period of a boost converter.

In a second operating mode, during the boost period, switches S41 and S43 are in the on-state. The turned-on switches S41 and S43 lead to a second positive voltage applied to the input terminals of the resonant tank. The second positive voltage is about one half of the first positive voltage described above. Similar to the first operating mode, in response to the second positive voltage applied to the input terminals of the resonant tank, the current flowing through the resonant inductor Lr1 ramps up quickly in a manner similar to the current flowing through a boost inductor during the on period of a boost converter.

In a third operating mode, during the boost period, switches S42 and S44 are in the on-state. The turned-on switches S42 and S44 lead to a third positive voltage applied to the input terminals of the resonant tank. The third positive voltage is about one half of the first positive voltage. Similar to the first operating mode, in response to the third positive voltage applied to the input terminals of the resonant tank, the current flowing through the resonant inductor Lr1 ramps up quickly in a manner similar to the current flowing through a boost inductor during the on period of a boost converter.

The energy is accumulated in the resonant inductor Lr1. During a subsequent time period, the accumulated energy is released to the output of the two-level secondary power conversion network 114. As a result, the output voltage of the two-level secondary power conversion network 114 is boosted to a higher level.

At step 2002, a three-port power conversion system is employed to convert an AC voltage from a single-phase ac source into a first DC voltage for a first DC load and a second DC voltage for a second DC load. In some embodiments, the first DC load is a main battery of an electric vehicle. The second DC load is an auxiliary battery of the electric vehicle. The primary side of the three-port power conversion system comprises a power factor correction device and an LLC resonant converter. The first DC load is connected to the secondary side of the three-port power conversion system through a first rectifier network. The second DC load is connected to the secondary side of the three-port power conversion system through a second rectifier network.

At step 2004, a suitable voltage sensor detects an input voltage fed into the second rectifier network.

At step 2006, after the input voltage fed into the second rectifier network is below a predetermined voltage threshold, the low side switches of the second rectifier network are turned on simultaneously so as to short the secondary winding connected to the second rectifier network. As a result of having a shorted secondary winding, the LLC resonant converter operates in a boost mode, and the output voltage of the second rectifier network is able to generate a higher voltage.

Figure 21:
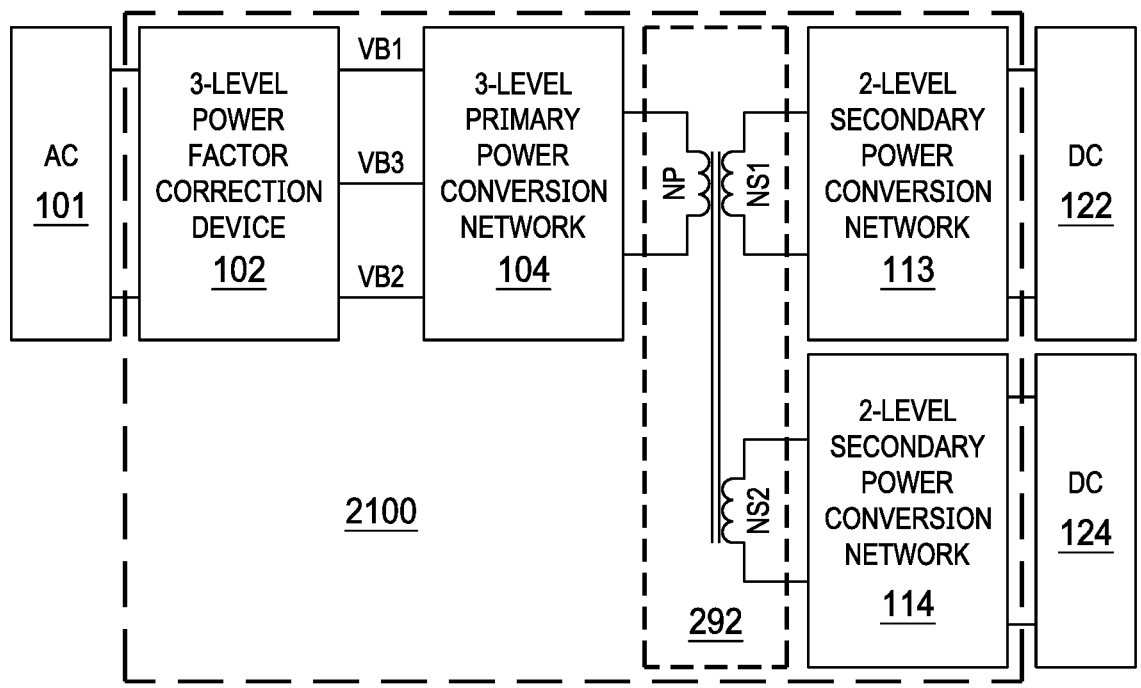
FIG. 21 illustrates a block diagram of a second implementation of the bidirectional three-port power conversion system in accordance with various embodiments of the present disclosure.

FIG. 21 illustrates a block diagram of a second implementation of the bidirectional three-port power conversion system in accordance with various embodiments of the present disclosure. The bidirectional three-port power conversion system 2100 shown in FIG. 21 is similar to that shown in FIG. 15 except that the secondary power conversion network connected to the first DC load 122 is implemented as a two-level secondary power conversion network 113.

Figure 22:
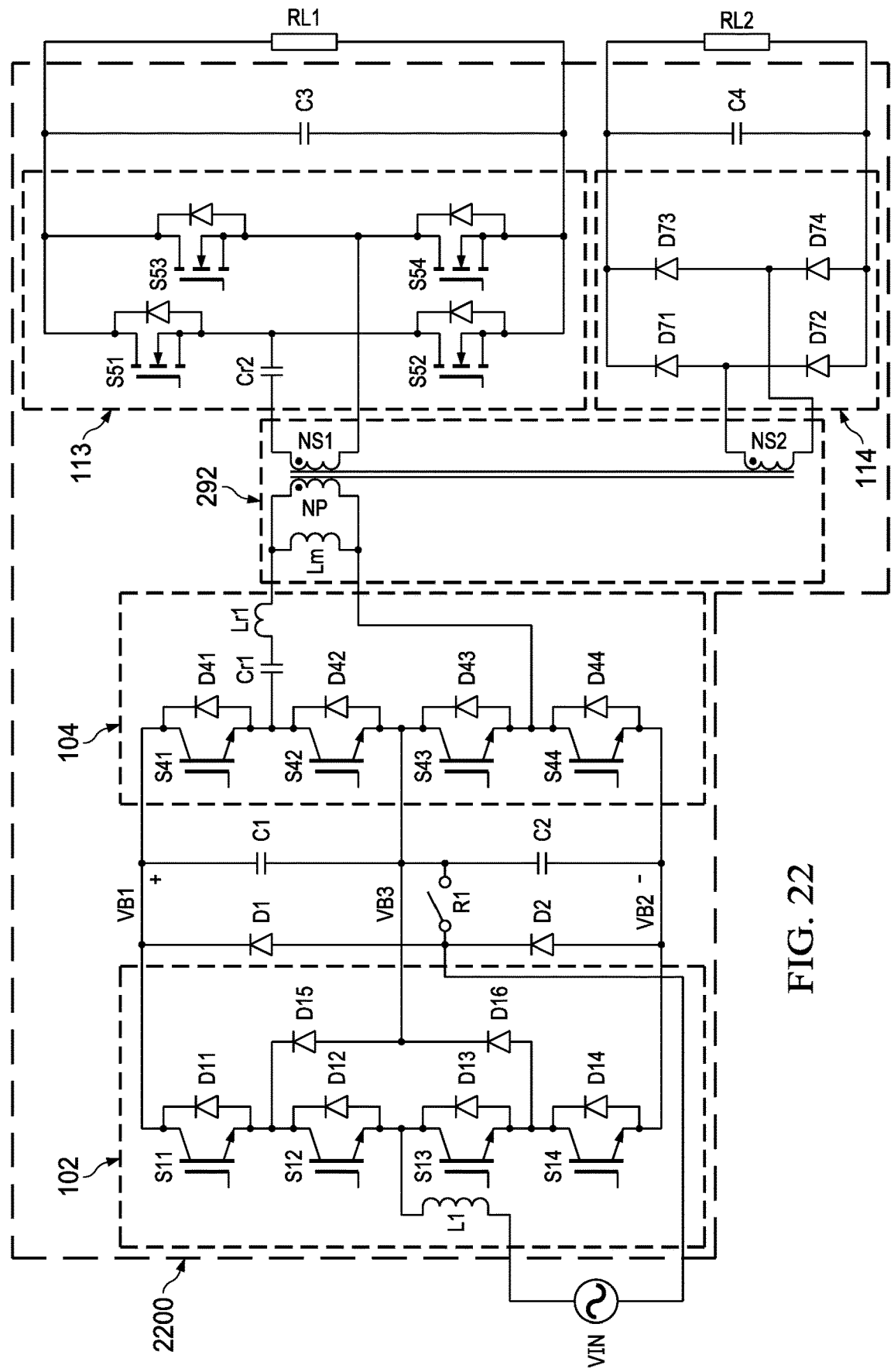
FIG. 22 illustrates a schematic diagram of a first implementation of the bidirectional three-port power conversion system shown in FIG. 21 in accordance with various embodiments of the present disclosure.

FIG. 22 illustrates a schematic diagram of a first implementation of the bidirectional three-port power conversion system shown in FIG. 21 in accordance with various embodiments of the present disclosure. The bidirectional three-port power conversion system 2200 shown in FIG. 22 is similar to that shown in FIG. 17 except that the first secondary power conversion network 113 is implemented as a two-level secondary power conversion network. As shown in FIG. 22, switches S51 and S52 are connected in series across the two terminals of the output capacitor C3. Switches S53 and S54 are connected in series across the two terminals of the output capacitor C3. A common node of switches S51 and S52 is connected to a first terminal of the secondary winding NS1 through a resonant capacitor Cr2. A common node of switches S53 and S54 is connected to a second terminal of the secondary winding NS1 directly.

Figure 23:
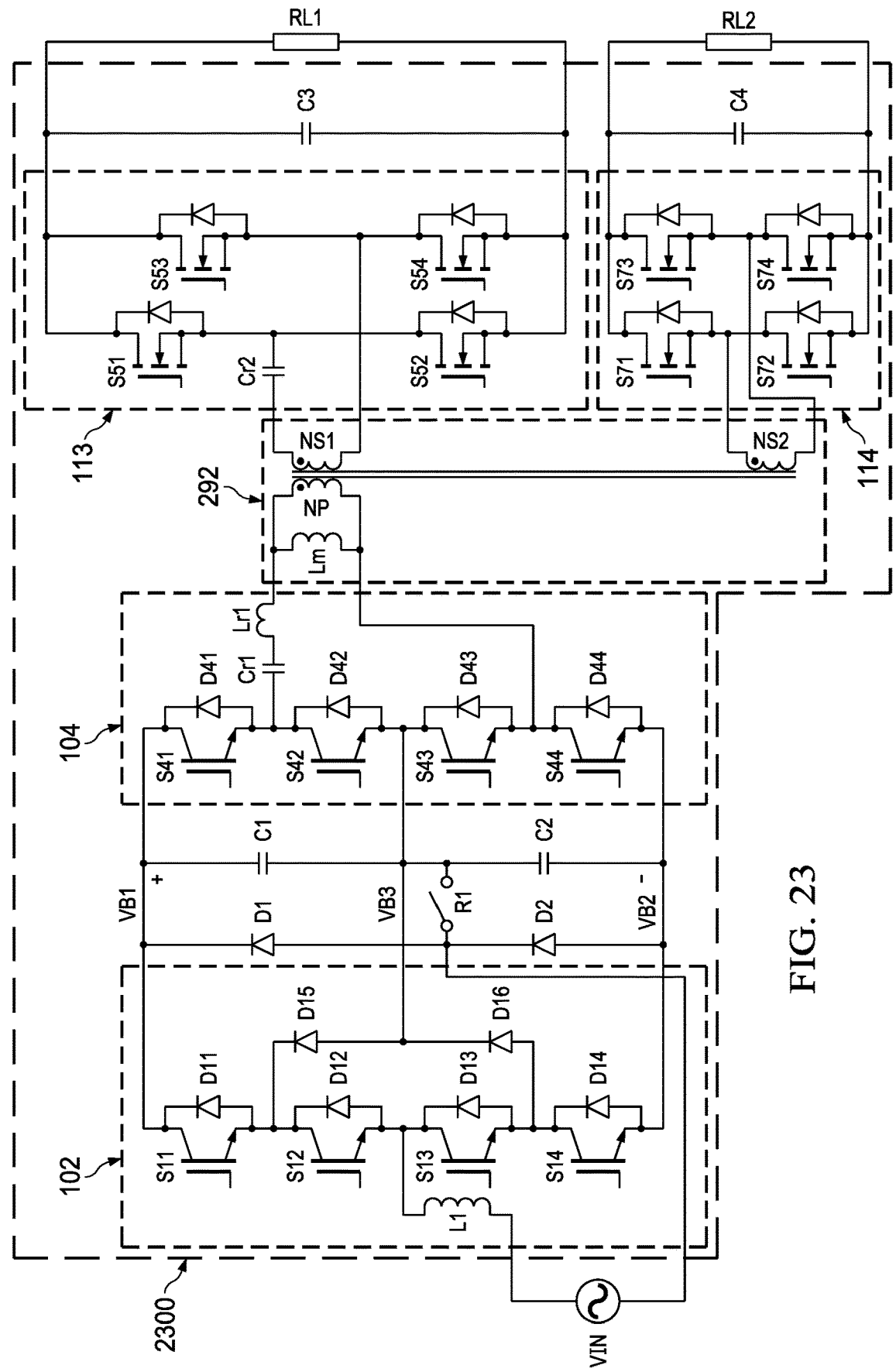
FIG. 23 illustrates a schematic diagram of a second implementation of the bidirectional three-port power conversion system shown in FIG. 21 in accordance with various embodiments of the present disclosure.

FIG. 23 illustrates a schematic diagram of a second implementation of the bidirectional three-port power conversion system shown in FIG. 21 in accordance with various embodiments of the present disclosure. The bidirectional three-port power conversion system 2300 shown in FIG. 23 is similar to that shown in FIG. 22 except that except that the diodes of the secondary power conversion network 114 have been replaced by respective switches S71-S74. In operation, the gates of the switches S71-S74 are controlled so that the switches S71-S74 emulate the operation of the respective diodes shown in FIG. 22. One advantageous feature of having the rectifier shown in FIG. 23 is that the switches S71-S74 can help to save the conduction losses caused by the forward voltage drop of the diodes.

Figure 24:
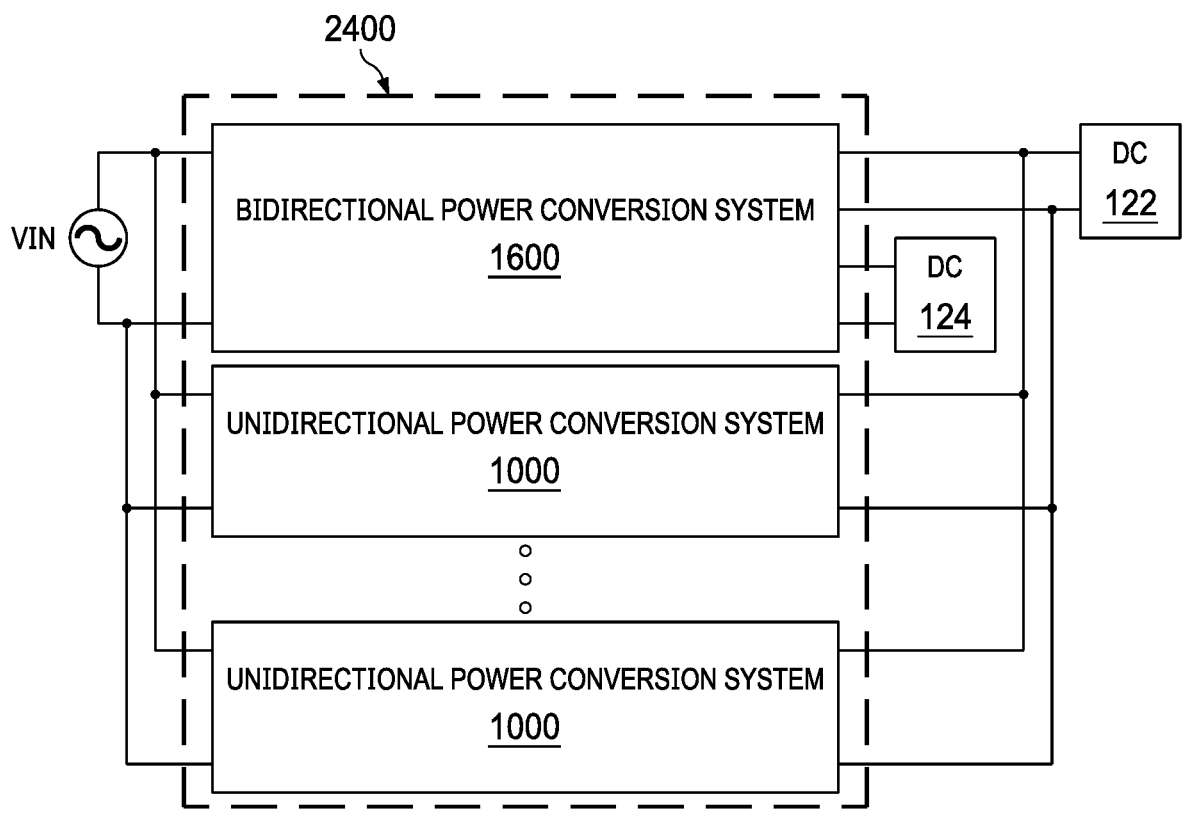
FIG. 24 illustrates a block diagram of a modular bidirectional power conversion system in accordance with various embodiments of the present disclosure.

FIG. 24 illustrates a block diagram of a modular bidirectional power conversion system in accordance with various embodiments of the present disclosure. The modular bidirectional power conversion system 2400 comprises a plurality of power modules connected in parallel between the AC power source VIN and the DC loads. At least one power module may be implemented as the bidirectional three-port power conversion system 1600 shown in FIG. 16. The other power modules are implemented as the unidirectional power conversion system 1000 shown in FIGS. 10-12. The bidirectional three-port power conversion system 1600 converts AC power into DC power and provides a first DC voltage for the first DC load 122, and a second DC voltage for the second DC load 124. The unidirectional power conversion system 1000 converts AC power into DC power and provides a first DC voltage for the first DC load 122. When the modular bidirectional power conversion system 2400 is configured as a DC/AC power conversion system, the first DC load 122 functions as a DC power source. The energy is transferred from the DC power source to an AC load through the bidirectional three-port power conversion system 1600. Throughout the description, power modules (e.g., bidirectional three-port power conversion systems and unidirectional power conversion systems) may be alternatively referred to as power subsystems.

In some embodiments, the modular bidirectional power conversion system 2400 comprises one bidirectional power module and two unidirectional power module. Each power module has a power rating of 6.6 KW. The total power of the modular bidirectional power conversion system 2400 is about 20 KW.

One advantageous feature of having the modular bidirectional power conversion system 2400 is that the combination of the bidirectional power conversion system 1600 and the unidirectional power conversion system 1000 can achieve a bidirectional power transferring through the bidirectional power conversion system 1600. At the same time, the unidirectional power conversion system 1000 helps to reduce the system cost, thereby achieving a cost-effective solution.

Another advantageous feature of having the modular bidirectional power conversion system 2400 is that the power modules connected in parallel help to achieve a large-scale power conversion system. For example, in an EV charging application, the maximum load may be 6 KW, 11 KW or 22 KW depending on different needs. By employing the modular bidirectional power conversion system 2400, the EV charger can satisfy different load needs through adding more power modules in parallel.

Figure 25:
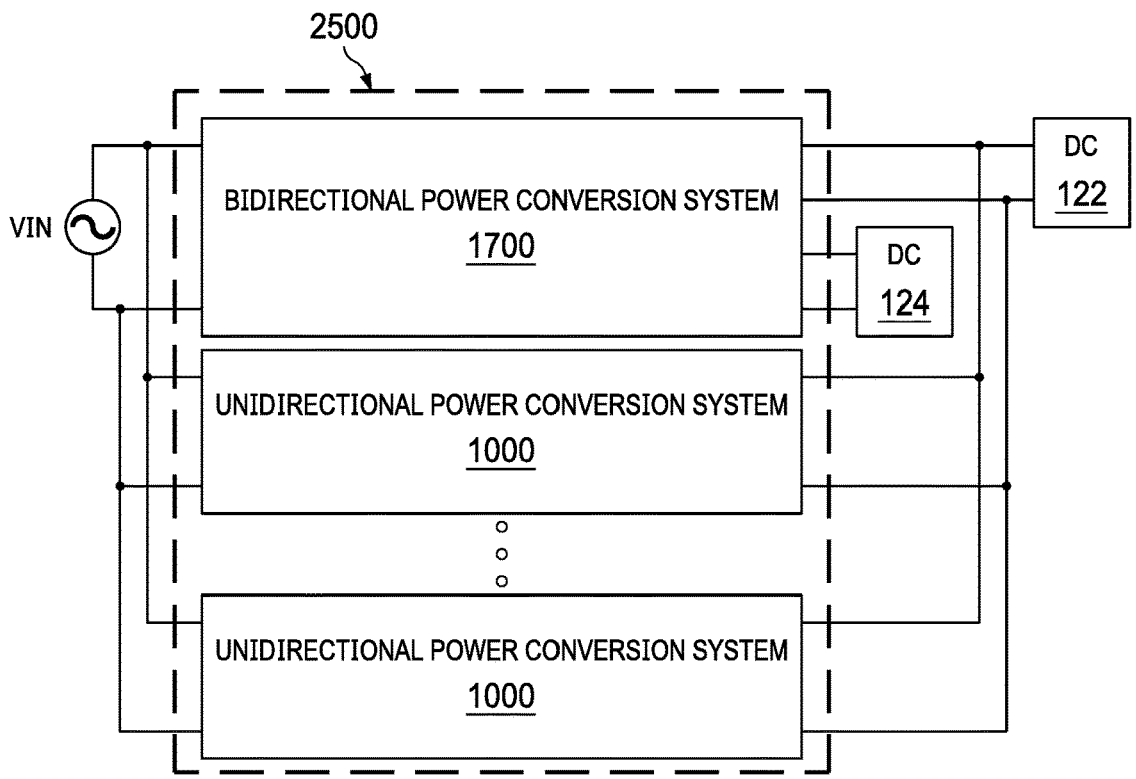
FIG. 25 illustrates a block diagram of yet another modular bidirectional power conversion system in accordance with various embodiments of the present disclosure.

FIG. 25 illustrates a block diagram of yet another modular bidirectional power conversion system in accordance with various embodiments of the present disclosure. The modular bidirectional power conversion system 2500 is similar to that shown in FIG. 24 except that the bidirectional power conversion system has been replaced by the bidirectional three-port power conversion system 1700 shown in FIG. 17.

Figure 26:
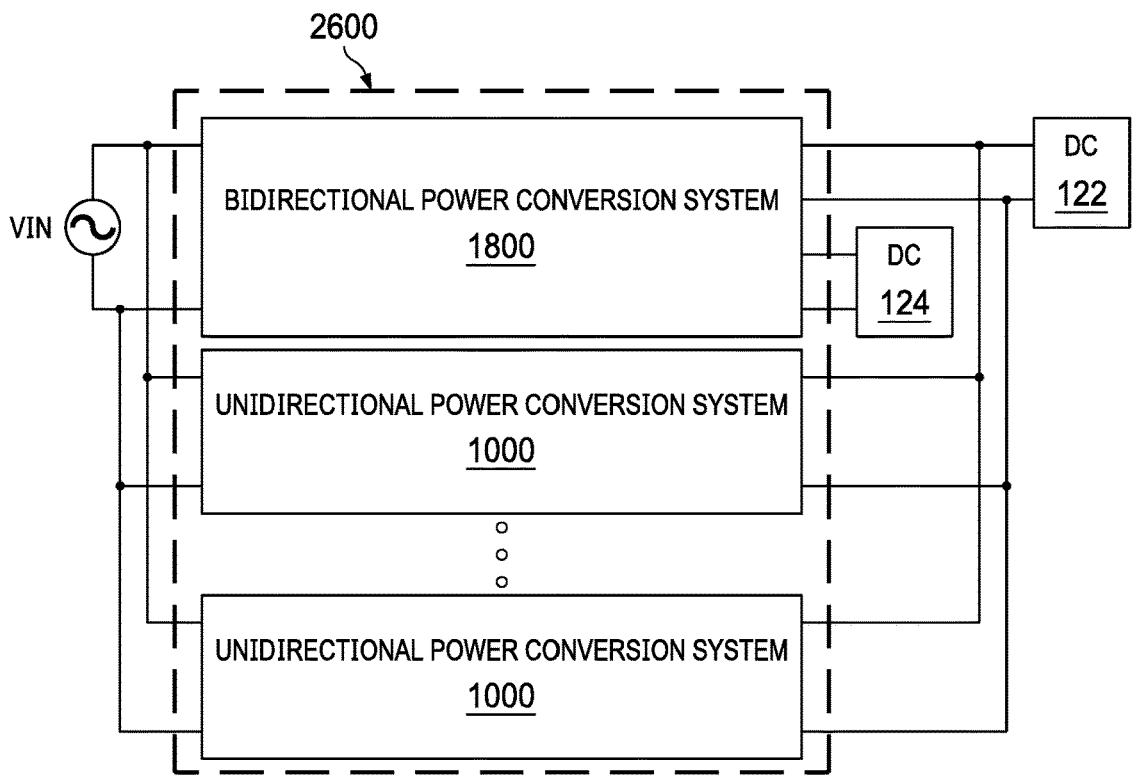
FIG. 26 illustrates a block diagram of yet another modular bidirectional power conversion system in accordance with various embodiments of the present disclosure.

FIG. 26 illustrates a block diagram of yet another modular bidirectional power conversion system in accordance with various embodiments of the present disclosure. The modular bidirectional power conversion system 2600 is similar to that shown in FIG. 24 except that the bidirectional power conversion system has been replaced by the bidirectional three-port power conversion system 1800 shown in FIG. 18.

Figure 27:
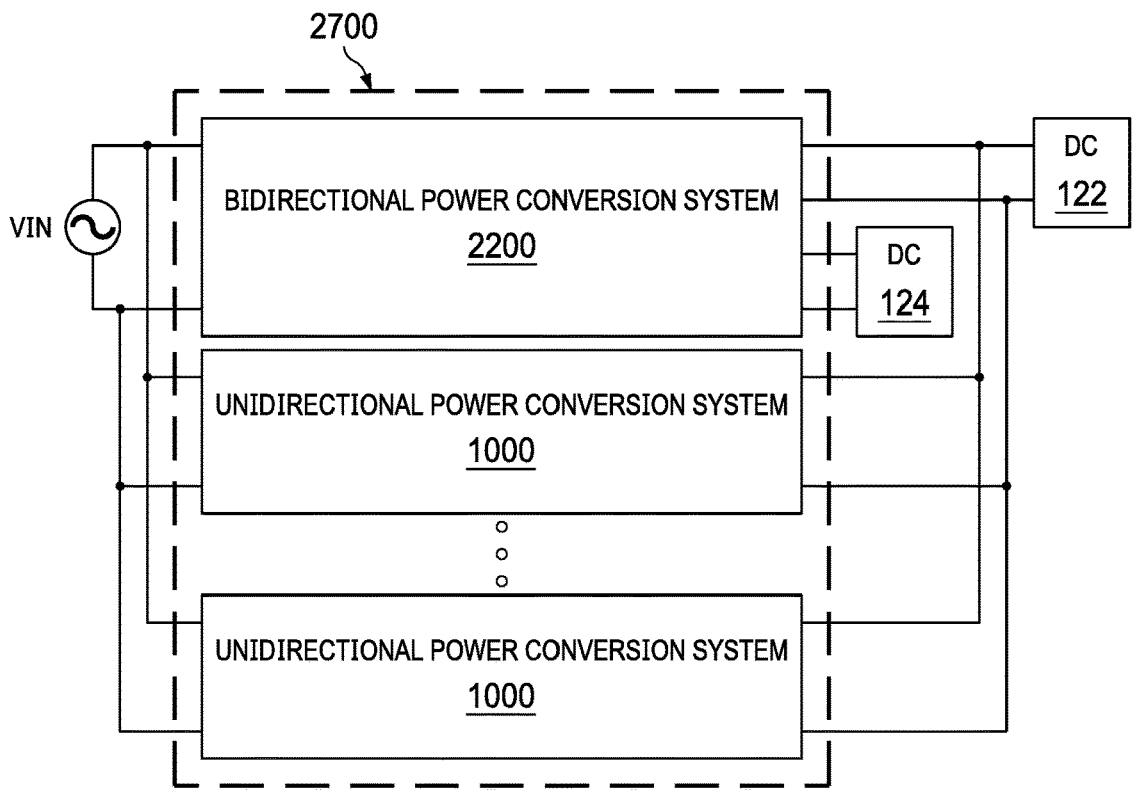
FIG. 27 illustrates a block diagram of yet another modular bidirectional power conversion system in accordance with various embodiments of the present disclosure.

FIG. 27 illustrates a block diagram of yet another modular bidirectional power conversion system in accordance with various embodiments of the present disclosure. The modular bidirectional power conversion system 2700 is similar to that shown in FIG. 24 except that the bidirectional power conversion system has been replaced by the bidirectional three-port power conversion system 2200 shown in FIG. 22.

Figure 28:
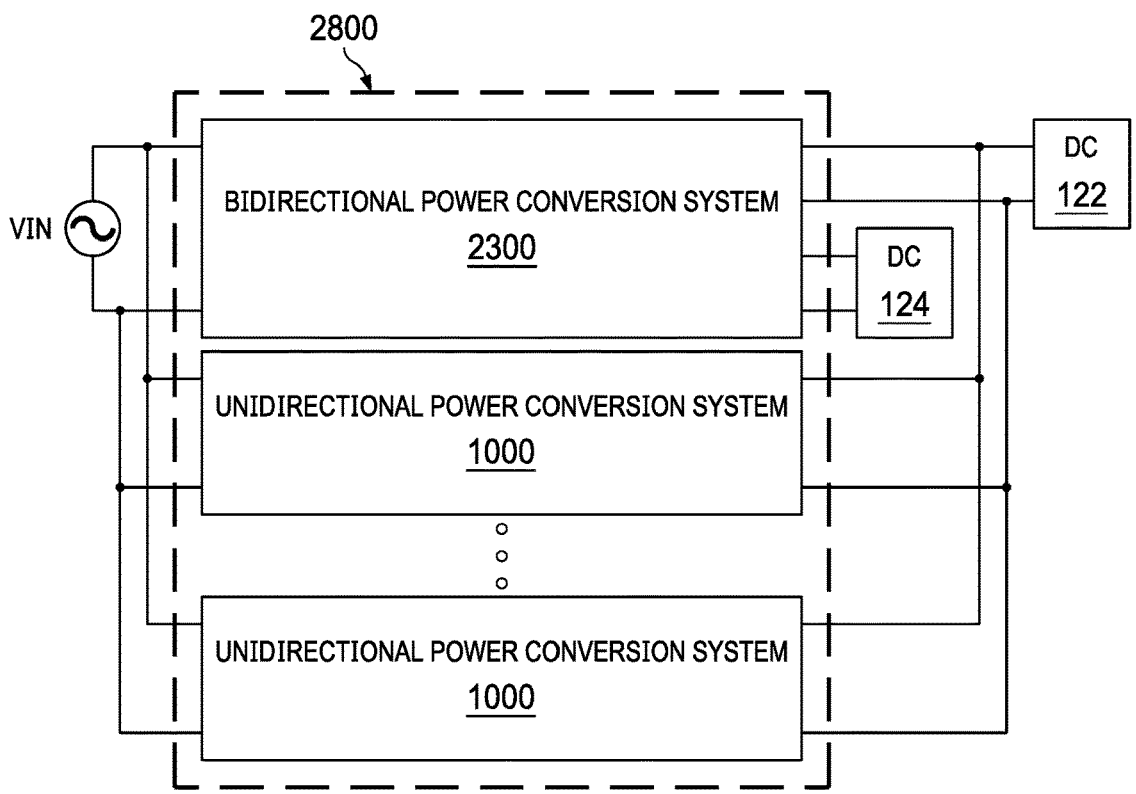
FIG. 28 illustrates a block diagram of yet another modular bidirectional power conversion system in accordance with various embodiments of the present disclosure.

FIG. 28 illustrates a block diagram of yet another modular bidirectional power conversion system in accordance with various embodiments of the present disclosure. The modular bidirectional power conversion system 2800 is similar to that shown in FIG. 24 except that the bidirectional power conversion system has been replaced by the bidirectional three-port power conversion system 2300 shown in FIG. 23.

It should be noted that FIGS. 24-28 illustrate a few combinations based upon various embodiments of the present disclosure. The diagrams shown in FIGS. 24-28 are merely examples, which should not unduly limit the scope of the claims. One of ordinary skill in the art would recognize many variations, alternatives, and modifications. For example, the bidirectional power conversion systems shown in FIG. 24-28 can be replaced by any bidirectional three-port power conversion systems and their variations discussed in the present disclosure. Likewise, the unidirectional power conversion systems shown in FIG. 24-28 can be replaced by any unidirectional power conversion systems and their variations discussed in the present disclosure.

Figure 29:
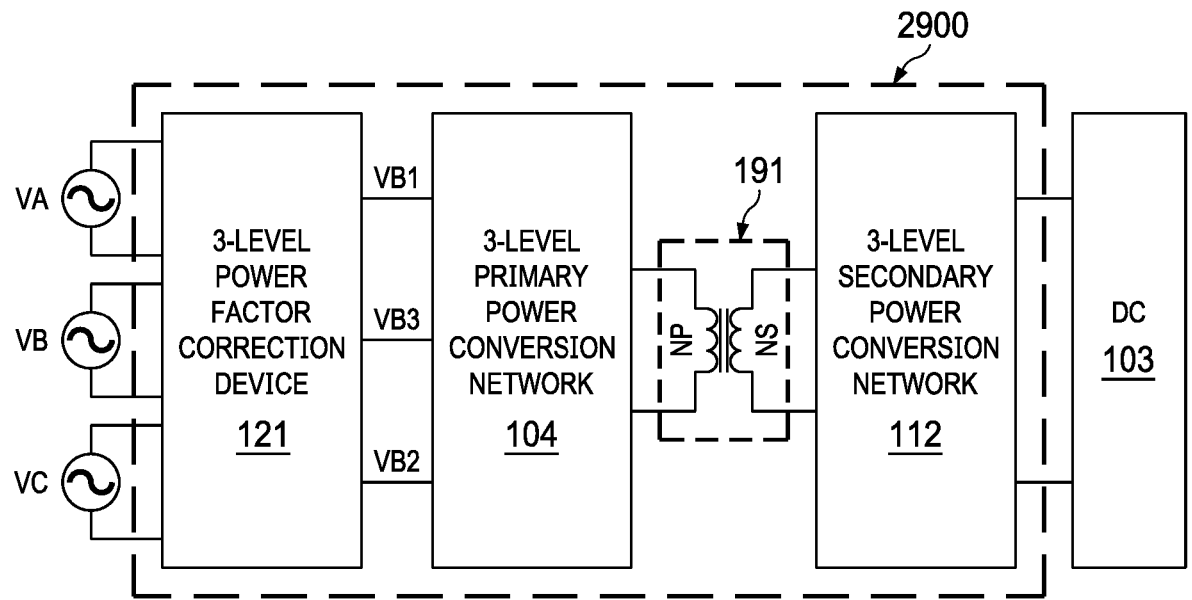
FIG. 29 illustrates a block diagram of a three-phase bidirectional power conversion system in accordance with various embodiments of the present disclosure.

FIG. 29 illustrates a block diagram of a three-phase bidirectional power conversion system in accordance with various embodiments of the present disclosure. The three-phase bidirectional power conversion system 2900 shown in FIG. 29 is similar to that shown in FIG. 2 except that the AC power source is replaced by a three-phase AC power source, and the three-level power factor correction device is replaced by a three-phase three-level power factor correction device 121.

As shown in FIG. 29, the three-phase AC power source has three phases, namely VA, VB and VC. The inputs of the three-phase three-level power factor correction device 121 are connected to the three-phase AC power source. One advantageous feature of having the three-phase three-level power factor correction device 121 is the voltage on the bipolar DC bus (VB1-VB3) can vary in a wide range. Such a wide range helps to efficiently transfer power in both the charging mode (an AC/DC system) and the inverting mode (a DC/AC system).

Figure 30:
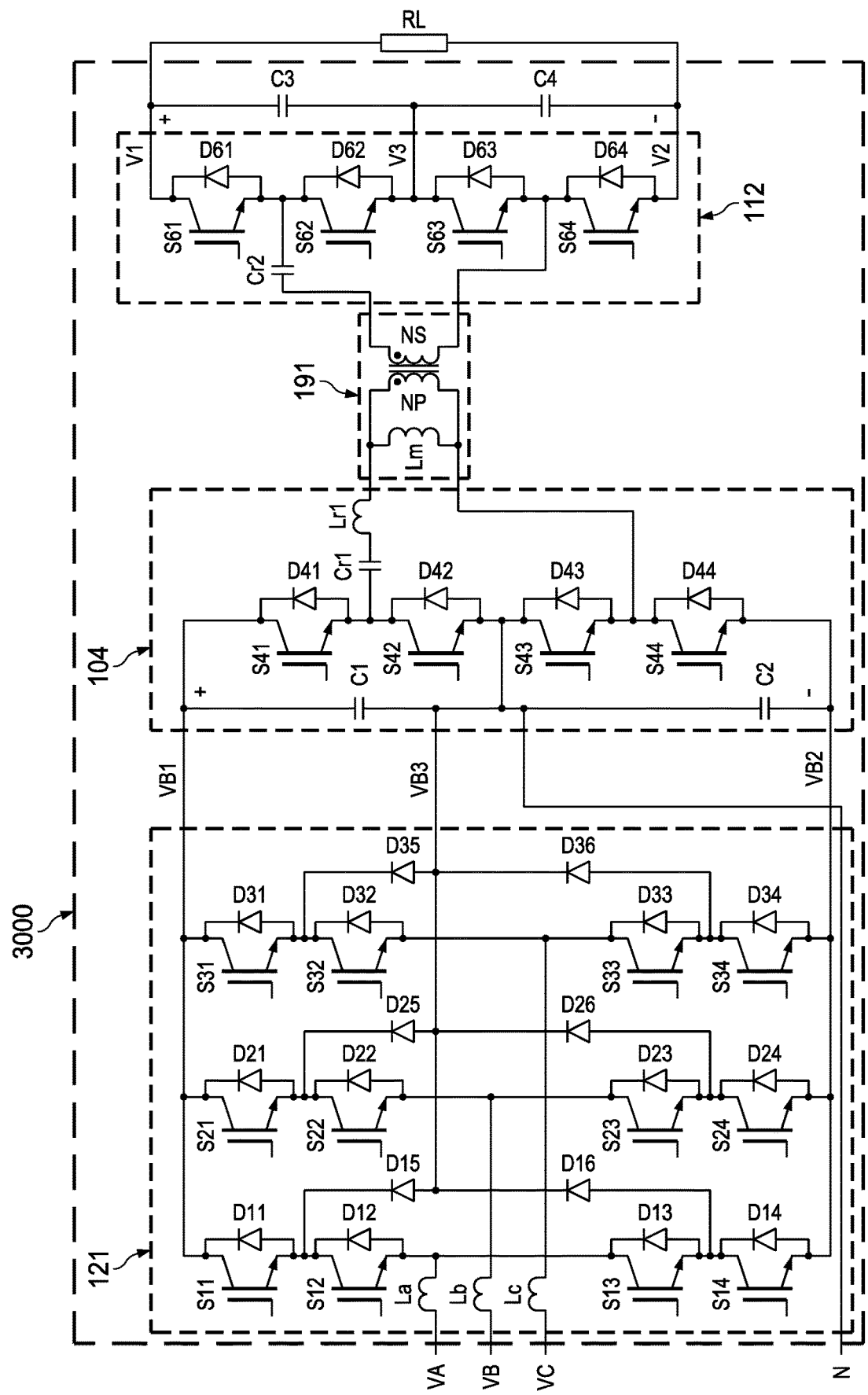
FIG. 30 illustrates a schematic diagram of a first implementation of the three-phase bidirectional power conversion system shown in FIG. 29 in accordance with various embodiments of the present disclosure.

FIG. 30 illustrates a schematic diagram of a first implementation of the three-phase bidirectional power conversion system shown in FIG. 29 in accordance with various embodiments of the present disclosure. The three-phase bidirectional power conversion system 3000 comprises the three-phase three-level power factor correction device 121, the three-level primary power conversion network 104, the transformer 191 and the three-level secondary power conversion network 112. The three-phase three-level power factor correction device 121 is implemented as a three-phase NPC boost power factor correction converter. The three-level primary power conversion network 104, the transformer 191 and the three-level secondary power conversion network 112 form a three-level LLC resonant converter, which has been described above, and hence is not discussed herein again.

The three-phase three-level power factor correction device 121 includes three NPC boost converters connected to three phases of the AC power source 110, respectively. Two output capacitors C1 and C2 are connected in series between the first voltage bus VB1 and the second voltage bus VB2.

A first NPC boost converter comprises a first inductor La, four switches S11-S14 and two diodes D15-D16. The switches S11-S14 are connected in series between the first voltage bus VB1 and the second voltage bus VB2. The first inductor La is connected between the output terminal of the first phase VA and a common node of switches S12 and S13. The diodes D15 and D16 are connected in series between a common node of switches S11 and S12, and a common node of switches S13 and S14.

A second NPC boost converter comprises a second inductor Lb, four switches S21-S24 and two diodes D25-D26. The switches S21-S24 are connected in series between the first voltage bus VB1 and the second voltage bus VB2. The second inductor Lb is connected between the output terminal of the second phase VB and a common node of switches S22 and S23. The diodes D25 and D26 are connected in series between a common node of switches S21 and S22, and a common node of switches S23 and S24.

A third NPC boost converter comprises a third inductor Lc, four switches S31-S34 and two diodes D35-D36. The switches S31-S34 are connected in series between the first voltage bus VB1 and the second voltage bus VB2. The third inductor Lc is connected between the output terminal of the third phase VC and a common node of switches S32 and S33. The diodes D35 and D36 are connected in series between a common node of switches S31 and S32, and a common node of switches S33 and S34.

The common node of diodes D15-D16, the common node of diodes D25-D26 and the common node of diodes D35-D36 are connected together and further connected to a common node of output capacitors C1 and C2. The neutral point N of the three-phase AC source is connected to the common node of output capacitors C1 and C2. The operating principle of the three-phase NPC boost power factor correction converter is well known, and hence is not discussed herein.

It should be noted that the neutral point N of the three-phase AC source is connected to the third voltage bus VB3, which is regulated by the three-phase NPC boost power factor correction converter. Such a regulated neutral point helps to reduce the system cost of the three-phase bidirectional power conversion system 3000. More particularly, the regulated neutral point may function as a reference when the three-phase bidirectional power conversion system 3000 is configured as an AC/DC power conversion system. On the other hand, the regulated neutral point may function as a return when the three-phase bidirectional power conversion system 3000 is configured as a DC/AC power conversion system.

Furthermore, the three-phase three-level power factor correction device 121 generates the three voltage buses VB1, VB2 and VB3, which help to balance the voltages across the output capacitors C1 and C2 and reduce the ripple components. The three voltage buses VB1, VB2 and VB3 also provide a connection node for the neutral point of the three-phase AC power source. In addition, the three voltage buses VB1, VB2 and VB3 also provide a conductive path for reactive power.

In accordance with an embodiment, the switches (e.g., switches S11-S14, S21-S24 and S31-S34) may be an IGBT device. Alternatively, the switching element can be any controllable switches such as MOSFET devices, IGCT devices, GTO devices, SCR devices, JFET devices, MCT devices and the like.

It should be noted that when switches S11-S14, S21-S24 and S31-S34 are implemented by MOSFET devices, the body diodes of switches S11-S14, S21-S24 and S31-S34 can be used to provide a freewheeling channel. On the other hand, when switches S11-S14, S21-S24 and S31-S34 are implemented by IGBT devices, a separate freewheeling diode is required to be connected in parallel with its corresponding switch.

As shown in FIG. 30, diodes D11-D14, D21-D24 and D31-D34 are required to provide reverse conducting paths. In other words, diodes D11-D14, D21-D24 and D31-D34 are anti-parallel diodes. In some embodiments, diodes D11-D14, D21-D24 and D31-D34 are co-packaged with their respective IGBT devices S11-S14, S21-S24 and S31-S34. In alternative embodiments, didoes D11-D14, D21-D24 and D31-D34 are placed outside their respective IGBT devices S11-S14, S21-S24 and S31-S34.

It should further be noted that while FIG. 30 shows each bidirectional switch is formed by diodes and IGBT devices connected in an anti-parallel arrangement, one of ordinary skill in the art would recognize many variations, alternatives and modifications. For example, the bidirectional switch may be implemented by some new semiconductor switches such as anti-paralleled reverse blocking IGBTs arrangement. The discussion of the IGBT devices herein is applicable to other IGBT devices of this disclosure.

Figure 31:
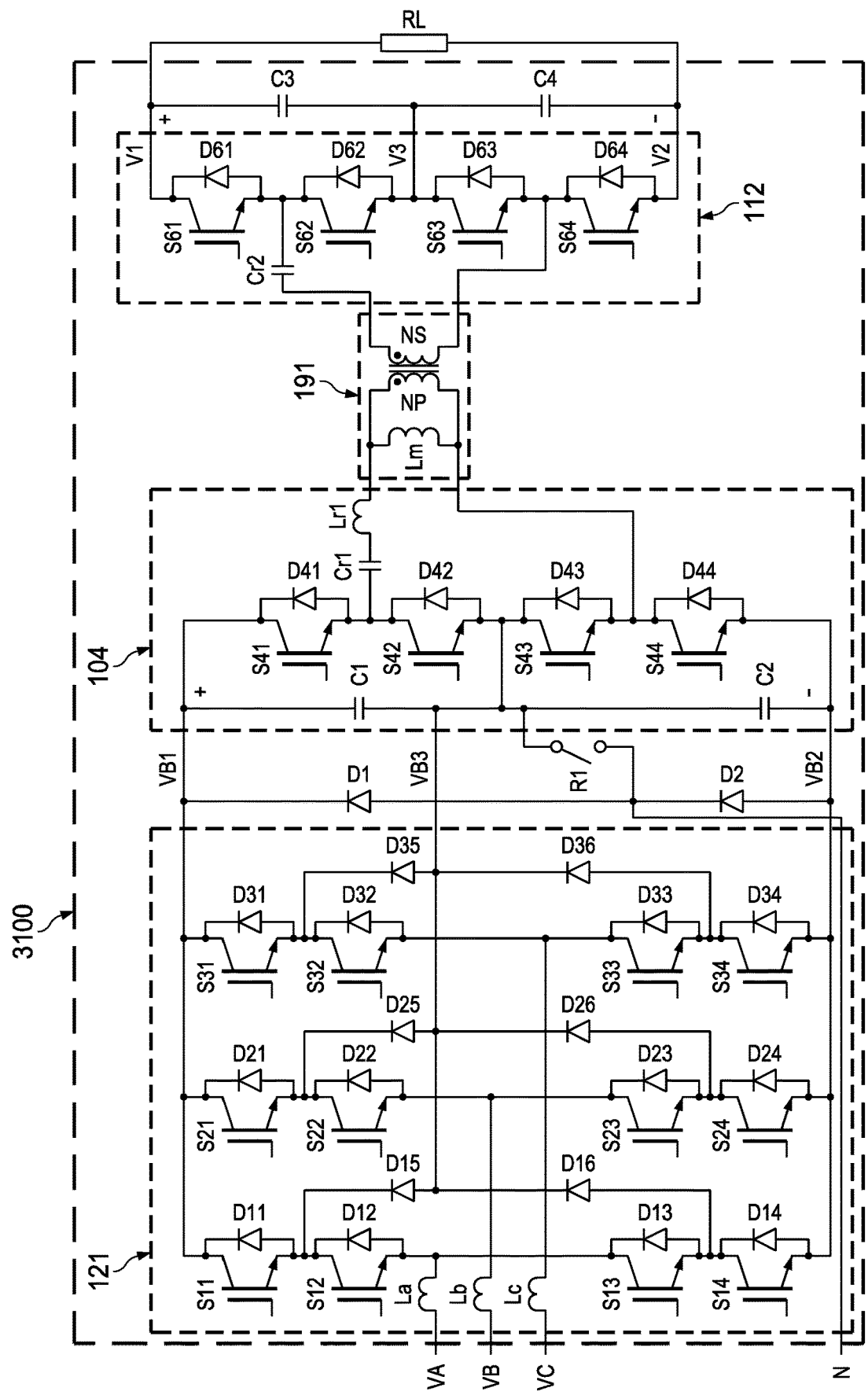
FIG. 31 illustrates a schematic diagram of a second implementation of the three-phase bidirectional power conversion system shown in FIG. 29 in accordance with various embodiments of the present disclosure.

FIG. 31 illustrates a schematic diagram of a second implementation of the three-phase bidirectional power conversion system shown in FIG. 29 in accordance with various embodiments of the present disclosure. The three-phase bidirectional power conversion system 3100 is similar to that shown in FIG. 30 except that diodes D1-D2 and the relay R1 have been included in the three-phase bidirectional power conversion system 3100. Since three-phase bidirectional power conversion system 3100 is connected to the neutral point N of the three-phase AC power source, the three-phase bidirectional power conversion system 3100 can be configured to have a single phase operation. Under the single phase operation, the relay R1 can be configured to achieve a voltage doubler as described above.

Figure 32:
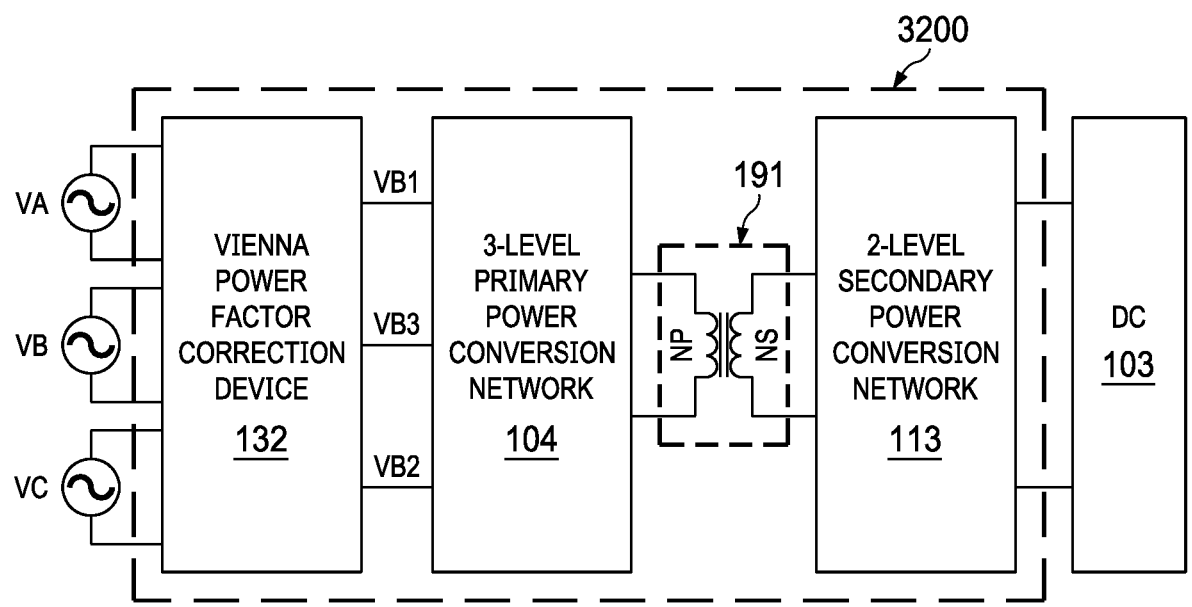
FIG. 32 illustrates a block diagram of a three-phase power conversion system in accordance with various embodiments of the present disclosure.

FIG. 32 illustrates a block diagram of a three-phase power conversion system in accordance with various embodiments of the present disclosure. The three-phase power conversion system 3200 comprises a Vienna power factor correction device 132, a three-level primary power conversion network 104, a transformer 191 and a two-level secondary power conversion network 113 connected in cascade between a three-phase AC power source and a DC element 103. The three-phase AC power source shown in FIG. 32 includes a first phase VA, a second phase VB and a third phase VC. The outputs of the first phase VA, the second phase VB and the third phase VC are connected to the inputs of the Vienna power factor correction device 132.

The Vienna power factor correction device 132 is employed to improve grid power quality and reduce the harmonic current components. The Vienna power factor correction device 132 is controlled such that the input currents are sinusoidal and in phase with the respective input AC voltages, thereby achieving a unity power factor. The Vienna power factor correction device 132 comprises three input inductors connected to VA, VB and VC respectively, and two output capacitors connected in series between a first output voltage bus VB1 and a second output voltage bus VB2. The common node of the two output capacitors is connected to a neutral point of the three-phase AC power source and the third output voltage bus VB3.

The Vienna power factor correction device 132 comprises an uncontrolled diode rectifier and three switches connected between input inductors and the neutral point. With the neutral point, the Vienna power factor correction device 132 can be decoupled into three single-phase three-level power factor correction devices. The Vienna power factor correction device 132 has a low number of active and passive switches. For example, the Vienna power factor correction device 132 can be implemented as a power factor correction device having six diodes and six MOSFETs for a high power three-phase application.

The three-level primary power conversion network 104, the transformer 191 and the two-level secondary power conversion network 113 have been described above, and hence are not discussed herein again to avoid repetition.

Figure 33:
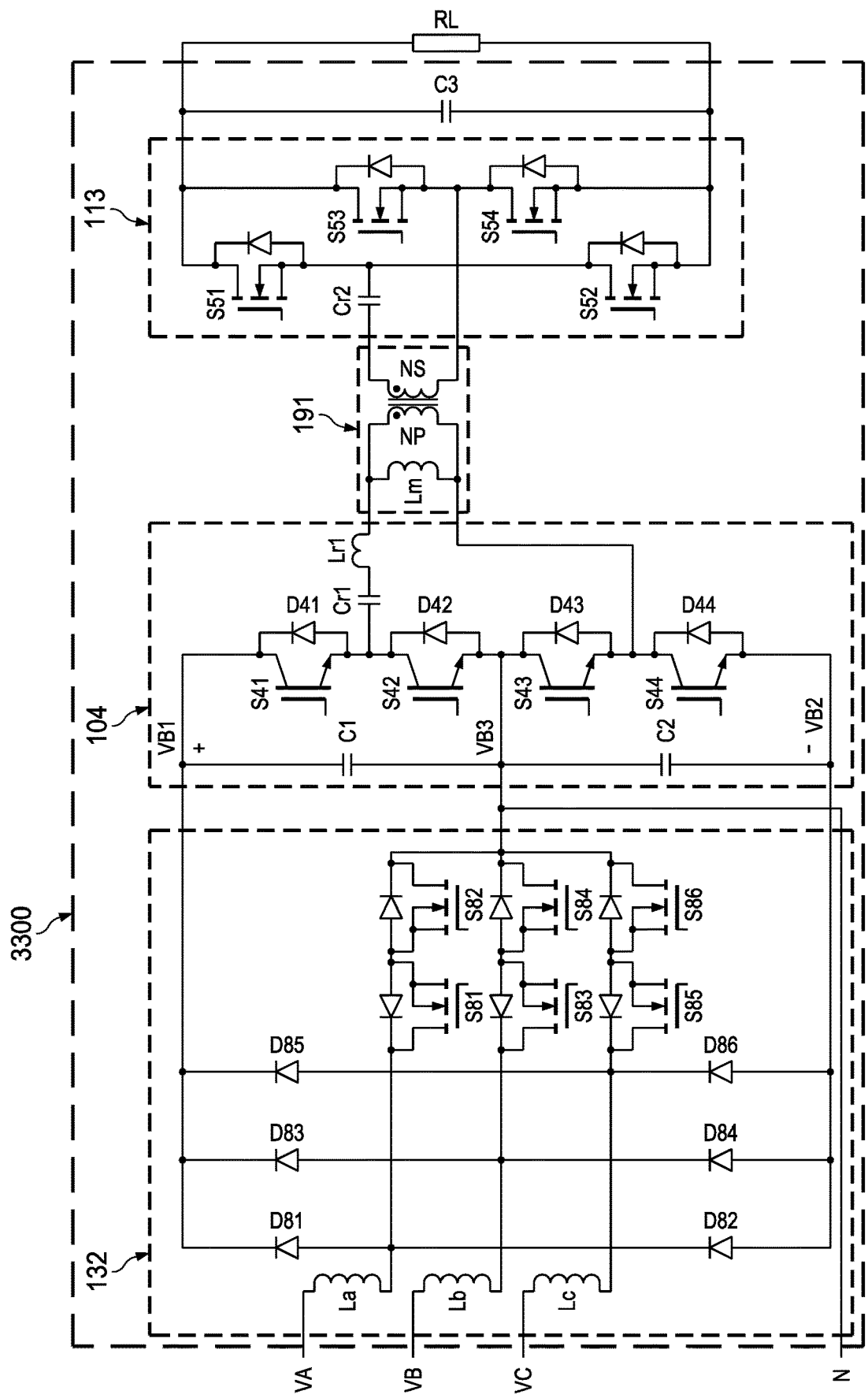
FIG. 33 illustrates a schematic diagram of a first implementation of the three-phase power conversion system shown in FIG. 32 in accordance with various embodiments of the present disclosure.

FIG. 33 illustrates a schematic diagram of a first implementation of the three-phase power conversion system shown in FIG. 32 in accordance with various embodiments of the present disclosure. The three-phase power conversion system 3300 includes the Vienna power factor correction device 132, the three-level primary power conversion network 104, the transformer 191 and the two-level secondary power conversion network 113 connected in cascade between a three-phase AC power source and a DC load RL. The three-phase AC power source includes three phases VA, VB, VC and the neutral point N.

The Vienna power factor correction device 132 comprises three input inductors La, Lb, Lc, six diodes D81-D86 and three bidirectional switches. The six diodes D81-D86 form a diode bridge. A common node of diodes D81 and D82 is connected to the first phase VA through a first input inductor La. A common node of diodes D83 and D84 is connected to the second phase VB through a second input inductor Lb. A common node of diodes D85 and D86 is connected to the third phase VC through a third input inductor Lc.

A first bidirectional switch comprises two back-to-back connected switches S81 and S82. The first bidirectional switch is connected between the common node of diodes D81, D82, and a common node of the output capacitors C1, C2. As shown in FIG. 33, the common node of the output capacitors C1, C2 is connected to the neutral point N of the three-phase AC power source. A second bidirectional switch comprises two back-to-back connected switches S83 and S84. The second bidirectional switch is connected between the common node of diodes D83, D84, and the common node of the output capacitors C1, C2. A third bidirectional switch comprises two back-to-back connected switches S85 and S86. The third bidirectional switch is connected between the common node of diodes D85, D86, and the common node of the output capacitors C1, C2.

The Vienna power factor correction device 132 is configured such that the power factor of the three-phase power conversion system 3300 is adjusted to a level approximately equal to unity through adjusting the input currents flowing into the Vienna power factor correction device 132. The three-level primary power conversion network 104, the transformer 191 and the two-level secondary power conversion network 113 form an LLC resonant converter for generating a regulated voltage applied to the DC load RL.

One advantageous feature of having the Vienna power factor correction device 132 shown in FIG. 33 is the bidirectional switches can be implemented as low-voltage switches (e.g., S81-S86), thereby reducing the cost and improving the reliability of the three-phase power conversion system 3300.

Figure 34:
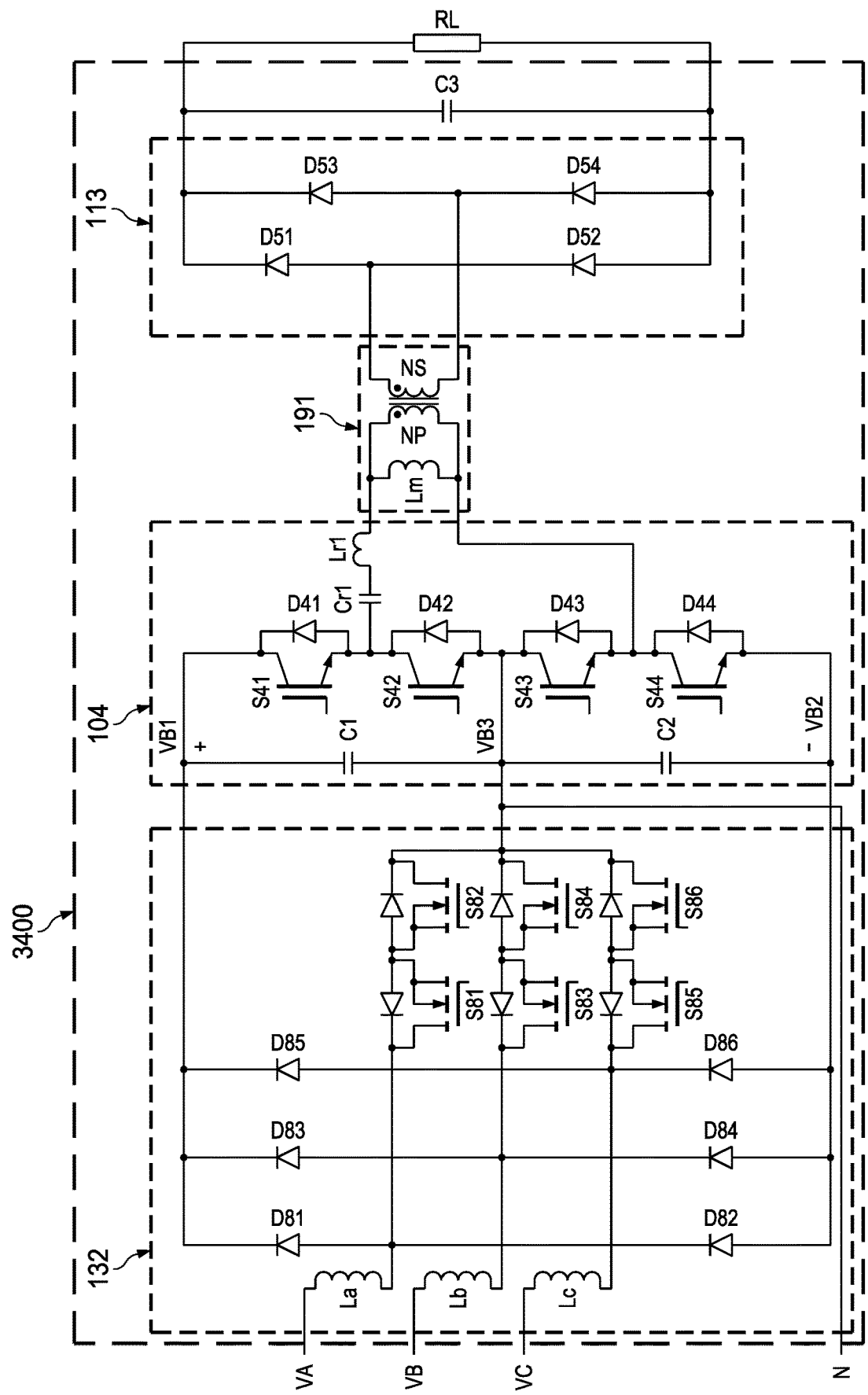
FIG. 34 illustrates a schematic diagram of a second implementation of the three-phase power conversion system shown in FIG. 32 in accordance with various embodiments of the present disclosure.

FIG. 34 illustrates a schematic diagram of a second implementation of the three-phase power conversion system shown in FIG. 32 in accordance with various embodiments of the present disclosure. The three-phase power conversion system 3400 shown in FIG. 34 is similar to the three-phase power conversion system 3300 shown in FIG. 33 except that the two-level secondary power conversion network 113 is implemented as a diode rectifier including didoes D51-D54. One advantageous feature of having a diode rectifier is the diode rectifier can simplify the design of the three-phase power conversion system 3400, thereby reducing the cost and improving the reliability of the three-phase power conversion system 3400.

Figure 35:
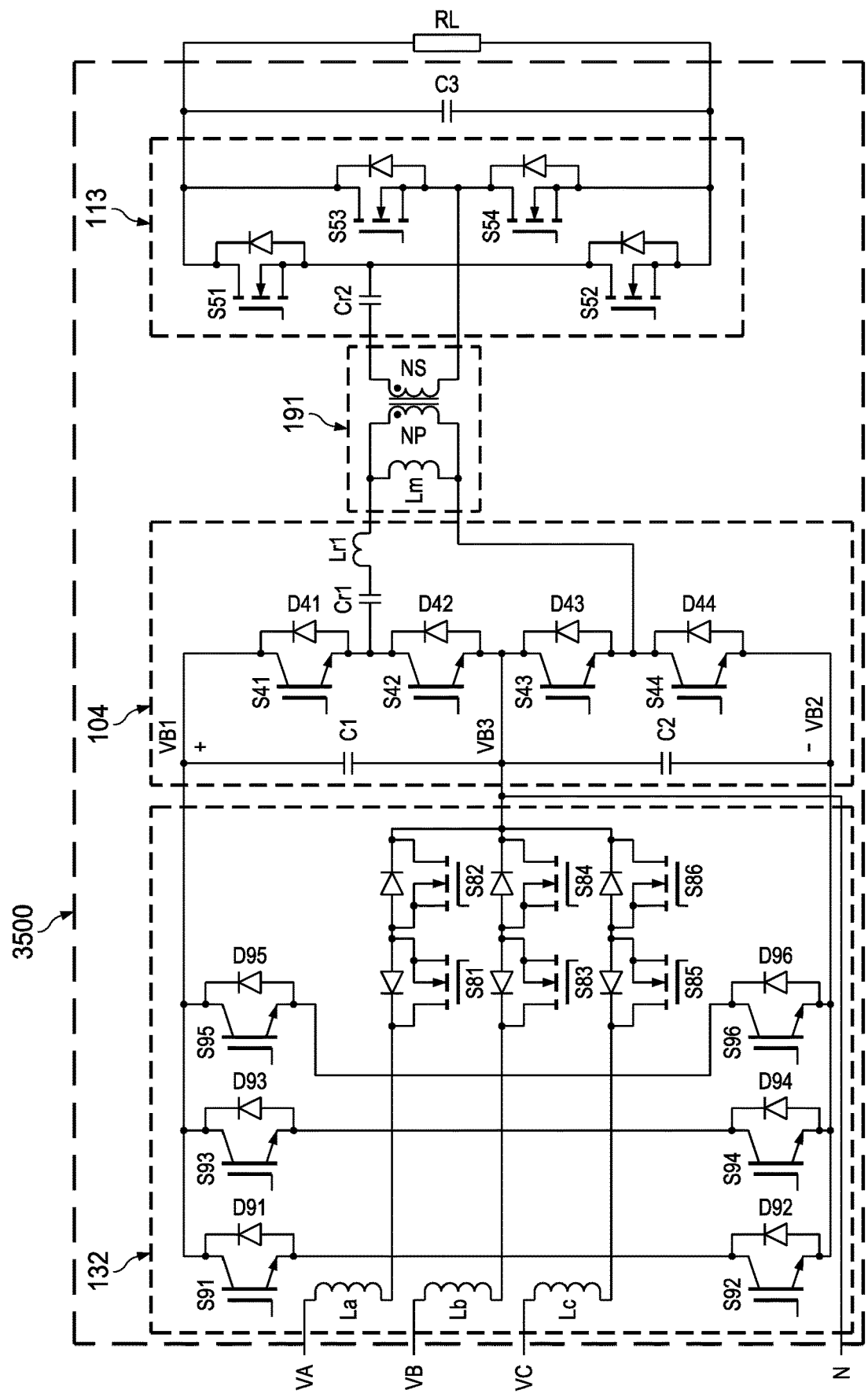
FIG. 35 illustrates a schematic diagram of a third implementation of the three-phase power conversion system shown in FIG. 32 in accordance with various embodiments of the present disclosure.

FIG. 35 illustrates a schematic diagram of a third implementation of the three-phase power conversion system shown in FIG. 32 in accordance with various embodiments of the present disclosure. The three-phase power conversion system 3500 shown in FIG. 35 is similar to the three-phase power conversion system 3300 shown in FIG. 33 except that the three-phase power conversion system 3500 is implemented as a bidirectional power conversion system. As shown in FIG. 35, the diode bridge shown in FIG. 33 has been replaced by a bridge having six switches S91-S96. One advantageous feature of having a bidirectional power conversion system is that the DC load RL may be configured as a DC power source to provide power for an AC load connected to the input terminals of the three-phase power conversion system 3500.

Figure 36:
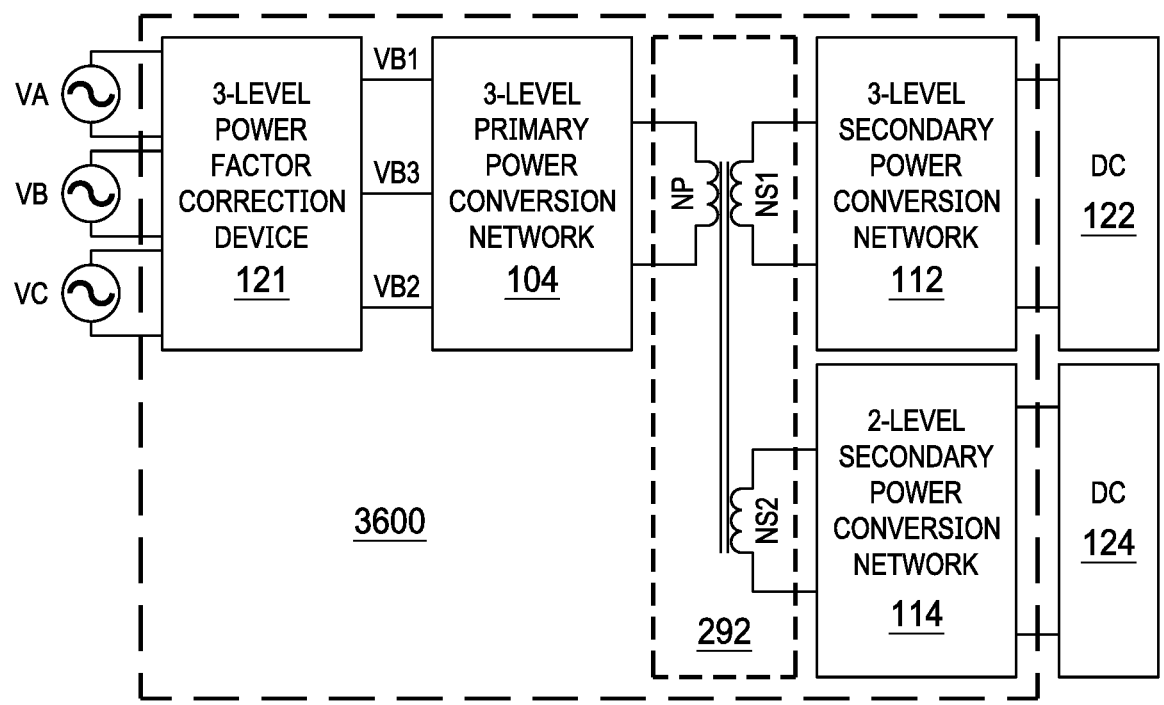
FIG. 36 illustrates a block diagram of a first implementation of a three-phase three-port power conversion system in accordance with various embodiments of the present disclosure.

FIG. 36 illustrates a block diagram of a first implementation of a three-phase three-port power conversion system in accordance with various embodiments of the present disclosure. The three-phase three-port power conversion system 3600 is similar to the bidirectional three-port power conversion system 1500 shown in FIG. 15 except that the AC power source is a three-phase AC power source and the power factor correction device is a three-phase three-level power factor correction device 121.

The three-phase AC power source shown in FIG. 36 includes a first phase VA, a second phase VB and a third phase VC. The outputs of the first phase VA, the second phase VB and the third phase VC are connected to the inputs of the three-phase three-level power factor correction device 121.

The three-phase three-level power factor correction device 121 is employed to improve grid power quality and reduce the harmonic current components. The three-phase three-level power factor correction device 121 is controlled such that the input currents are sinusoidal and in phase with the respective input AC voltages, thereby achieving a unity power factor.

The three-level primary power conversion network 104, the transformer 292, the three-level secondary power conversion network 112, the two-level secondary power conversion network 114, the first DC element 122 and the second DC element 124 have been described above, and hence are not discussed herein again to avoid repetition.

Figure 37:
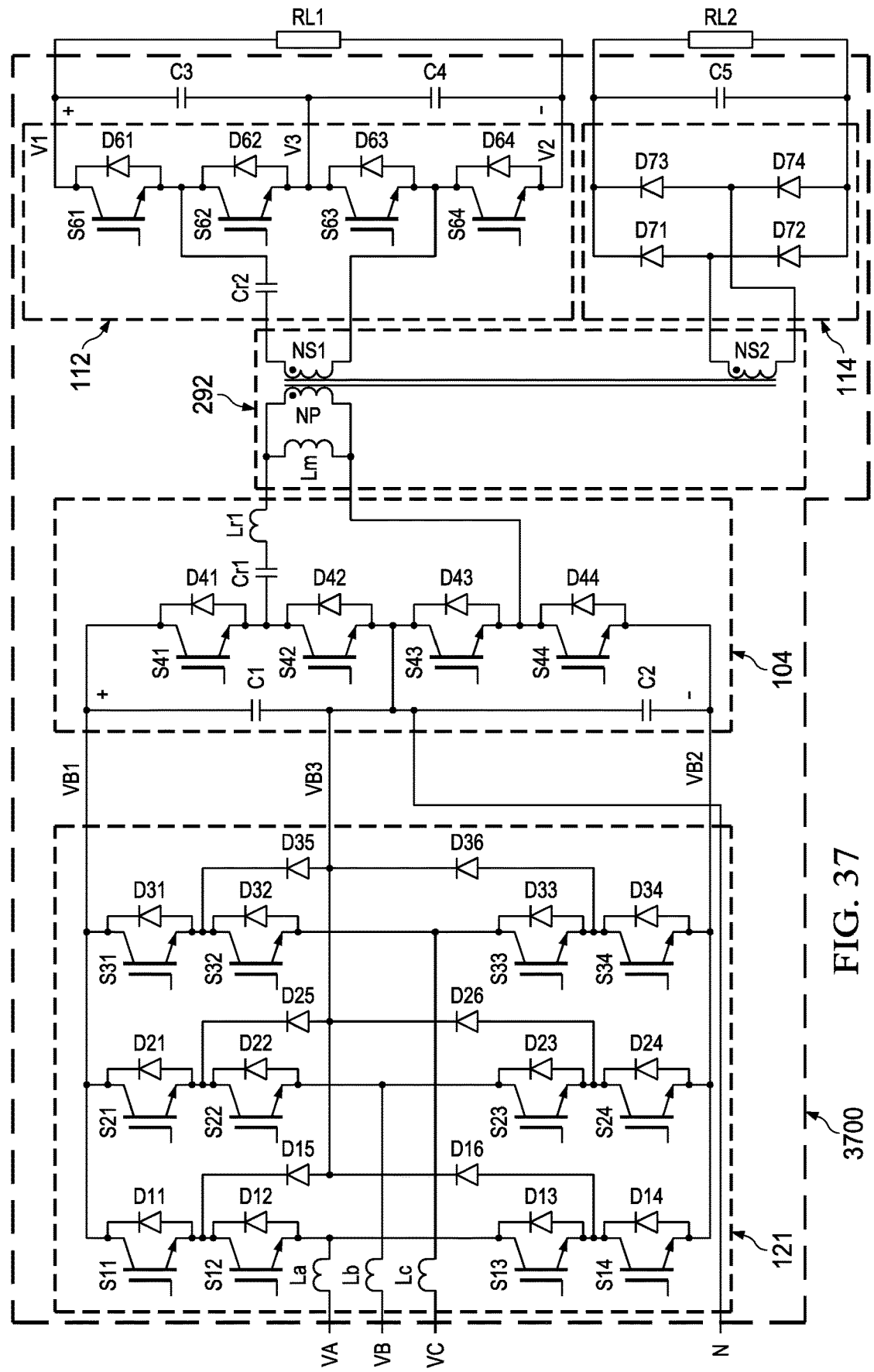
FIG. 37 illustrates a schematic diagram of a first implementation of the three-phase three-port power conversion system shown in FIG. 36 in accordance with various embodiments of the present disclosure.

FIG. 37 illustrates a schematic diagram of a first implementation of the three-phase three-port power conversion system shown in FIG. 36 in accordance with various embodiments of the present disclosure. The three-phase three-port power conversion system 3700 comprises three ports. As shown in FIG. 37, a first port of the three-phase three-port power conversion system 3700 comprises the three-phase three-level power factor correction device 121 and the three-level primary power conversion network 104 connected in cascade between the three-phase AC power source and the primary winding NP of the transformer 292. A second port comprises a three-level secondary power conversion network 112 connected between the secondary winding NS1 of the transformer 292 and the first DC load RL1. A third port comprises a two-level secondary power conversion network 114 connected between the secondary winding NS2 of the transformer 292 and the second DC load RL2.

The three-phase three-level power factor correction device 121 is implemented as a three-phase NPC boost power factor correction converter, which has been described in detail above with respect to FIG. 30, and hence is not discussed herein. The three-phase three-level power factor correction device 121 establishes a first voltage bus VB1, a second voltage bus VB2 and a third voltage bus VB3. The three-level primary power conversion network 104, the three-level secondary power conversion network 112 and the two-level secondary power conversion network 114 are employed to convert the DC voltages on the voltage buses VB1-VB3 to suitable DC voltages applied to the DC loads RL1 and RL2. The three-level primary power conversion network 104, the three-level secondary power conversion network 112 and the two-level secondary power conversion network 114 have been described above, and hence are not discussed herein again.

Figure 38:
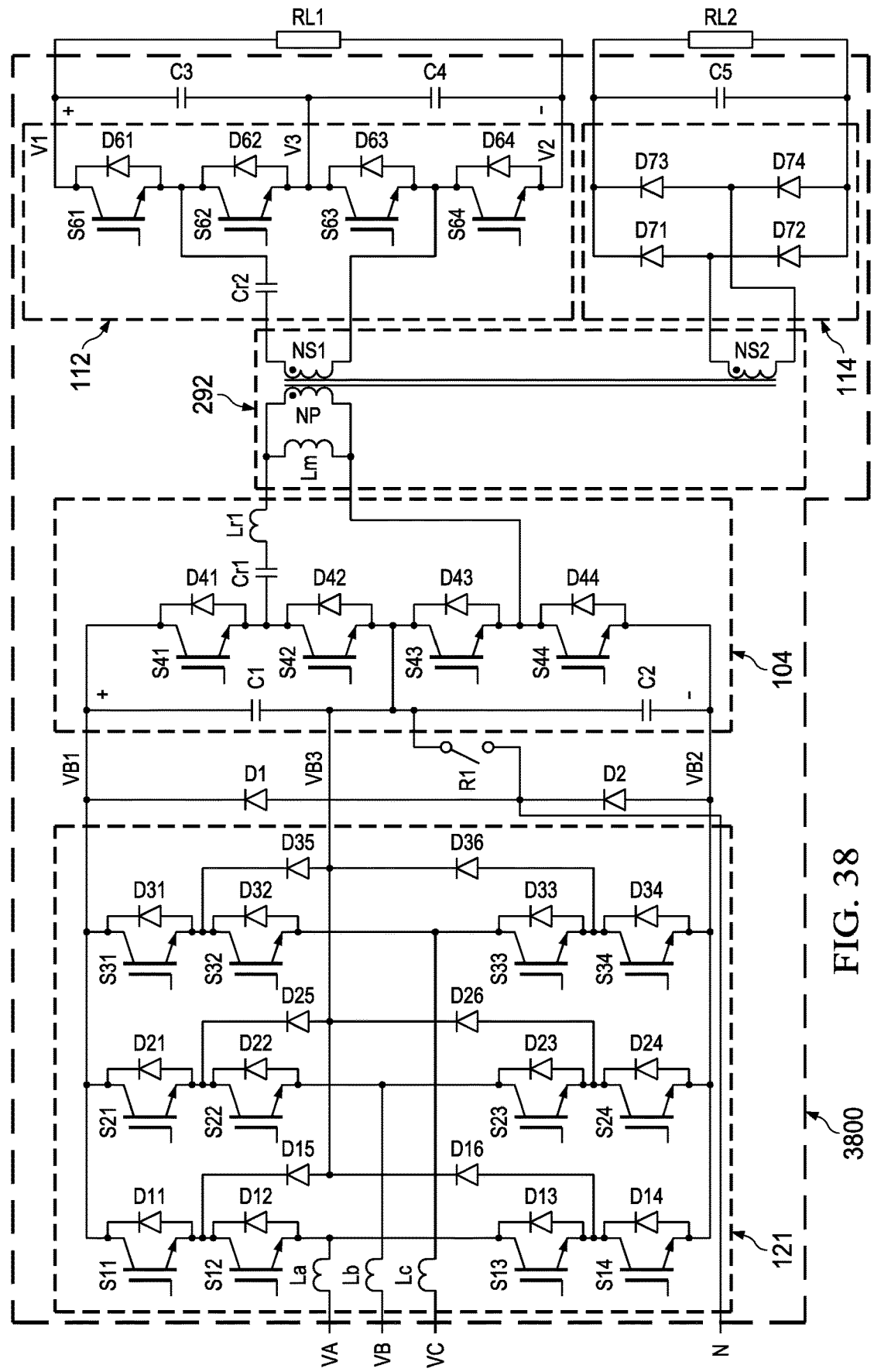
FIG. 38 illustrates a schematic diagram of a second implementation of the three-phase three-port power conversion system shown in FIG. 36 in accordance with various embodiments of the present disclosure.

FIG. 38 illustrates a schematic diagram of a second implementation of the three-phase three-port power conversion system shown in FIG. 36 in accordance with various embodiments of the present disclosure. The three-phase three-port power conversion system 3800 is similar to that shown in FIG. 37 except that diodes Dl-D2 and the relay R1 have been included in the three-phase three-port power conversion system 3800. Since the three-phase three-port power conversion system 3800 is connected to the neutral point N of the three-phase AC power source, the three-phase three-port power conversion system can be configured to have a single phase operation. Under the single phase operation, the relay R1 can be configured to achieve a voltage doubler as described above with respect to FIG. 5.

Figure 39:
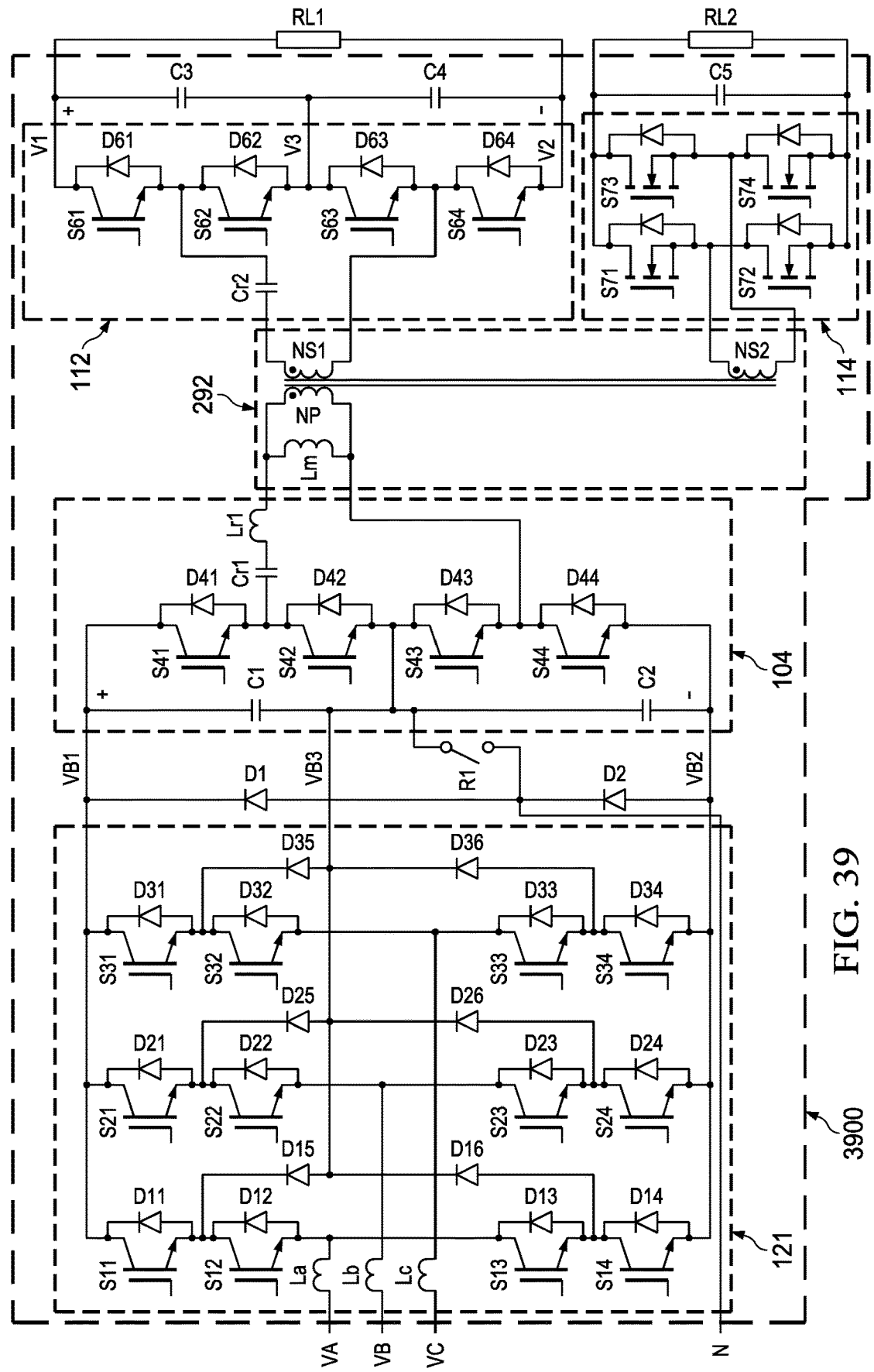
FIG. 39 illustrates a schematic diagram of a third implementation of the three-phase three-port power conversion system shown in FIG. 36 in accordance with various embodiments of the present disclosure.

FIG. 39 illustrates a schematic diagram of a third implementation of the three-phase three-port power conversion system shown in FIG. 36 in accordance with various embodiments of the present disclosure. The three-phase three-port power conversion system 3900 shown in FIG. 39 is similar to that shown in FIG. 38 except that except that the diodes of the two-level secondary power conversion network 114 have been replaced by respective switches S71-S74. In operation, the gates of the switches S71-S74 are controlled so that the switches S71-S74 emulate the operation of the respective diodes shown in FIG. 38. One advantageous feature of having the rectifier shown in FIG. 39 is that the switches S71-S74 can help to save the conduction losses caused by the forward voltage drop of the diodes.

Figure 40:
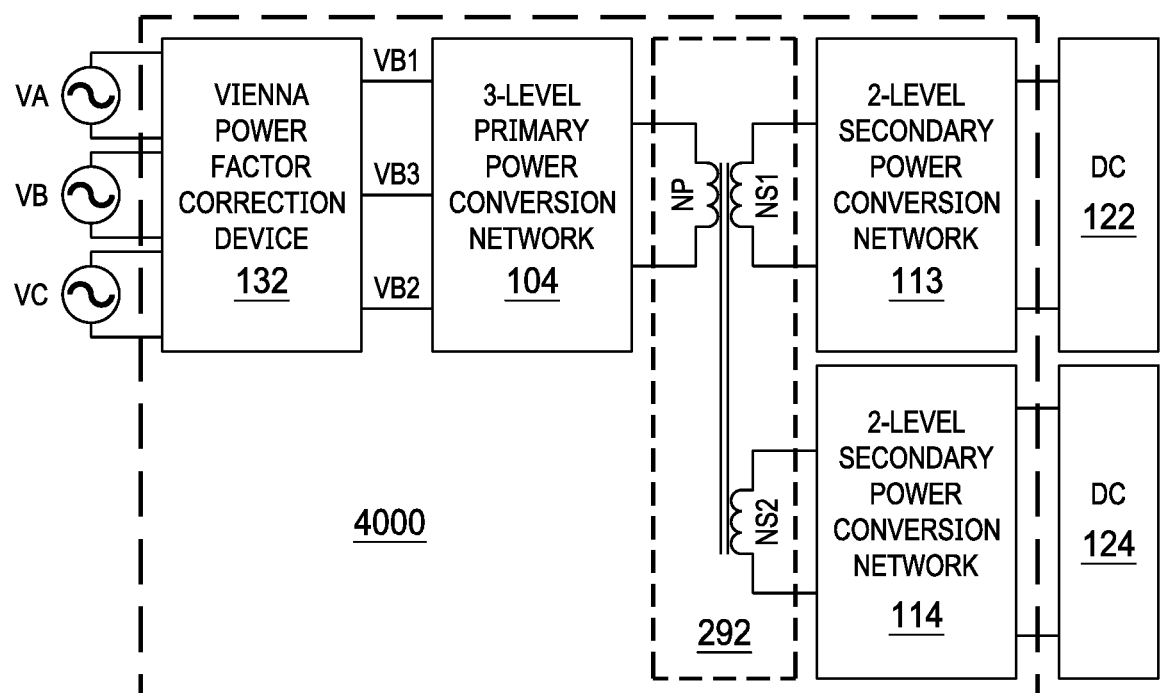
FIG. 40 illustrates a block diagram of a second implementation of the three-phase three-port power conversion system shown in FIG. 36 in accordance with various embodiments of the present disclosure.

FIG. 40 illustrates a block diagram of a second implementation of the three-phase three-port power conversion system shown in FIG. 36 in accordance with various embodiments of the present disclosure. The three-phase three-port power conversion system 4000 is similar to the three-phase three-port power conversion system 3600 shown in FIG. 36 except that the power factor correction device is implemented as a Vienna power factor correction device 132.

The Vienna power factor correction device 132 is employed to improve grid power quality and reduce the harmonic current components. The Vienna power factor correction device 132 is controlled such that the input currents are sinusoidal and in phase with the respective input AC voltages, thereby achieving a unity power factor.

Figure 41:
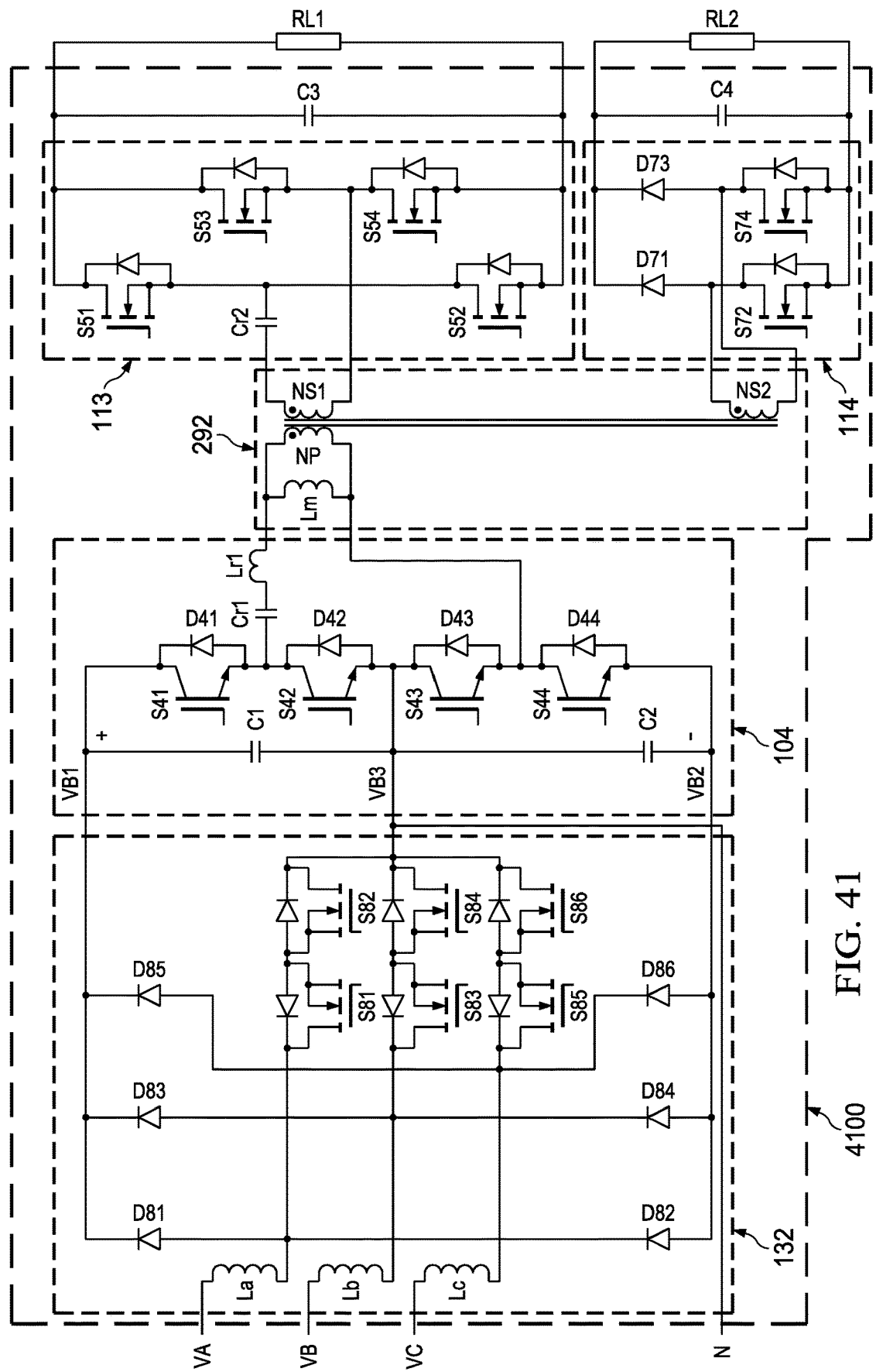
FIG. 41 illustrates a schematic diagram of a first implementation of the three-phase three-port power conversion system shown in FIG. 40 in accordance with various embodiments of the present disclosure.

FIG. 41 illustrates a schematic diagram of a first implementation of the three-phase three-port power conversion system shown in FIG. 40 in accordance with various embodiments of the present disclosure. The three-phase three-port power conversion system 4100 comprises three ports. As shown in FIG. 41, a first port of the three-phase three-port power conversion system 4100 comprises the Vienna power factor correction device 132 and the three-level primary power conversion network 104 connected in cascade between the three-phase AC power source and the primary winding NP of the transformer 292. A second port comprises a two-level secondary power conversion network 113 connected between the secondary winding NS1 and a first DC load RL1. A third port comprises a two-level secondary power conversion network 114 connected between the secondary winding NS2 and the second DC load RL2.

The Vienna power factor correction device 132 has been described in detail above with respect to FIG. 33, and hence is not discussed herein. The Vienna power factor correction device 132 establishes a first voltage bus VB1, a second voltage bus VB2 and a third voltage bus VB3. The three-level primary power conversion network 104, the two-level secondary power conversion network 113 and the two-level secondary power conversion network 114 are employed to convert the voltage buses VB1-VB3 to suitable DC voltages applied to the DC loads RL1 and RL2. The three-level primary power conversion network 104 has been described above, and hence is not discussed herein again.

The two-level secondary power conversion network 113 comprises switches S51-S54. In operation, the gates of the switches S51-S54 are controlled so that the switches S51-S54 emulate the operation of the respective diodes. The two-level secondary power conversion network 114 comprises switches S72, S74, and diodes D71, D73. In operation, the gates of the switches S72 and S74 are controlled so that the switches S72 and S74 emulate the operation of the respective diodes.

Figure 42:
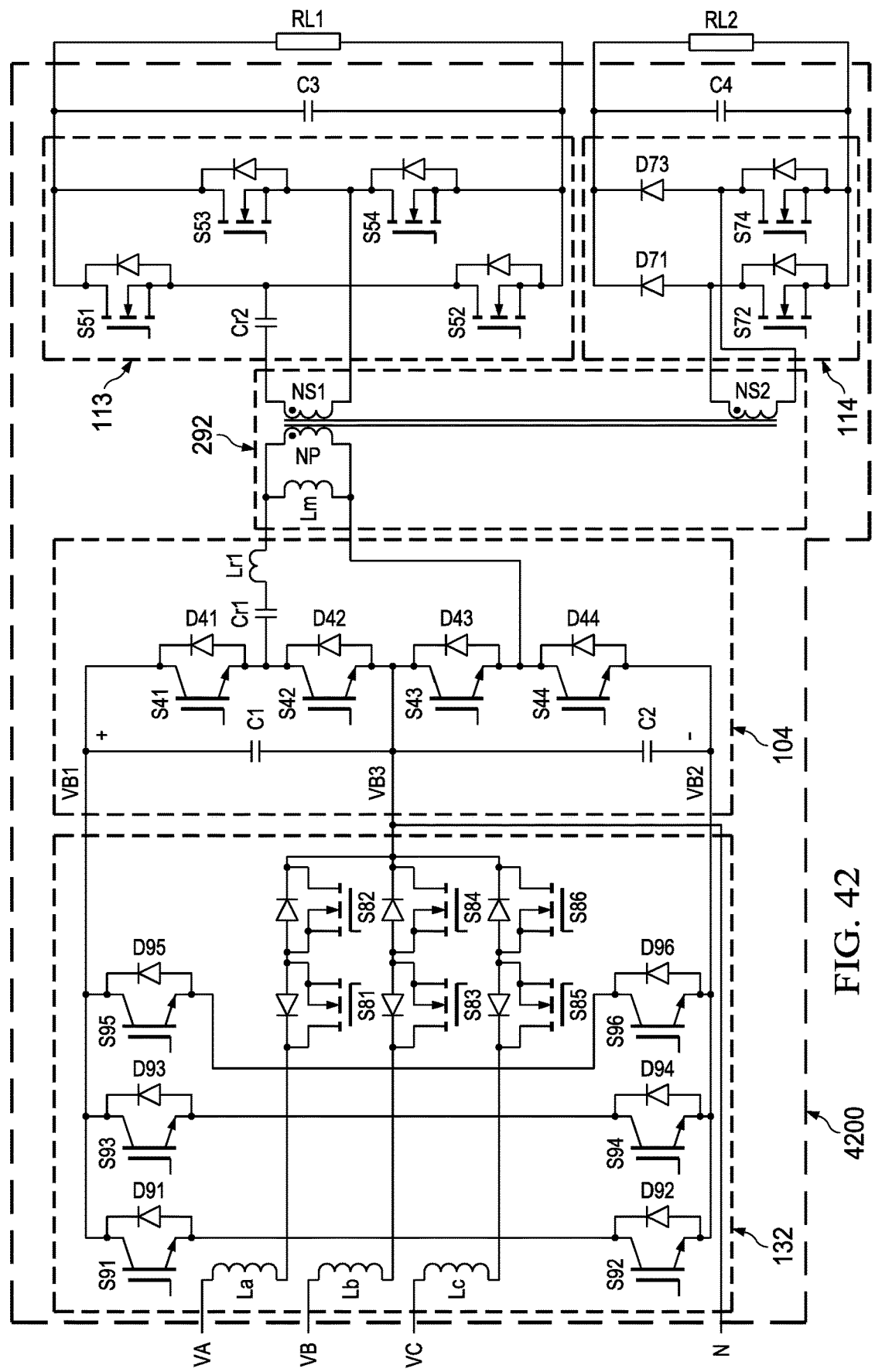
FIG. 42 illustrates a schematic diagram of a second implementation of the three-phase three-port power conversion system shown in FIG. 40 in accordance with various embodiments of the present disclosure.

FIG. 42 illustrates a schematic diagram of a second implementation of the three-phase three-port power conversion system shown in FIG. 40 in accordance with various embodiments of the present disclosure. The three-phase three-port power conversion system 4200 is similar to the three-phase three-port power conversion system 4100 shown in FIG. 41 except that the Vienna power factor correction device is implemented as a bidirectional Vienna power factor correction device.

As shown in FIG. 42, the uncontrollable diode bridge of the Vienna power factor correction device has been replaced by switches S91-S96. In operation, the gates of the switches S91-S96 are controlled so that the switches S91-S96 emulate the operation of the respective diodes shown in FIG. 41. One advantageous feature of having the rectifier shown in FIG. 42 is that the switches S91-S96 can help to save the conduction losses caused by the forward voltage drop of the diodes D81-D86. In addition, the bidirectional Vienna power factor correction device allows a current flow from the voltage buses VB1-VB3 to the AC power source.

Figure 43:
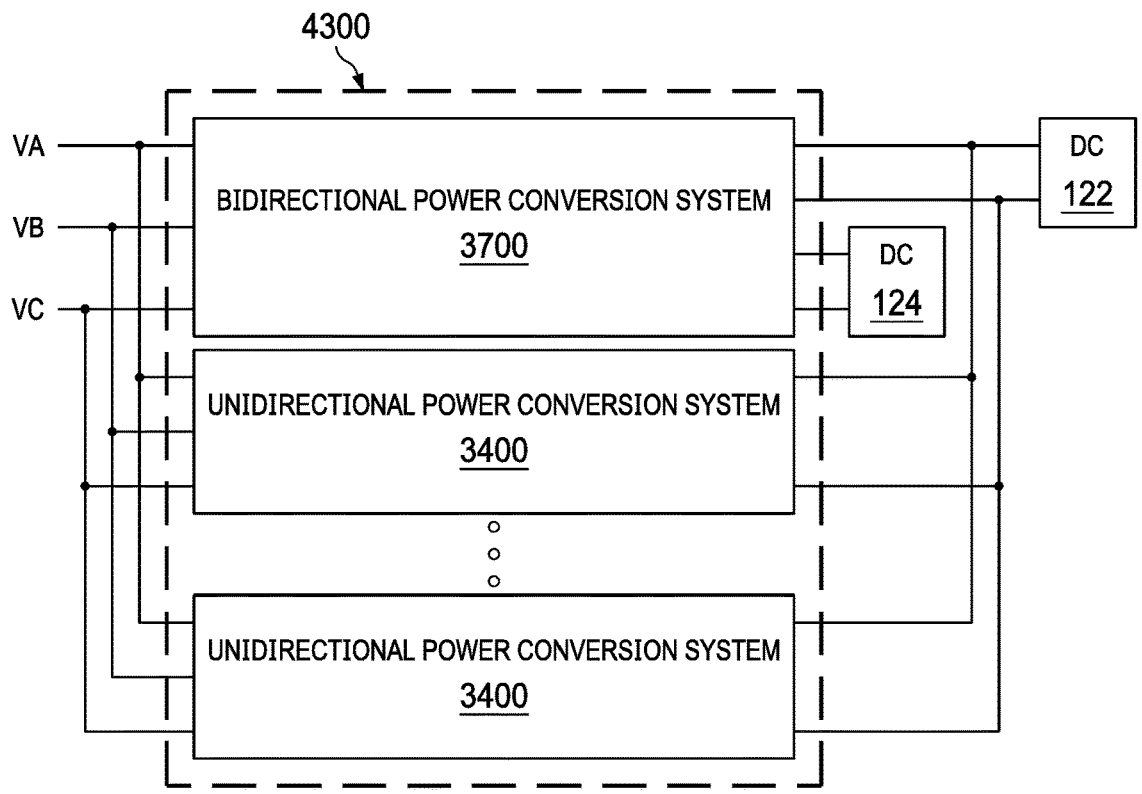
FIG. 43 illustrates a block diagram of a modular three-phase power conversion system in accordance with various embodiments of the present disclosure.

FIG. 43 illustrates a block diagram of a modular three-phase power conversion system in accordance with various embodiments of the present disclosure. The modular three-phase power conversion system 4300 comprises a plurality of power modules connected in parallel between the three-phase AC power source and the DC loads. At least one power module may be implemented as the three-phase three-port power conversion system 3700, which is a bidirectional power conversion system between three-phase AC power source and the DC element 122. The other power modules are implemented as the three-phase power conversion system 3400, which is a unidirectional power conversion system.

The bidirectional the three-phase three-port power conversion system 3700 converts AC power into DC power and provides a first DC voltage for the first DC load 122, and a second DC voltage for the second DC load 124. The unidirectional three-phase power conversion system 3400 converts AC power into DC power and provides a first DC voltage for the first DC load 122. When the modular three-phase power conversion system 4300 is configured as a DC/AC power conversion system, the first DC load 122 functions as a DC power source. The energy is transferred from the DC power source to an AC load through the bidirectional the three-phase three-port power conversion system 3700.

One advantageous feature of having the modular three-phase power conversion system 4300 is that the combination of the bidirectional power conversion system 3700 and the unidirectional power conversion system 3400 can achieve a bidirectional power transferring in the modular three-phase power conversion system 4300. At the same time, the unidirectional power conversion system 3400 helps to reduce the system cost, thereby achieving a cost-effective solution.

Another advantageous feature of having the modular three-phase power conversion system 4300 is that the modular three-phase power conversion system 4300 fully utilizes both the advantage of the bidirectional three-phase three-port power conversion system 3700 and the advantage of the unidirectional three-phase power conversion system 3400. As described above with respect to FIGS. 33-34, the unidirectional three-phase power conversion system 3400 is a low cost power conversion system, which can lower the total cost of the modular three-phase power conversion system 4300. On the other hand, the bidirectional three-phase three-port power conversion system 3700 can be used to achieve the inverting operation mode required by the system.

Figure 44:
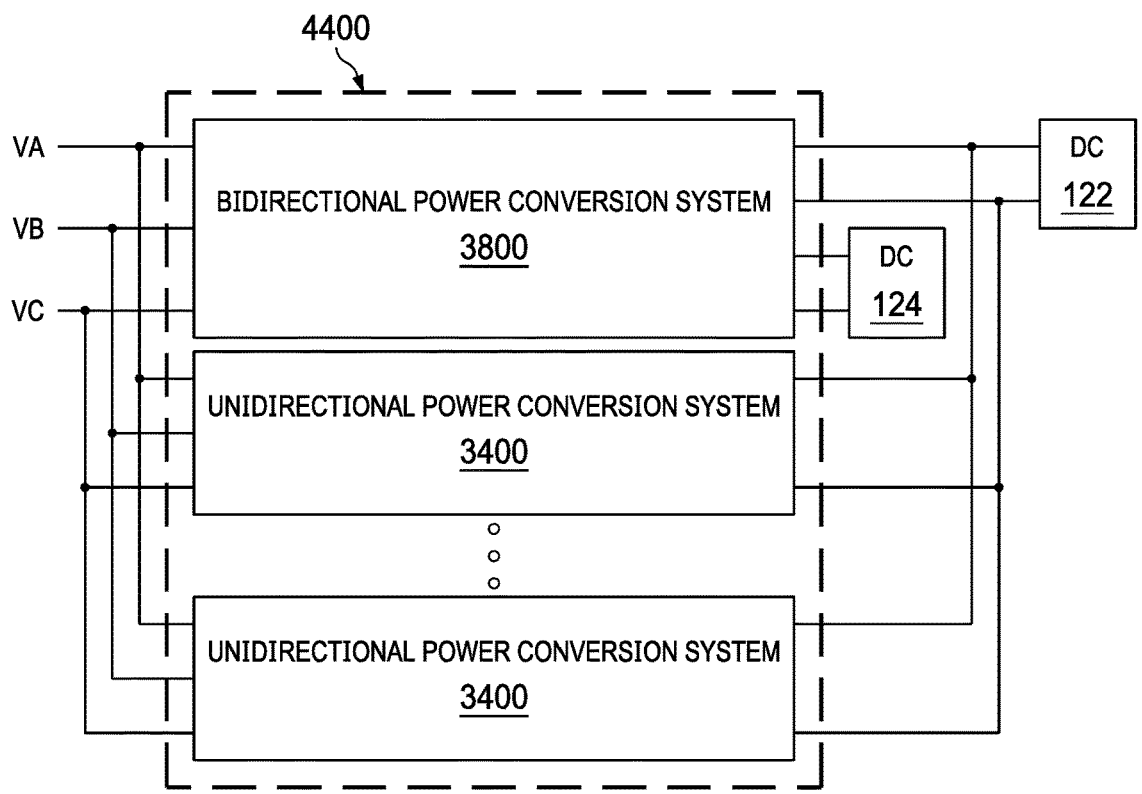
FIG. 44 illustrates a block diagram of another modular three-phase power conversion system in accordance with various embodiments of the present disclosure.

FIG. 44 illustrates a block diagram of another modular three-phase power conversion system in accordance with various embodiments of the present disclosure. The modular three-phase power conversion system 4400 is similar to that shown in FIG. 43 except that the bidirectional power conversion system has been replaced by the three-phase three-port power conversion system 3800 shown in FIG. 38.

Figure 45:
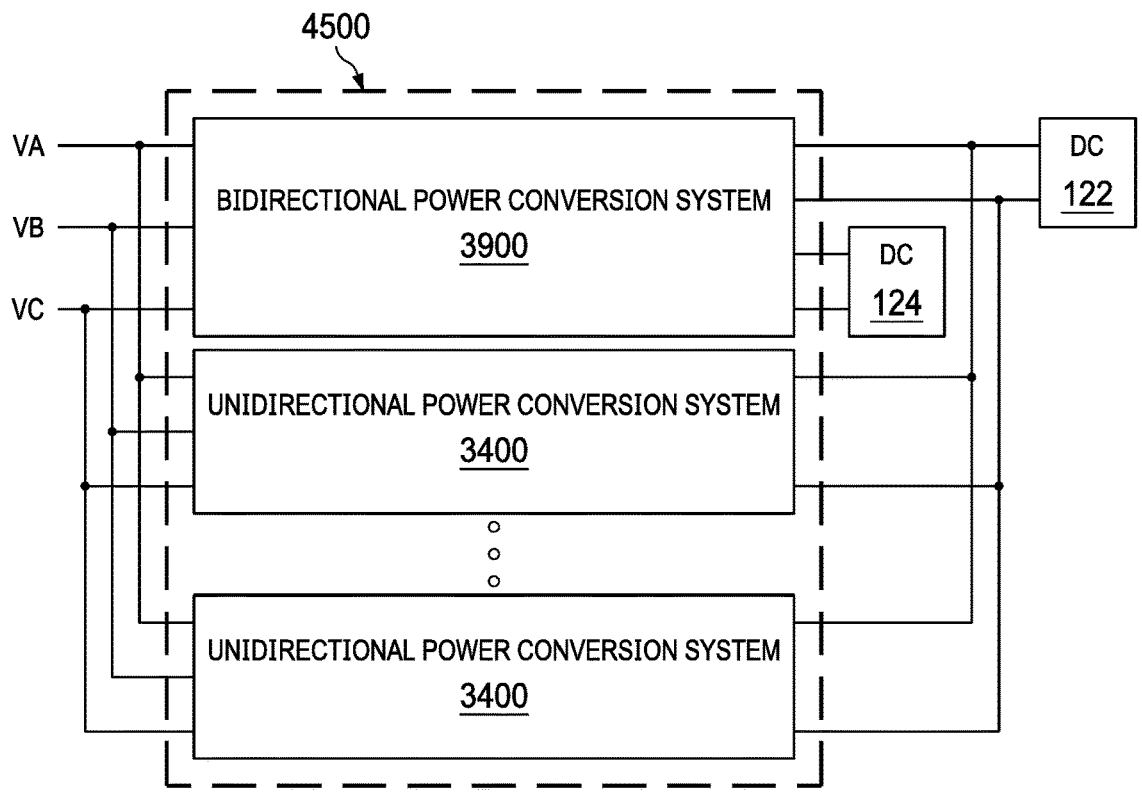
FIG. 45 illustrates a block diagram of another modular three-phase power conversion system in accordance with various embodiments of the present disclosure.

FIG. 45 illustrates a block diagram of another modular three-phase power conversion system in accordance with various embodiments of the present disclosure. The modular three-phase power conversion system 4500 is similar to that shown in FIG. 43 except that the bidirectional power conversion system has been replaced by the three-phase three-port power conversion system 3900 shown in FIG. 39.

Figure 46:
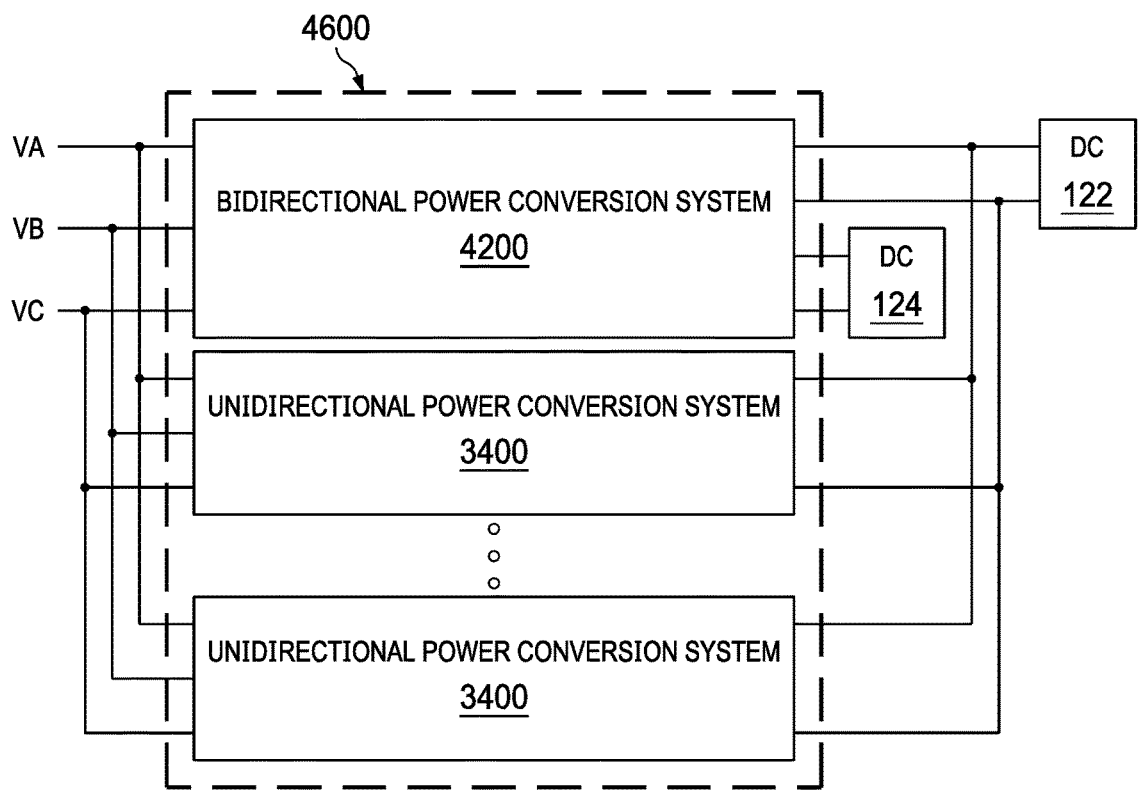
FIG. 46 illustrates a block diagram of another modular three-phase power conversion system in accordance with various embodiments of the present disclosure.

FIG. 46 illustrates a block diagram of another modular three-phase power conversion system in accordance with various embodiments of the present disclosure. The modular three-phase power conversion system 4600 is similar to that shown in FIG. 43 except that the bidirectional power conversion system has been replaced by the three-phase three-port power conversion system 4200 shown in FIG. 42.

It should be noted that FIGS. 43-46 illustrate a few combinations based upon various embodiments of the present disclosure. The diagrams shown in FIGS. 43-46 are merely examples, which should not unduly limit the scope of the claims. One of ordinary skill in the art would recognize many variations, alternatives, and modifications. For example, the bidirectional power conversion systems shown in FIGS. 43-46 can be replaced by any bidirectional three-phase three-port power conversion systems and their variations discussed in the present disclosure. Likewise, the unidirectional power conversion systems shown in FIG. 43-46 can be replaced by any three-phase unidirectional power conversion systems and their variations discussed in the present disclosure.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system comprising:
a first power conversion port including a three-level power factor correction device and a primary power conversion circuit, wherein the three-level power factor correction device includes input ports connected to a single-phase AC power source, a first output port connected to a first voltage bus, a second output port connected to a second voltage bus, and a third output port connected to a third voltage bus;
a first diode, a second diode connected in series with the first diode between the first voltage bus and the second voltage bus, a first capacitor, and a second capacitor connected in series with the first capacitor between the first voltage bus and the second voltage bus, and a relay connected between a common node of the first diode and the second diode, and a common node of the first capacitor and the second capacitor;
a second power conversion port including a three-level rectifier; and
a third power conversion port including a rectifier, the first power conversion port, the second power conversion port and the third power conversion port magnetically coupled to each other through a transformer.

2. The system of claim 1, wherein the three-level power factor correction device is a three-level neutral point clamped (NPC) power factor correction converter, and the primary power conversion circuit includes a primary switching network of a three-level inductor-inductor-capacitor (LLC) converter and a resonant tank.

3. The system of claim 1, wherein an output voltage of the three-level rectifier is regulated through adjusting a voltage across the first voltage bus and the second voltage bus.

4. The system of claim 1, wherein the relay is configured to transition between a closed state and an open stage, and wherein the first diode, the second diode, the first capacitor, and the second capacitor form a voltage doubler when the relay is in the closed state.

5. The system of claim 1, wherein the primary power conversion circuit includes a first primary switch, a second primary switch, a third primary switch and a fourth primary switch connected in series between a first voltage bus and a second voltage bus, and a resonant tank connected between a common node of the first primary switch and the second primary switch, and a first terminal of a primary winding of the transformer, and a second terminal of the primary winding of the transformer being connected to a common node of the third primary switch and the fourth primary switch.

6. A method comprising:
transferring energy from an AC power source to a first DC load through a three-level power factor correction device, a primary three-level power conversion circuit and a first secondary power conversion circuit that is magnetically coupled to the primary three-level power conversion circuit through a transformer;
configuring the three-level power factor correction device to generate a first voltage bus, a second voltage bus and a third voltage bus, wherein a first diode, a second diode connected in series with the first diode between the first voltage bus and the second voltage bus, a first capacitor and a second capacitor connected in series with the first capacitor between the first voltage bus and the second voltage bus, and a relay connected between a common node of the first diode and the second diode, and a common node of the first capacitor and the second capacitor; and
transferring energy from the AC power source to a second DC load through the three-level power factor correction device, the primary three-level power conversion circuit and a second secondary power conversion circuit that is magnetically coupled to the primary three-level power conversion circuit through the transformer.

7. The method of claim 6, further comprising:
regulating a voltage across the first DC load through adjusting an output voltage of the three-level power factor correction device.

8. The method of claim 6, further comprising:
configuring the first diode, the second diode, the first capacitor and the second capacitor and the relay as a voltage doubler through changing the relay from an open state to a closed state.

9. The method of claim 6, further comprising:
configuring the second secondary power conversion circuit to operate as a linear regulator when an input voltage of the second secondary power conversion circuit is over a predetermined voltage threshold.

10. The method of claim 6, further comprising:
configuring the first DC load as a power source to provide power for at least one of the second DC load and an AC load connected to terminals of the AC power source.

11. The method of claim 6, further comprising:
configuring the second secondary power conversion circuit to operate in a boost converter mode by shorting a secondary side winding of the transformer through turning on two lower switches of the second secondary power conversion circuit.

12. A system comprising:
a three-port power conversion subsystem having a first port connected to an AC power source, a second port connected to a first DC load and a third port connected to a second DC load; and
a first two-port power conversion subsystem having a first port connected to the AC power source and a second port connected to the first DC load, the second port of the first two-port power conversion subsystem being a first unidirectional power port.

13. The system of claim 12, wherein:
the first port of the three-port power conversion subsystem includes a first three-level power factor correction device and a first primary power conversion circuit connected in cascade between the AC power source and a first winding of a first transformer;
the second port of the three-port power conversion subsystem includes a three-level rectifier connected between a second winding of the first transformer and the first DC load; and the third port of the three-port power conversion subsystem includes a first diode rectifier between a third winding of the first transformer and the second DC load.

14. The system of claim 13, wherein the first three-level power factor correction device is a three-level neutral point clamped (NPC) power factor correction converter, and the first primary power conversion circuit and the three-level rectifier form a three-level inductor-inductor-capacitor (LLC) converter.

15. The system of claim 12, wherein:
the first port of the first two-port power conversion subsystem includes a second three-level power factor correction device and a second primary power conversion circuit connected in cascade between the AC power source and a first winding of a second transformer; and
the second port of the first two-port power conversion subsystem includes a second diode rectifier connected between a second winding of the second transformer and the first DC load.

16. The system of claim 12, further comprising:
a second two-port power conversion subsystem having a first port connected to the AC power source and a second port connected to the first DC load, the second port of the second two-port power conversion subsystem being a second unidirectional power port.

* * * * *